(12) United States Patent
Morigami et al.

(10) Patent No.: US 10,666,975 B2
(45) Date of Patent: May 26, 2020

(54) IMAGE PROCESSING APPARATUS AND IMAGE PROCESSING METHOD

(71) Applicant: SONY CORPORATION, Tokyo (JP)

(72) Inventors: Yoshitaka Morigami, Tokyo (JP); Takefumi Nagumo, Kanagawa (JP); Junichi Tanaka, Kanagawa (JP); Hironari Sakurai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 241 days.

(21) Appl. No.: 15/120,657

(22) PCT Filed: Mar. 18, 2015

(86) PCT No.: PCT/JP2015/058013
§ 371 (c)(1),
(2) Date: Aug. 22, 2016

(87) PCT Pub. No.: WO2015/163046
PCT Pub. Date: Oct. 29, 2015

(65) Prior Publication Data
US 2017/0019685 A1    Jan. 19, 2017

(30) Foreign Application Priority Data
Apr. 23, 2014 (JP) ................................. 2014-089245

(51) Int. Cl.
*H04N 19/60* (2014.01)
*H04N 19/182* (2014.01)
(Continued)

(52) U.S. Cl.
CPC ........... *H04N 19/60* (2014.11); *H04N 19/117* (2014.11); *H04N 19/124* (2014.11);
(Continued)

(58) Field of Classification Search
CPC .... H04N 19/60; H04N 19/117; H04N 19/124; H04N 19/136; H04N 19/157;
(Continued)

(56) References Cited

U.S. PATENT DOCUMENTS

| 10,009,616 B2* | 6/2018 | Minezawa | ......... H04N 19/1887 |
| 2013/0003865 A1* | 1/2013 | Norkin | ................. H04N 19/176 |
| | | | 375/240.25 |

(Continued)

FOREIGN PATENT DOCUMENTS

| JP | 2013-138395 | 7/2013 |
| JP | 2013-236358 | 11/2013 |

(Continued)

OTHER PUBLICATIONS

Chen, et al., "High efficiency video coding (HEVC) scalable extensions Draft 5", Joint Collaborative Team on Video Coding (JCT-VC) of ITU-T SG16 WP3 and ISO/IEC JTC1/SC29/WG11, Jan. 9-17, 2014, pp. i-119, 16th Meeting: San Jose, US.

(Continued)

*Primary Examiner* — Maria E Vazquez Colon
(74) *Attorney, Agent, or Firm* — Paratus Law Group, PLLC

(57) ABSTRACT

In a sample adaptive offset (SAO), the coding efficiency is improved by selecting an optimum mode among a plurality of modes based on a technique called a band offset and an edge offset. However, a processing amount of the SAO tends to increase when an optimum mode and an offset value are set, and this may result in an increase in a circuit size or power consumption. In this regard, the present disclosure proposes to enable reducing a processing amount of a cost calculation of the sample adaptive offset. According to the present disclosure, there is provided an image processing apparatus, including: a control unit configured to set an (Continued)

offset value to be applied to a pixel of an image, from among candidates of the offset value restricted according to a bit depth of the image; and a filter processing section configured to perform a filter process of applying the offset value set by the control unit to the pixel of the image.

19 Claims, 41 Drawing Sheets

(51) Int. Cl.
*H04N 19/82* (2014.01)
*H04N 19/136* (2014.01)
*H04N 19/86* (2014.01)
*H04N 19/117* (2014.01)
*H04N 19/70* (2014.01)
*H04N 19/124* (2014.01)
*H04N 19/157* (2014.01)
*H04N 19/96* (2014.01)
*H04N 19/15* (2014.01)

(52) U.S. Cl.
CPC ......... *H04N 19/136* (2014.11); *H04N 19/157* (2014.11); *H04N 19/182* (2014.11); *H04N 19/70* (2014.11); *H04N 19/82* (2014.11); *H04N 19/86* (2014.11); *H04N 19/96* (2014.11); *H04N 19/15* (2014.11)

(58) Field of Classification Search
CPC ...... H04N 19/182; H04N 19/70; H04N 19/82; H04N 19/86; H04N 19/96; H04N 19/15
See application file for complete search history.

(56) References Cited

U.S. PATENT DOCUMENTS

2013/0287124 A1* 10/2013 Norkin ................. H04N 19/176
375/240.29

2014/0140416 A1* 5/2014 Yamazaki ............ H04N 19/463
375/240.25

FOREIGN PATENT DOCUMENTS

| WO | WO2013/046990 A1 | 4/2013 |
| WO | WO2013/154008 A1 | 10/2013 |

OTHER PUBLICATIONS

Flynn, et al., "High Efficiency Video Coding (HEVC) Range Extensions text specification: Draft 5", Joint Collaborative Team on Video Coding (JCT-VC) of ITU-T SG16 WP3 and ISO/IEC JTC1/SC29/WG11, Oct. 23-Nov. 1, 2013, pp. i-328, 15$^{th}$ Meeting: Geneva, CH.

Bross, et al., "High Efficiency Video Coding (HEVC) text specification draft 10 (for FDIS & Consent)", Joint Collaborative Team on Video Coding (JCT-VC) of ITU-T SG16 WP3 and ISO/IEC JTC1/SC29/WG11, Jan. 14-23, 2013, pp. i-299, 12$^{th}$ Meeting: Geneva, CH.

Hsiang, et al., "AHG5: Modified SAO for range extensions", Joint Collaborative Team on Video Coding (JCT-VC) of ITU-T SG16 WP3 and ISO/IEC JTC1/SC29/WG11, Jul. 25-Aug. 2, 2013, pp. 1-5, 14$^{th}$ Meeting: Vienna, AT.

Kim, et al., "AhG 5 and 18: Sample Adaptive Offset on High Bit-depth", Joint Collaborative Team on Video Coding (JCT-VC) of ITU-T SG16 WP3 and ISO/IEC JTC1/SC29/WG11, Oct. 23-Nov. 1, 2013, pp. 1-4, 15$^{th}$ Meeting: Geneva, CH.

Tourapis, "SAO extension for higher bit-depth coding", Joint Collaborative Team on Video Coding (JCT-VC) of ITU-T SG16 WP3 and ISO/IEC JTC1/SC29/WG11, Jul. 25-Aug. 2, 2013, pp. 1-6, 14$^{th}$ Meeting: Vienna, AT.

Alshina, et al., "AhG 18: On SAO performance at high bit-depth and high bit-rate", Joint Collaborative Team on Video Coding (JCT-VC) of ITU-T SG16 WP3 and ISO/IEC JTC1/SC29/WG11, Jan. 9-17, 2014, pp. 1-15, 16$^{th}$ Meeting: San Jose, US.

* cited by examiner

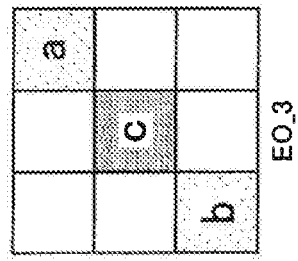
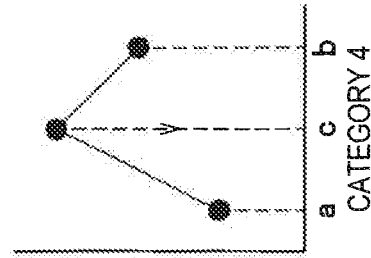
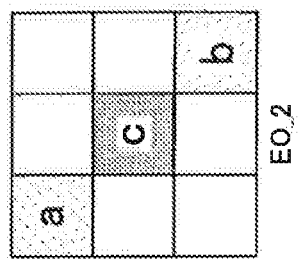
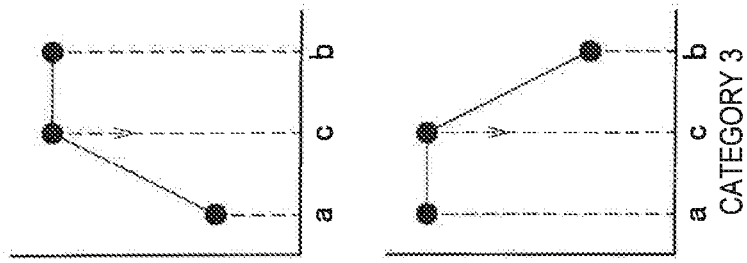
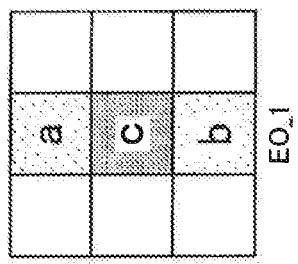
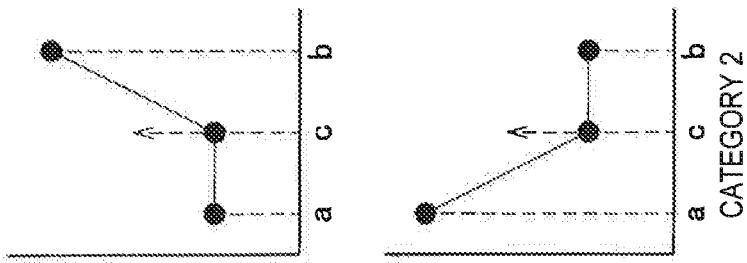
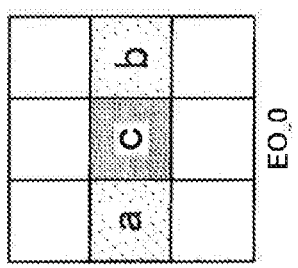
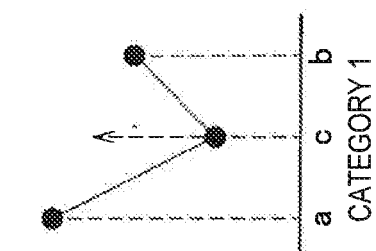
FIG. 1

FIG. 11 d40

| MEASURING SECTION | OFFSET VALUE |
|---|---|
| Offset [0] | 0 |
| Offset [1] | 1 |
| Offset [2] | 2 |
| Offset [3] | 3 |
| Offset [4] | 4 |
| Offset [5] | 5 |
| Offset [6] | 6 |
| Offset [7] | 7 |
| Offset [8] | 8 |
| Offset [9] | 9 |
| Offset [10] | 10 |
| Offset [11] | 11 |
| Offset [12] | 12 |
| Offset [13] | 13 |
| Offset [14] | 14 |
| Offset [15] | 15 |

| MEASURING SECTION | OFFSET VALUE |
|---|---|
| Offset [16] | 16 |
| Offset [17] | 17 |
| Offset [18] | 18 |
| Offset [19] | 19 |
| Offset [20] | 20 |
| Offset [21] | 21 |
| Offset [22] | 22 |
| Offset [23] | 23 |
| Offset [24] | 24 |
| Offset [25] | 25 |
| Offset [26] | 26 |
| Offset [27] | 27 |
| Offset [28] | 28 |
| Offset [29] | 29 |
| Offset [30] | 30 |
| Offset [31] | 31 |

FIG. 14 d51

| MEASURING SECTION | OFFSET VALUE |
|---|---|
| Offset [0] | 0 |
| Offset [1] | 1 |
| ⋮ | ⋮ |
| ⋮ | ⋮ |
| ⋮ | ⋮ |
| Offset [N-2] | N-2 |
| Offset [N-1] | N-1 |
| Offset [N] | N |

N

| MEASURING SECTION | OFFSET VALUE |
|---|---|
| Offset [0] | 0 |
| Offset [1] | 1 |
| Offset [2] | 2 |
| Offset [3] | 3 |
| Offset [4] | 4 |
| Offset [5] | 5 |
| Offset [6] | 6 |
| Offset [7] | 7 |

| MEASURING SECTION | OFFSET VALUE |
|---|---|
| Offset [0] | 0 |
| Offset [1] | 2 |
| ⋮ | ⋮ |
| ⋮ | ⋮ |
| ⋮ | ⋮ |
| Offset [N-2] | 2 × (N-2) |
| Offset [N-1] | 2 × (N-1) |
| Offset [N] | 2 × N |

N

| MEASURING SECTION | OFFSET VALUE |
|---|---|
| Offset [0] | 0 |
| Offset [1] | 2 |
| Offset [2] | 4 |
| Offset [3] | 6 |
| Offset [4] | 8 |
| Offset [5] | 10 |
| Offset [6] | 12 |
| Offset [7] | 14 |

| MEASURING SECTION | OFFSET VALUE |
|---|---|
| Offset [0] | 0 |
| Offset [1] | 4 |
| ⋮ | ⋮ |
| ⋮ | ⋮ |
| ⋮ | ⋮ |
| Offset [N-2] | 4 × (N-2) |
| Offset [N-1] | 4 × (N-1) |
| Offset [N] | 4 × N |

N

| MEASURING SECTION | OFFSET VALUE |
|---|---|
| Offset [0] | 0 |
| Offset [1] | 4 |
| Offset [2] | 8 |
| Offset [3] | 12 |
| Offset [4] | 16 |
| Offset [5] | 20 |
| Offset [6] | 24 |
| Offset [7] | 28 |

ORIGINAL IMAGE

DECODED IMAGE

FIG. 20 d30

| intra mode | SAO mode | Sao TypeIdx |
|---|---|---|
| 0 | BO | 1 |
| 1 | BO | 1 |
| 2 | EO_2 | 2 |
| ⋮ | ⋮ | ⋮ |
| 5 | EO_2 | 2 |
| 6 | EO_1 | 2 |
| ⋮ | ⋮ | ⋮ |
| 13 | EO_1 | 2 |
| 14 | EO_3 | 2 |
| ⋮ | ⋮ | ⋮ |
| 21 | EO_3 | 2 |
| 22 | EO_0 | 2 |
| ⋮ | ⋮ | ⋮ |
| 29 | EO_0 | 2 |
| 30 | EO_2 | 2 |
| ⋮ | ⋮ | ⋮ |
| 34 | EO_2 | 2 |

FIG. 32

| MEASURING SECTION | I PICTURE | P PICTURE | B PICTURE |
|---|---|---|---|
| Offset[0] | ○ | ○ | ○ |
| Offset[1] | ○ | ○ | ○ |
| Offset[2] | ○ | ○ | ○ |
| Offset[3] | ○ | ○ | ○ |
| Offset[4] | ○ | ○ | × |
| Offset[5] | ○ | ○ | × |
| Offset[6] | ○ | × | × |
| Offset[7] | ○ | × | × |

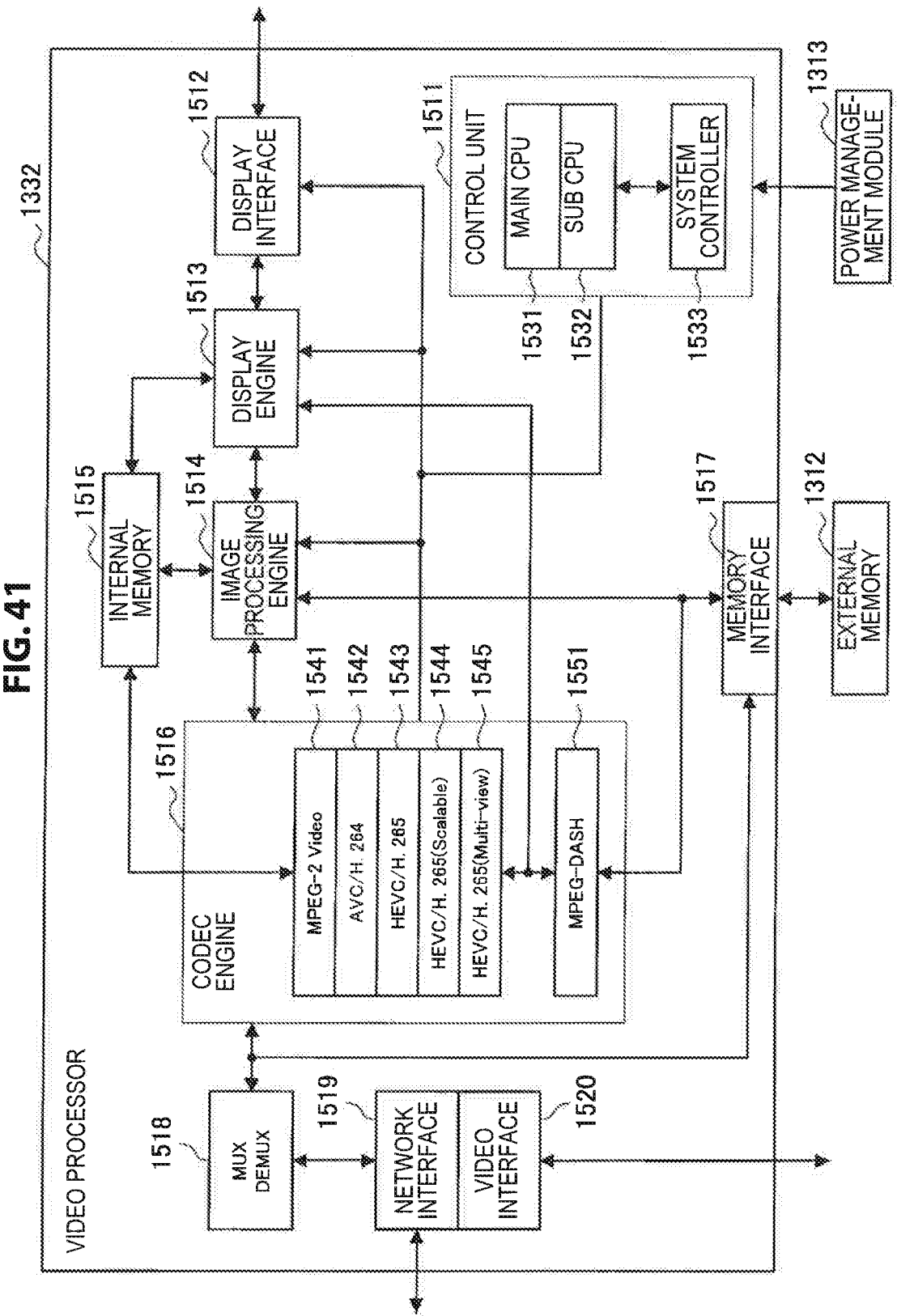

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2015/058013 (filed on Mar. 18, 2015) under 35 U.S.C. § 371, which claims priority to Japanese Patent Application No. 2014-089245 (filed on Apr. 23, 2014), which are all hereby incorporated by reference in their entirety.

TECHNICAL FIELD

The present disclosure relates to an image processing apparatus and an image processing method.

BACKGROUND ART

The standardization of an image coding scheme called HEVC (High Efficiency Video Coding) by JCTVC (Joint Collaboration Team-Video Coding), which is a joint standardization organization of ITU-T and ISO/IEC, is currently under way for the purpose of improving coding efficiency more than H. 264/AVC (see, for example, Non-Patent Literature 1).

HEVC provides not only coding of a single layer but also scalable video coding, as in known image coding schemes such as MPEG2 and Advanced Video Coding (AVC). An HEVC scalable video coding technology is also called Scalable HEVC (SHVC) (for example, see Non-Patent Literature 2). The scalable video coding is generally a technology that hierarchically encodes a layer transmitting a rough image signal and a layer transmitting a fine image signal.

A first version of a standard specification of HEVC was published at the beginning of 2013, but extension of the specification has been continuously performed from various points of view such as enhancement of coding tools (for example, see Non-Patent Literature 3) in addition to the SHVC. Particularly, a technique called a sample adaptive offset (SAO) filter is applied from HEVC. In the SAO filter, the coding efficiency is improved by selecting an optimum mode among a plurality of modes based on a technique called a band offset and an edge offset.

CITATION LIST

Non-Patent Literature

Non-Patent Literature 1: Benjamin Bross, el. al, "High Efficiency Video Coding (HEVC) text specification draft 10 (for FDIS & Consent)" (JCTVC-L1003_v4, Jan. 14 to 23, 2013)

Non-Patent Literature 2: Jianle Chen, el. al, "High efficiency video coding (HEVC) scalable extensions Draft 5" (JCTVC-P1008_v4, Jan. 9 to 17, 2014)

Non-Patent Literature 3: David Flynn, el. al, "High Efficiency Video Coding (HEVC) Range Extensions text specification: Draft 5" (JCTVC-O1005_v2, Oct. 23 to Nov. 1, 2013)

SUMMARY OF INVENTION

Technical Problem

A processing amount of the SAO filter tends to increase when an optimum mode and an offset value are set, and this may result in an increase in a circuit size or power consumption.

In this regard, the present disclosure proposes an image processing apparatus and an image processing method which are capable of reducing a processing amount of a cost calculation.

Solution to Problem

According to the present disclosure, there is provided an image processing apparatus, including: a control unit configured to set an offset value to be applied to a pixel of an image, from among candidates of the offset value restricted according to a bit depth of the image; and a filter processing section configured to perform a filter process of applying the offset value set by the control unit to the pixel of the image.

According to the present disclosure, there is provided
An image processing method, including:
setting, by a processor, an offset value to be applied to a pixel of an image, from among candidates of the offset value restricted according to a bit depth of the image; and
performing a filter process of applying the set offset value to the pixel of the image.

Advantageous Effects of Invention

As described above, according to the present disclosure, an image processing apparatus and an image processing method which are capable of reducing a processing amount of a cost calculation are provided.

The above effect is not necessarily limited, and effects described in this specification or other effects that can be understood from this specification may be obtained in addition to the above effect or instead of the above effect.

BRIEF DESCRIPTION OF DRAWINGS

FIG. 1 is an explanatory view for describing an overview of an edge offset process.

FIG. 11 is a table illustrating an example of a correspondence relation between each offset measuring section and each offset value according to the comparative example.

FIG. 14 is a table illustrating an example of a correspondence relation between each offset measuring section and each offset value according to the same embodiment.

FIG. 15 is a table illustrating an example of a correspondence relation between each offset measuring section and each offset value according to the same embodiment.

FIG. 16 is a table illustrating an example of a correspondence relation between each offset measuring section and each offset value according to the same embodiment.

FIG. 19 is an explanatory view for describing a characteristic of decoded image data when directional prediction is selected as a prediction mode of intra prediction.

FIG. 20 illustrates an example of a correspondence relation between a prediction mode of intra prediction and each mode of an SAO in an image encoding device according to a second embodiment of the present disclosure.

FIG. 32 is an explanatory view for describing content of a process of an SAO filter according to the same embodiment.

FIG. 41 is a block diagram illustrating another example of a schematic configuration of a video processor.

DESCRIPTION OF EMBODIMENT(S)

Figure 2:
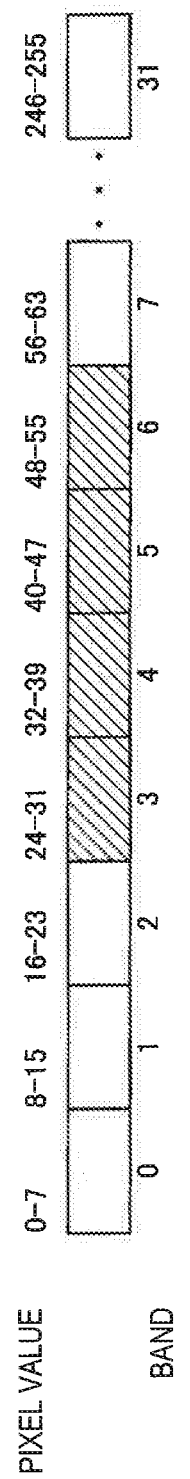
FIG. 2 is an explanatory view for describing an overview of a band offset process.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

A description will proceed in the following order.
1. Overview of SAO filter
2. First embodiment
2-1. Exemplary overall configuration of image encoding device
2-2. Exemplary configuration of loop filter
2-3. Flow of series of processes
2-4. SAO filter
2-4-1. Exemplary configuration of SAO filter
2-4-2. Process flow of SAO filter
2-5. Offset determining section
2-5-1. Comparative example of offset determining section
2-5-2. Exemplary configuration of offset determining section
2-5-3. Process flow of offset determining section
2-6. Conclusion
3. Second Embodiment
3-1. Overview
3-2. Exemplary configuration of loop filter
3-3. Exemplary configuration of SAO filter
3-4. Process flow of mode determining section
3-4-1. Comparative example of mode determining section
3-4-2. Process flow of mode determining section
3-5. Modified example
3-6. Conclusion
4. Third Embodiment
4-1. Overview
4-2. Exemplary configuration of SAO filter
4-3. Process flow of SAO filter
4-4. Modified example
4-5. Conclusion
5. Fourth Embodiment
5-1. Overview
5-2. Process
5-3. Conclusion
6. Exemplary hardware configuration
7. Application examples
7-1. Applications to various products
7-2. Various implementation levels
8. Conclusion

1. OVERVIEW OF SAO FILTER

First, an overview of the SAO filter will be described. The sample adaptive offset (hereinafter also referred to as an "SAO") filter is a loop filter technique that is newly introduced in H.265/HEVC and executed after a deblocking filter process. The SAO is configured with two types of techniques called an edge offset (EO) and a band offset (BO), and parameters are set in units of coding tree units (CTUs) (that is, largest coding units (LCUs).

First, an overview of the edge offset process will be described. The edge offset process is a process of performing addition and subtraction of an offset value on a pixel value for each pixel according to a relative relation among a pixel serving as a processing target and two neighboring pixels neighboring the pixel.

For example, FIG. 1 is an explanatory view for describing an overview of the edge offset process. EO_0 to EO_3 illustrated in FIG. 1 indicate candidates (classes) of a pixel array in the edge offset process. In FIG. 1, a pixel denoted by reference numeral c is a pixel serving as a processing target, and pixels denoted by reference numerals a and b are neighboring pixels of the pixel c serving as the processing target. A class to be used among the classes EO_0 to EO_3 can be selected in units of CTUs based on encoding parameters "sao_eo_class_luma" and "sao_eo_class_chroma" for both luminance and chrominance.

Categories 1 to 4 are classifications of pixel value relations between the target pixel c and the neighboring pixels a and b. For example, the category 1 indicates one in which the pixel value of the target pixel c is smaller than the pixel values of the neighboring pixels a and b. The category 2 indicates one in which the pixel value of the target pixel c is smaller than one of the pixel values of the neighboring pixels a and b and equal to the other pixel value. In the case of the categories 1 and 2, pixel value smoothing is performed between the target pixel c and the neighboring pixels a and b by adding an offset to the target pixel c.

The category 3 indicates one in which the pixel value of the target pixel c is larger than one of the pixel values of the neighboring pixels a and b and equal to the other pixel value. The category 4 indicates one in which the pixel value of the target pixel c is larger than the pixel values of the neighboring pixels a and b. In the case of the categories 3 and 4, pixel value smoothing is performed between the target pixel c and the neighboring pixels a and b by subtracting an offset from the target pixel c.

In the edge offset, a category 0 indicating that the edge offset process is not performed is set in addition to the above-described categories 1 to 4.

As described above, in the edge offset process, one of the classes EO_0 to EO_3 is selected, and one of the categories 0 to 4 to which the relation of the pixel value of the target pixel c and the pixel values of the neighboring pixels a and b corresponds is specified according to the selected class. Then, a smoothing process is performed on a series of pixels by adding or subtracting an offset according to the category.

Next, an overview of the band offset process will be described. In the band offset process, a gradation of the pixel value (that is, a maximum value expressible according to a bit depth, starting from 0) is divided into 32 bands, and for a pixel belonging to the four consecutive bands among them, the pixel value is changed (added or subtracted) based on the offset value set for each band.

For example, FIG. 2 is an explanatory diagram for describing an overview of the band offset process, and illustrates an example in which the bit depth is 8 bits. In H.265/HEVC, 8 bits (the pixel value is 0 to 255) and 10 bits (the pixel value is 0 to 1023) can be used as the bit depth of the pixel. In other words, in the example of FIG. 2 in which the bit depth is 8 bits, the pixel values 0 to 255 are divided into 32 bands, and 4 bands, that is, bands 3 to 6 among divided bands 0 to 31, are selected.

As described above, in the SAO filter, one of the edge offset process and the band offset process described above is selected in units of CTUs, and the smoothing process is performed by adding or subtracting an offset to or from the pixel value according to the selected process.

2. FIRST EMBODIMENT

2-1. Exemplary Overall Configuration of Image Encoding Device

Figure 3:
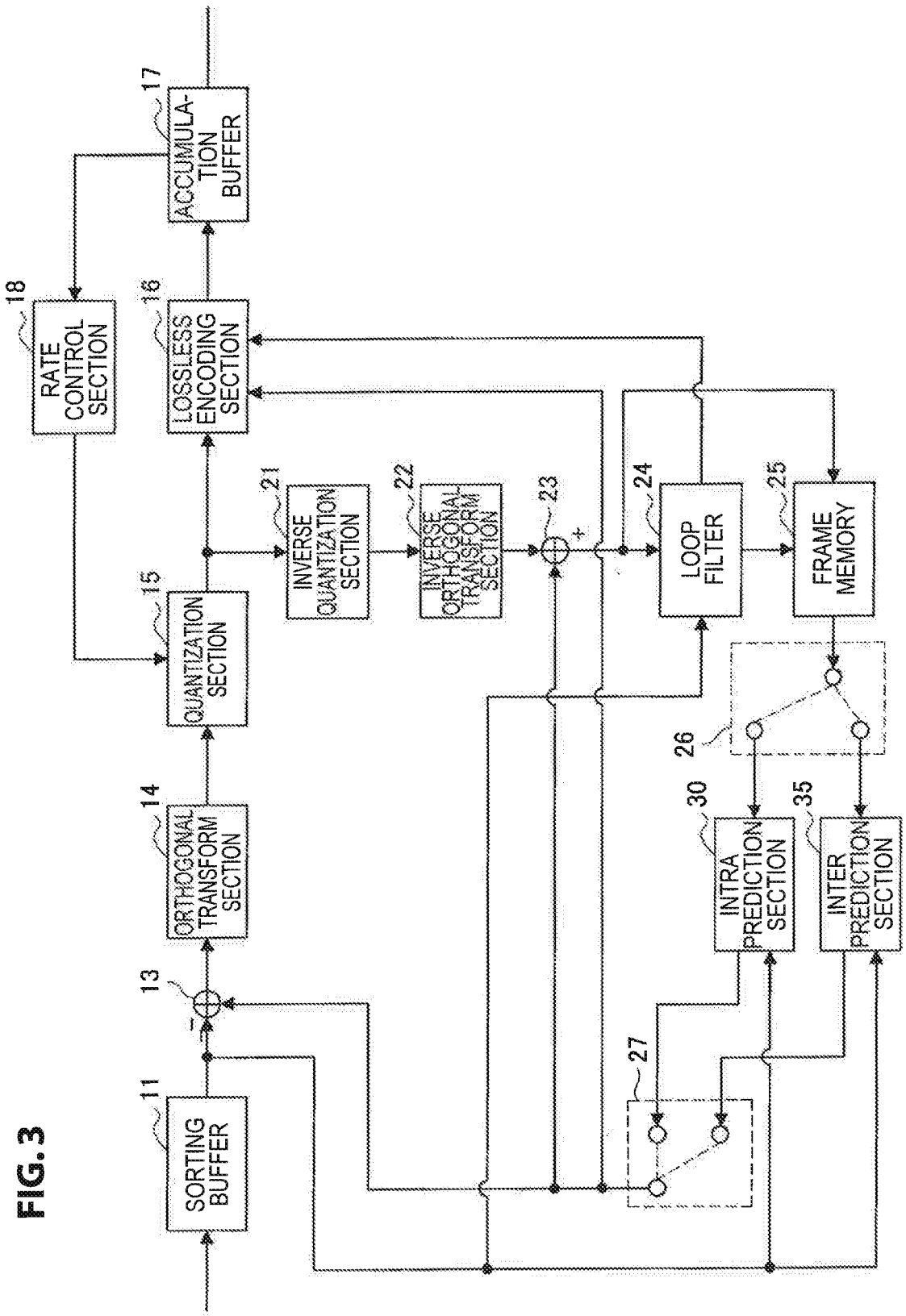
FIG. 3 is a block diagram illustrating an example of a configuration of an image encoding device according to the first embodiment of the present disclosure.

An image encoding device according to a first embodiment of the present disclosure will be described below. First, an example of a configuration of an image encoding device 1 according to the present embodiment will be described with reference to FIG. 3. FIG. 3 is a block diagram illustrating an example of a configuration of the image encoding device 1 according to the first embodiment. As illustrated in FIG. 1, the image encoding device 1 includes a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, a frame memory 25, selectors 26 and 27, an intra prediction section 30, and an inter prediction section 35.

The sorting buffer 11 sorts the images included in the series of image data. After sorting the images according to a GOP (Group of Pictures) structure according to the encoding process, the sorting buffer 11 outputs the image data which has been sorted to the subtraction section 13, the intra prediction section 30, the inter prediction section 35 and the loop filter 24.

The image data input from the sorting buffer 11 and predicted image data input by the intra prediction section 30 or the inter prediction section 35 described later are supplied to the subtraction section 13. The subtraction section 13 calculates predicted error data which is a difference between the image data input from the sorting buffer 11 and the predicted image data and outputs the calculated predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. The orthogonal transform is performed on each of transform units (TUs) formed by dividing a CU. The size of the TU is adaptively selected from 4×4 pixels, 8×8 pixels, 16×16 pixels, and 32×32 pixels. The orthogonal transform section 14 outputs transform coefficient data acquired by the orthogonal transform process to the quantization section 15.

The quantization section 15 is supplied with the transform coefficient data input from the orthogonal transform section 14 and a rate control signal from the rate control section 18 to be described below. The quantization section 15 quantizes the transform coefficient data with the quantization step decided according to the rate control signal. The quantization section 15 outputs the quantized transform coefficient data (hereinafter referred to as "quantized data") to the lossless encoding section 16 and the inverse quantization section 21. The quantized data corresponds to an example of a "bitstream."

The lossless encoding section 16 performs a lossless encoding process on the quantized data input from the quantization section 15 to generate an encoded stream. The lossless encoding section 16 encodes various parameters referred to by a decoder and inserts the encoded parameters into a header region of the encoded stream. The parameters encoded by the lossless encoding section 16 may include the parameters specifying the Quad-Tree structure and information related to intra prediction and information related to inter prediction which are to be described below. Then, the lossless encoding section 16 outputs the generated encoded stream to the accumulation buffer 17.

The accumulation buffer 17 temporarily accumulates an encoded stream input from the lossless encoding section 16 using a storage medium such as a semiconductor memory. Then, the accumulation buffer 17 outputs the accumulated encoded stream to a transmission section (not shown) (for example, a communication interface or an interface to peripheral devices) at a rate in accordance with the band of a transmission path.

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21, the inverse orthogonal transform section 22, and the addition section 23 constitute a local decoder. The local decoder corresponds to a "complex section" that restores the quantized data and generates the decoded image data.

In the quantization step used by the quantization section 15, the inverse quantization section 21 performs inverse quantization on the quantized data to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the predicted error data. As in the orthogonal transform, the inverse orthogonal transform is performed for each TU. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the inter prediction section 35 to thereby generate decoded image data (reconstructed image). Then, the addition section 23 outputs the generated decoded image data to the loop filter 24 and the frame memory 25.

The loop filter 24 includes a group of filters such as a deblock filter (DF), an SAO filter, and an adaptive loop filter (ALF) in order to improve the image quality. The loop filter 24 performs a filtering process on the decoded image data input from the addition section 23 based on the original image data supplied from the sorting buffer 11, and outputs the filtered decoded image data to the frame memory 25. The loop filter 24 will be separately described later in detail.

The frame memory 25 stores the decoded image data before the filtering input from the addition section 23, the decoded image data after the filtering input from the loop filter 24 using a storage medium.

The selector 26 reads the decoded image data before the filtering used for the intra prediction from the frame memory 25 and supplies the read decoded image data as reference image data to the intra prediction section 30. Further, the selector 26 reads the filtered decoded image data used for the inter prediction from the frame memory 25 and supplies the read decoded image data as reference image data to the inter prediction section 35.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost.

The intra prediction section 30 performs an intra prediction process on each prediction unit (PU) formed by dividing the CU based on the original image data and the decoded image data. For example, the intra prediction section 30 evaluates a prediction result according to each candidate mode in a prediction mode set using a predetermined cost function. Then, the intra prediction section 30 selects a prediction mode in which a cost is minimum, i.e., a prediction mode in which a compression ratio is highest, as an optimum prediction mode. The intra prediction section 30 generates predicted image data according to the optimum prediction mode. The intra prediction section 30 outputs information related to the intra prediction including prediction mode information indicating the selected optimum prediction mode, the cost, and the predicted image data to the selector 27.

The inter prediction section 35 performs an inter prediction process on each PU formed by dividing the CU based on the original image data and the decoded image data. For example, the inter prediction section 35 evaluates a prediction result according to each candidate mode in a prediction mode set using a predetermined cost function. Then, the inter prediction section 35 selects a prediction mode in which the cost is minimum, i.e., a prediction mode in which a compression ratio is highest, as an optimum prediction mode. The inter prediction section 35 generates predicted image data according to the optimum prediction mode. Then, the inter prediction section 35 outputs information related to the inter prediction including prediction mode information indicating the selected optimum prediction mode and motion information, the cost, and the predicted image data to the selector 27.

2-2. Exemplary Configuration of Loop Filter

Figure 4:
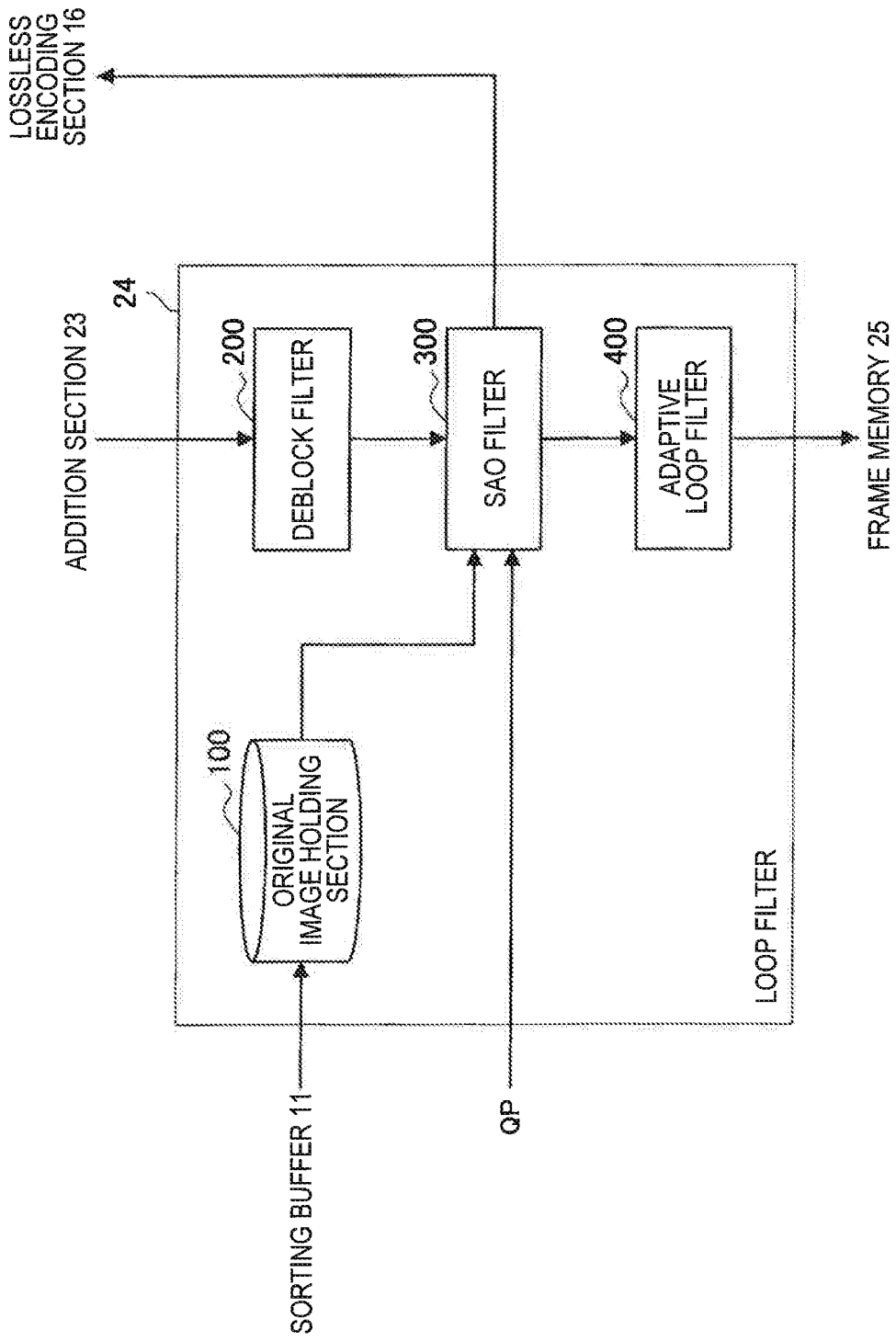
FIG. 4 is a block diagram illustrating an example of a configuration of a loop filter according to the same embodiment.

Next, an example of a configuration of the loop filter 24 according to the present embodiment will be described with reference to FIG. 4. FIG. 4 is a block diagram illustrating an example of a configuration of the loop filter 24 according to the present embodiment. As illustrated in FIG. 4, the loop filter 24 includes an original image holding section 100, a deblock filter 200, an SAO filter 300, and an adaptive loop filter 400.

The original image holding section 100 is a holding section that holds the original image data supplied from the sorting buffer 11 to the loop filter 24. Each of the components of the loop filter 24 performs a filter process by suitably referring to the original image data held in the original image holding section 100.

The decoded image data (reconstructed image) decoded by the inverse quantization section 21, the inverse orthogonal transform section 22, and the addition section 23 (that is, the local decoder) is first supplied to the deblock filter 200.

The deblock filter 200 removes block distortion of the decoded image data by appropriately performing the deblock filter process. In this specification, a detailed description of the deblock filter process is omitted. The deblock filter 200 outputs the filter process result to the SAO filter 300.

The SAO filter 300 decides an SAO mode and an offset value that are applied to the decoded image data filtered by the deblock filter 200 in units of CTUs.

The SAO mode indicates a selected one of the edge offset and the band offset illustrated in FIGS. 1 and 2. When the edge offset is selected, the SAO mode indicates a selected class among the classes EO_0 to EO_3 of the edge offset illustrated in FIG. 1 and a selected category corresponding to the class among the categories 0 to 4. Further, when the band offset is selected, the SAO mode indicates a selected band among the bands of the band offset illustrated in FIG. 2.

Then, the SAO filter 300 performs the filter process (hereinafter also referred to as an "SAO process") on the decoded image data in units of CTUs based on the decided mode and the offset value.

Particularly, the SAO filter 300 according to the present embodiment reduces a processing load of the SAO process based on the quantization step (the quantization Parameter (QP)) used to generate the quantized data serving as the decoding source of the decoded image data. As long as the SAO filter 300 can acquire the quantization step of the quantized data serving as the decoding source of the decoded image data, the acquisition source is not particularly limited. As a specific example, the SAO filter 300 may acquire the quantization step from the quantization section 15. The SAO filter 300 according to the present embodiment will be separately described later in detail.

The SAO filter 300 outputs the decoded image data that has undergone the SAO process to the adaptive loop filter 400. The SAO filter 300 outputs the SAO mode and the offset value decided in units of CTUs to the lossless encoding section 16 as the encoding parameters. Upon receiving this output, the lossless encoding section 16 encodes the supplied SAO mode and the offset value for the generated encoded stream, and then inserts the SAO mode and the offset value into the header region of the encoded stream.

The adaptive loop filter 400 performs an adaptive loop filter (ALF) process on the decoded image data that has undergone the SAO process and supplied from the SAO filter 300. In the adaptive loop filter 400, for example, a two-dimensional Wiener filter is used as the filter. It will be appreciated that a filter other than the Wiener filter may be used.

The adaptive loop filter 400 has a plurality of filters having different tap sizes and performs the adaptive loop filter process. The adaptive loop filter 400 outputs the filter process result to the frame memory 25.

The example of the configuration of the loop filter 24 according to the present embodiment has been described above with reference to FIG. 4.

2-3. Flow of Series of Processes

Figure 5:
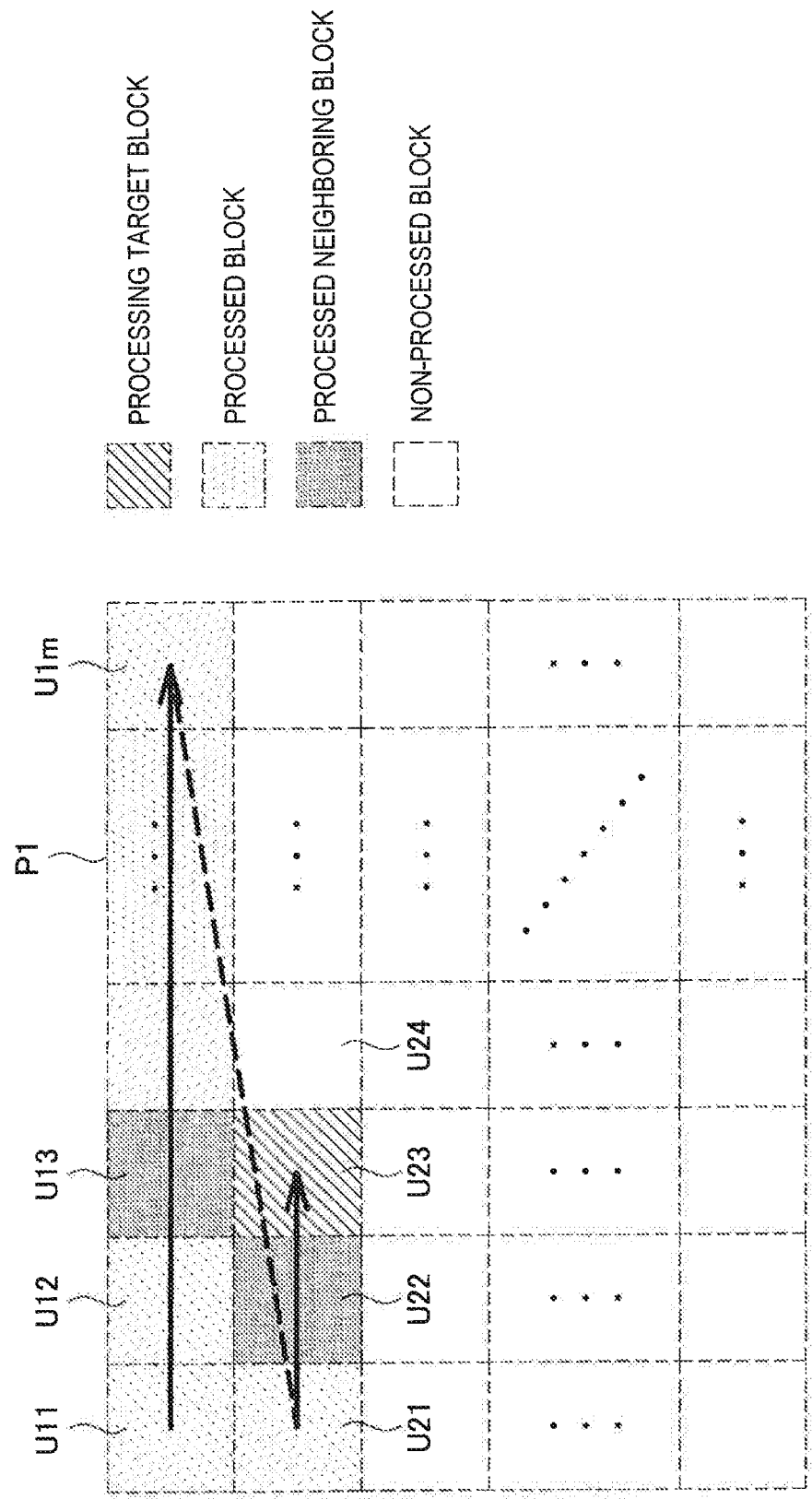
FIG. 5 is an explanatory view for describing the flow of a series of processes of an image encoding device according to the same embodiment.
Figure 6:
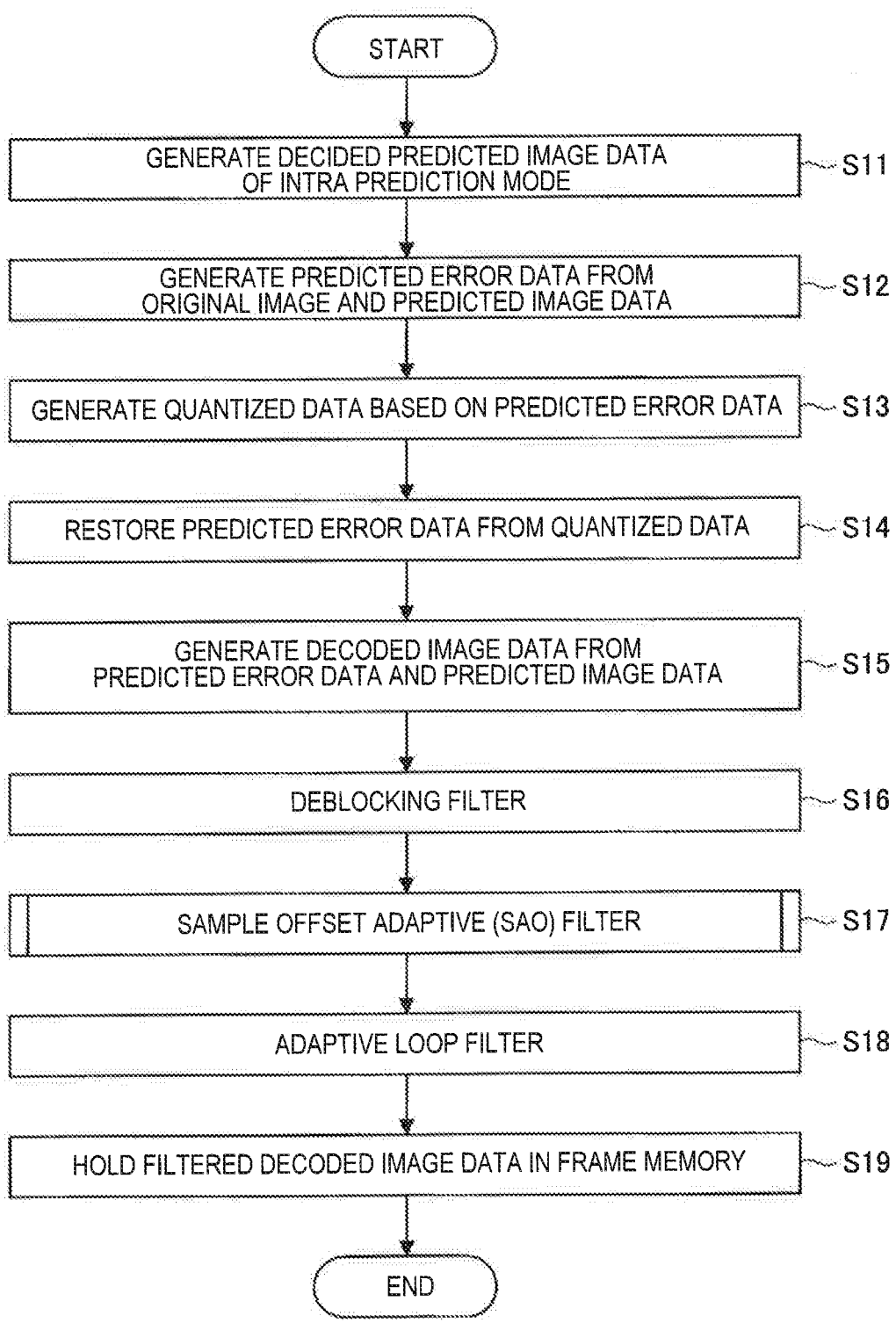
FIG. 6 is a flowchart illustrating an example of the flow of a series of processes according to the same embodiment.

Next, the flow of a series of processes of the image encoding device according to the present embodiment will be described with reference to FIGS. 5 and 6. FIGS. 5 and 6 are explanatory views for describing the flow of a series of processes of the image encoding device according to the present embodiment.

For example, FIG. 5 illustrates a process flow in which the image encoding device divides a picture P1 into a plurality of blocks (CTUs) and performs encoding in units of blocks. As illustrated in FIG. 5, the image encoding device scans the picture P1 from the upper left to the lower right in the raster scan manner, divides the picture P1 into a plurality of CTUs having a fixed block size, and processes the CTUs. In other words, in the case of the example illustrated in FIG. 5, the image encoding device divides and processes the picture P1 in the order of blocks U11, U12, ..., U1$m$, U21, U22, U23, and U24.

The following description will proceed, particularly, with the flow of a series of processes of the image encoding device until decoded image data of the block U23 is generated, and the filter process is performed by the loop filter 24, focusing on an operation when the block U23 is set as a processing target. In this case, the blocks U11 to U1$m$, U21, and U22 are processed blocks, and among the processed blocks, particularly, the blocks U13 and U22 are neighboring blocks of the processing target block U23.

Next, a process flow until decoded image data of one CTU in the picture P1 is generated, and the filter process is performed by the loop filter 24 will be described with reference to FIG. 6 and FIGS. 3 and 4. FIG. 6 is a flowchart illustrating an example of the flow of a series of processes of the image encoding device according to the present embodiment, and particularly illustrates a process flow until decoded image data of one CTU in the picture P1 is generated, and the filter process is performed by the loop filter 24. In this specification, the description will focus on generation of the decoded image data, and a description of a process of perform lossless encoding on the quantized data and generating and outputting the encoded stream is omitted.

(Step S11)

The sorting buffer 11 (see FIG. 3) sorts the images included in the series of image data. After sorting the images according to a GOP (Group of Pictures) structure according to the encoding process, the sorting buffer 11 outputs the image data which has been sorted to the subtraction section 13, the intra prediction section 30, the inter prediction section 35, and the loop filter 24.

The selector 26 reads the decoded image data before the filtering used for the intra prediction from the frame memory 25 and supplies the read decoded image data as reference image data to the intra prediction section 30. Further, the selector 26 reads the filtered decoded image data used for the inter prediction from the frame memory 25 and supplies the read decoded image data as reference image data to the inter prediction section 35.

The intra prediction section 30 performs the intra prediction process in units of PUs formed by dividing the CU based on the supplied original image data and the decoded image data.

At this time, when the block U23 illustrated in FIG. 5 is set as a target of the intra prediction process, the intra prediction section 30 performs the intra prediction process based on the original image data of the block U23 and the decoded image data of the neighboring processed blocks U13 and U22.

The intra prediction section 30 evaluates a prediction result according to each candidate mode in a prediction mode set using a predetermined cost function, and selects the optimum prediction mode based on the evaluation result. The intra prediction section 30 generates the predicted image data according to the optimum prediction mode. Then, the intra prediction section 30 outputs information related to the intra prediction including prediction mode information indicating the selected optimum prediction mode, the cost, and the predicted image data to the selector 27.

The inter prediction section 35 performs the inter prediction process in units of PUs formed by dividing the CU based on the original image data and the decoded image data.

The inter prediction section 35 evaluates a prediction result according to each candidate mode in a prediction mode set using a predetermined cost function, and selects the optimum prediction mode based on the evaluation result. The inter prediction section 35 generates the predicted image data according to the optimum prediction mode. Then, the inter prediction section 35 outputs information related to the inter prediction including prediction mode information indicating the selected optimum prediction mode and the motion information, the cost, and the predicted image data to the selector 27.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost.

(Step S12)

The image data input from the sorting buffer 11 and predicted image data input by the intra prediction section 30 or the inter prediction section 35 are supplied to the subtraction section 13. The subtraction section 13 calculates predicted error data which is a difference between the image data input from the sorting buffer 11 and the predicted image data and outputs the calculated predicted error data to the orthogonal transform section 14.

(Step S13)

The orthogonal transform section 14 performs the orthogonal transform on the prediction error data input from the subtraction section 13. The orthogonal transform section 14 outputs the transform coefficient data acquired by the orthogonal transform process to the quantization section 15.

The transform coefficient data input from the orthogonal transform section 14, and the rate control signal input from the rate control section 18 are supplied to the quantization section 15. The quantization section 15 quantizes the transform coefficient data with the quantization step decided according to the rate control signal. The quantization section 15 outputs the quantized transform coefficient data (that is, the quantized data) to the lossless encoding section 16 and the inverse quantization section 21.

(Step S14)

In the quantization step used by the quantization section 15, the inverse quantization section 21 performs inverse quantization on the quantized data to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the predicted error data. As in the orthogonal transform, the inverse orthogonal transform is performed for each TU. Then, the inverse orthogonal transform section 22 outputs the restored predicted error data to the addition section 23.

(Step S15)

The addition section 23 adds the restored predicted error data input from the inverse orthogonal transform section 22 and the predicted image data input from the intra prediction section 30 or the inter prediction section 35 to thereby generate decoded image data (reconstructed image). Then, the addition section 23 outputs the generated decoded image data to the loop filter 24 and the frame memory 25.

(Step S16)

The decoded image data output to the loop filter 24 is supplied to the deblock filter 200 (see FIG. 4). The deblock filter 200 removes the block distortion of the decoded image data by appropriately performing the deblock filter process. The deblock filter 200 outputs the filter process result to the SAO filter 300.

(Step S17)

The SAO filter 300 decides the SAO mode and the offset value which are applied to the decoded image data filtered by the deblock filter 200 in units of CTUs. Then, the SAO filter 300 performs the filter process (that is, the SAO process) on the decoded image data in units of CTUs based on the decided mode and the offset value. In other words, in an opportunity illustrated in step S17, the SAO process is performed on the processing target block U23 illustrated in FIG. 5.

The SAO filter 300 outputs the decoded image data that has undergone the SAO process to the adaptive loop filter 400. The SAO filter 300 outputs the SAO mode and the offset value decided in units of CTUs (that is, in units of LCUs) to the lossless encoding section 16 as the encoding parameters. Upon receiving this output, the lossless encoding section 16 encodes the supplied SAO mode and the offset value for the generated encoded stream, and then inserts the SAO mode and the offset value into the header region of the encoded stream.

(Step S18)

The adaptive loop filter 400 performs an adaptive loop filter (ALF) process on the decoded image data that has undergone the SAO process and been supplied from the SAO filter 300.

(Step S19)

The adaptive loop filter 400 outputs the filter process result to the frame memory 25. Thus, the decoded image data of the block U23 illustrated in FIG. 5 is generated and stored in the frame memory 25. The decoded image data of the block U23 stored in the frame memory 25 is used, for example, for intra prediction and inter prediction of a block (for example, the block U24) neighboring the block U23 among non-processed blocks illustrated in FIG. 5.

The flow of a series of processes of the image encoding device according to the present embodiment has been described above with reference to FIGS. 5 and 6.

2-4. SAO Filter

<<2-4-1. Exemplary Configuration of SAO Filter>>

Figure 7:
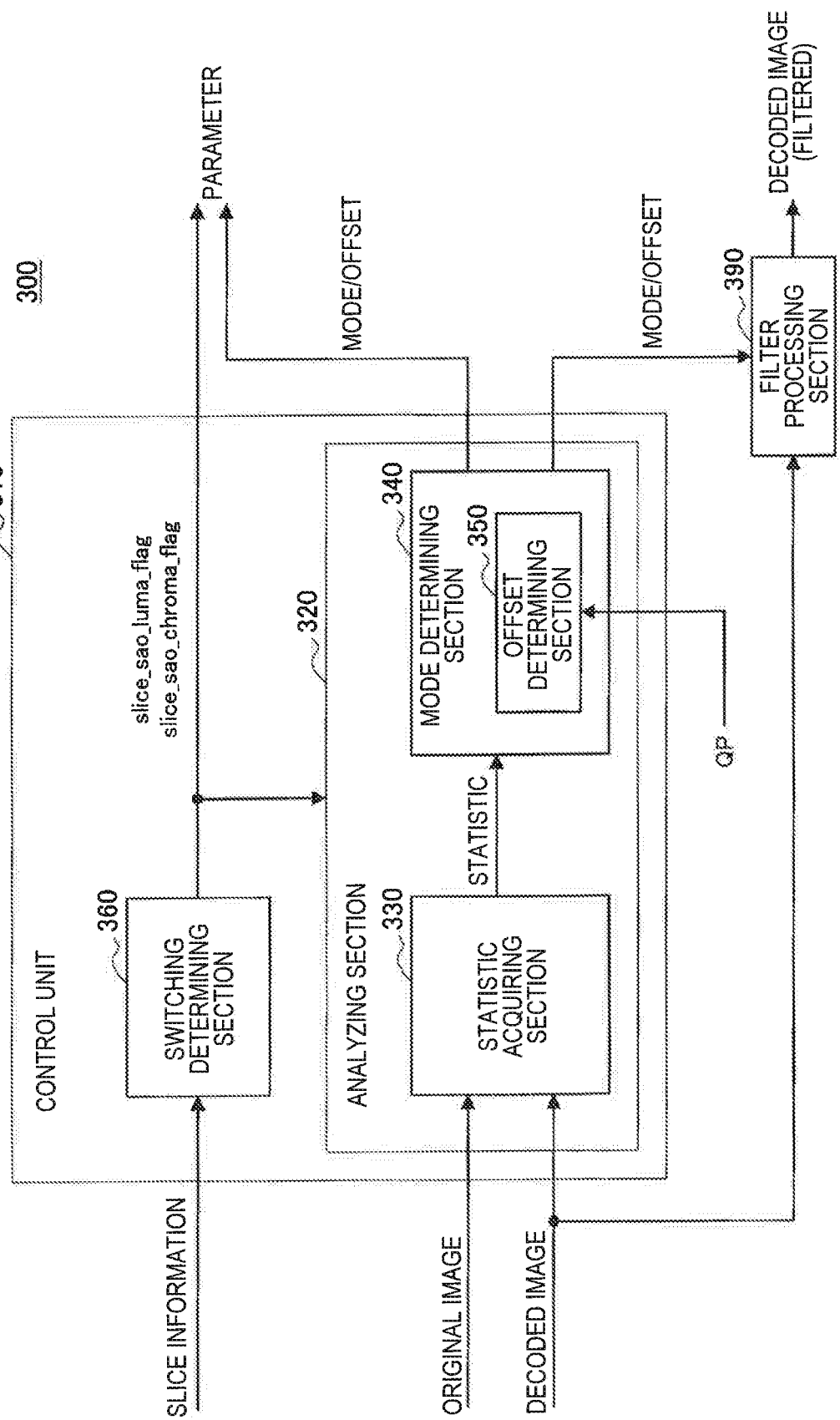
FIG. 7 is a block diagram illustrating an example of a configuration of an SAO filter according to the same embodiment.

Next, the SAO filter 300 according to the present embodiment will be described in detail. First, an example of a configuration of the SAO filter 300 according to the present embodiment will be described with reference to FIG. 7. FIG. 7 is a block diagram illustrating an example of a configuration of the SAO filter 300 according to the first embodiment.

As illustrated in FIG. 7, the SAO filter 300 according to the present embodiment includes a control unit 310 and a filter processing section 390. The control unit 310 includes an analyzing section 320 and a switching determining section 360. The control unit 310 corresponds to an example of a "setting section".

The switching determining section 360 determines whether or not the SAO process is applied to luminance and chrominance in units of slices of the decoded image data, and controls the operation of the analyzing section 320 based on the determination result.

Specifically, when the slice of the processing target is either of the I slice and the P slice, the switching determining section 360 instructs the analyzing section 320 to apply the SAO process to the slice.

Further, when the slice of the processing target is the B slice, the switching determining section 360 determines whether or not the SAO process is applied to the B slice according to the number of CTUs to which the SAO process is applied (hereinafter also referred to as the "number of modes") in the immediately previous slice (that is, the I slice or the P slice) of the B slice.

As a specific example, when the number of modes in the immediately previous slice is equal to or larger than a predetermined threshold value TH11 (for example, equal to or larger than half), the switching determining section 360 instructs the analyzing section 320 to apply the SAO process to the B slice of the processing target. On the other hand, when the number of modes in the immediately previous slice is less than the threshold value TH11, the switching determining section 360 instructs the analyzing section 320 to restrict application of the SAO process to the B slice of the processing target (that is, not to apply the SAO process to the B slice of the processing target).

The switching determining section 360 outputs information indicating whether or not the SAO process is applied in units of slices to the lossless encoding section 16 as the encoding parameter. Examples of a parameter used for controlling whether or not the SAO process is applied in units of slices include "slice_sao_luma_flag" corresponding to luminance and "slice_sao_chroma_flag" corresponding to chrominance.

The analyzing section 320 includes a statistic acquiring section 330 and a mode determining section 340. The analyzing section 320 decides the SAO mode for performing the SAO process and the offset value in units of CTUs (that is, in units of LCUs) based on the original image data held in the original image holding section 100 (see FIG. 4) and the decoded image data output from the deblock filter 200. It is controlled whether or not the process of the analyzing section 320 is applied in units of slices based on an instruction given from the switching determining section 360. The components of the analyzing section 320 will be described below in detail.

The statistic acquiring section 330 calculates a statistic for specifying the SAO mode and the offset based on the original image data and the decoded image data.

As a specific example, the statistic acquiring section 330 analyzes a correspondence relation between the target pixel and the neighboring pixel in units of pixels in the decoded image data for each of the classes EO_0 to EO_3 of the edge offset illustrated in FIG. 1, and adds up the appearance frequencies of the categories 0 to 4. At this time, the statistic acquiring section 330 cumulatively adds up a difference in the pixel value between the decoded image data and the original image data for each category which is added up. Then, the statistic acquiring section 330 calculates the appearance frequencies of the categories 0 to 4 added up for the classes EO_0 to EO_3 and the pixel value cumulatively added up for each category as the statistic.

The statistic acquiring section 330 adds up a frequency of a corresponding pixel for each of the bands 0 to 31 of the band offset illustrated in FIG. 2, and cumulatively adds up the difference in the pixel value between the decoded image data and the original image data in the pixel for each band. Then, the statistic acquiring section 330 calculates the frequency added up for each band and the difference in the pixel value cumulatively added up for each band as the statistic.

The statistic acquiring section 330 outputs the statistic calculated as described above to the mode determining section 340.

The mode determining section 340 includes an offset determining section 350. The mode determining section 340 causes the offset determining section 350 to calculate the offset value and the cost corresponding to the offset value for each SAO mode in units of CTUs in the decoded image data based on the statistic supplied from the statistic acquiring section 330.

Specifically, the mode determining section 340 causes the offset determining section 350 to calculate the offset value and the cost corresponding to the offset value for each of combinations of the classes EO_0 to EO_3 and the categories 1 to 4 of the edge offset. Similarly, the mode determining section 340 causes the offset determining section 350 to calculate the offset value and the cost corresponding to the offset value for each of the bands of the band offset. The mode determining section 340 also calculates the cost when the SAO process is not applied.

The offset determining section 350 calculates the costs for candidates of the offset value for the mode instructed from the mode determining section 340. Then, the offset determining section 350 compares the calculated costs, and specifies the offset value in which the coding efficiency can be most improved and the cost corresponding to the offset value. The offset determining section 350 will be separately described later.

The mode determining section 340 compares the costs calculated for the respective SAO modes, and specifies the SAO mode in which the coding efficiency can be most improved and the offset value corresponding to the mode in units of CTUs (that is, in units of LCUs) based on the comparison result. Then, the mode determining section 340 outputs the mode specified in units of CTUs and the offset value corresponding to the mode to the filter processing section 390 which will be described later. At this time, when the SAO process is determined not to be applied as a result of comparing the costs, the mode determining section 340 instructs the filter processing section 390 not to apply the SAO process to the target CTU.

The mode determining section 340 outputs the SAO mode and the offset value specified in units of CTUs to the lossless encoding section 16 as the encoding parameters. As the encoding parameter, for example, as a parameter indicating one of the edge offset and the band offset, there is "sao_type_idx_luma" corresponding to luminance or "sao_typ_idx_chroma" corresponding to chrominance. Further, when the edge offset is applied, as a parameter indicating the class of the edge offset, there is "sao_eo_class_luma" corresponding to luminance or "sao_eo_class_chroma" corresponding to chrominance. Further, when the band offset is applied, as a parameter indicating the position of the band, there is "sao_band_position." As a parameter for notifying of the offset value, there are "sao_offset_abs" indicating an absolute value of the offset value and "sao_offset_sign" indicating a positive or negative offset value.

The filter processing section 390 performs the SAO process on each CTU of the decoded image data based on the SAO mode and the offset value supplied from the mode determining section 340. When an instruction not to apply the SAO process is received from the mode determining section 340, the filter processing section 390 does not perform the SAO process on the target CTU. It will be appreciated that, similarly for the slice to which the SAO process is determined not to be applied based on the determination result of the switching determining section 360, the filter processing section 390 does not perform the SAO process on the corresponding slice based on the determination result.

Then, the filter processing section 390 outputs the decoded image data that has been subject to the SAO process to the adaptive loop filter 400 (see FIG. 4).

<<2-4-2. Process Flow of SAO Filter>>

Figure 8:
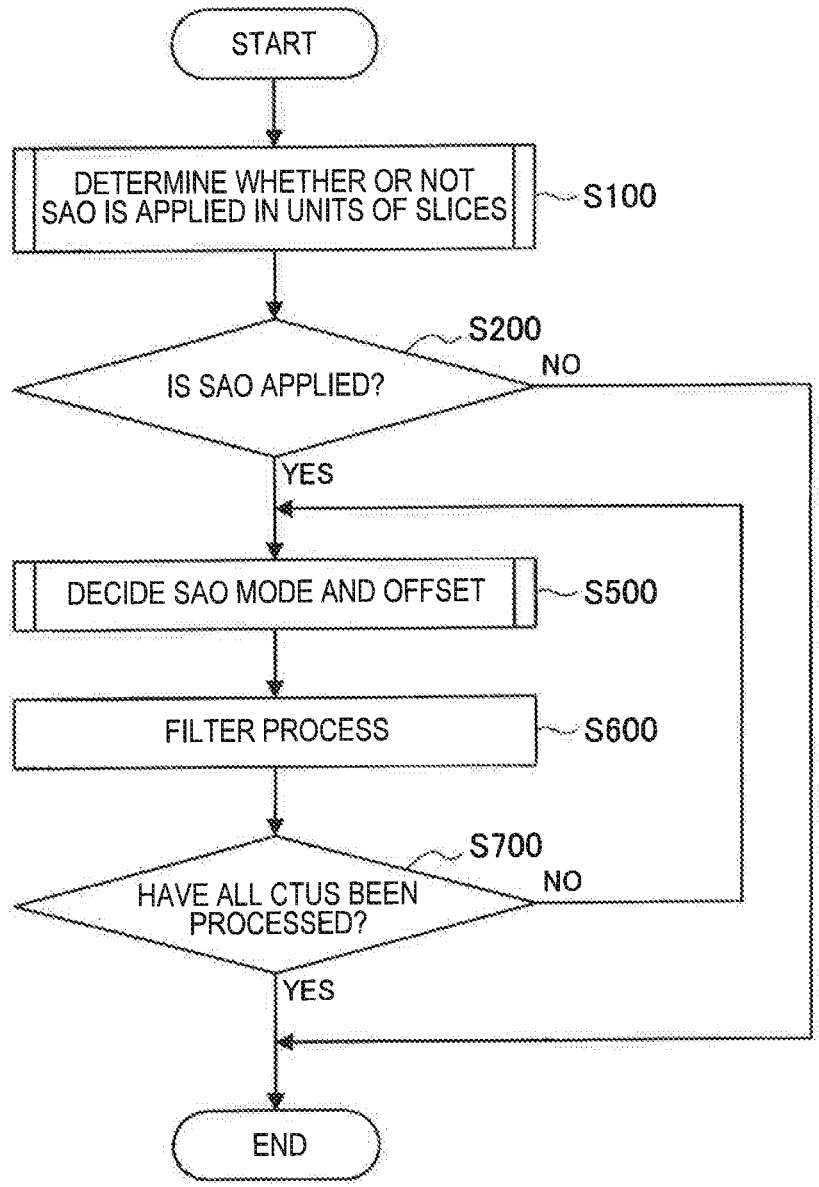
FIG. 8 is a flowchart illustrating an example of the flow of a series of processes of an SAO filter according to the same embodiment.

Next, the flow of a series of processes of the SAO filter according to the present embodiment will be described with reference to FIG. 8. FIG. 8 is a flowchart illustrating an example of the flow of a series of processes of the SAO filter according to the present embodiment.

(Step S100)

First, the switching determining section 360 determines whether or not the SAO process is applied to luminance and chrominance in units of slices of the decoded image data, and controls the operation of the analyzing section 320 based on the determination result. An operation of determining whether or not the SAO process is applied through the switching determining section 360 will be separately described later.

(Step S500)

When the SAO process is determined to be applied to the slice (YES in step S200), the analyzing section 320 decides the SAO mode for performing the SAO process and the offset value in units of CTUs based on the original image data and the decoded image data (that has undergone the deblock filter process).

Specifically, the statistic acquiring section 330 calculates a statistic for specifying the SAO mode and the offset based on the original image data and the decoded image data, and outputs the calculated statistic to the mode determining section 340.

The mode determining section 340 causes the offset determining section 350 to calculate the cost for values applicable as the offset value for the respective SAO modes in units of CTUs in the decoded image data based on the statistic supplied from the statistic acquiring section 330.

The mode determining section 340 compares the costs that are calculated for the respective SAO modes, and specifies the SAO mode in which the coding efficiency can be most improved in units of CTUs (that is, in units of LCUs) based on the comparison result. Then, the mode determining section 340 outputs the mode specified in units of CTUs and the offset value corresponding to the mode to the filter processing section 390 which will be described later. The mode determining section 340 outputs the SAO mode and the offset value specified in units of CTUs to the lossless encoding section 16 as the encoding parameter.

(Step S600)

The filter processing section 390 performs the SAO process on each CTU of the decoded image data based on the SAO mode and the offset value supplied from the mode determining section 340.

(Step S700)

The above process is performed on a series of CTUs in the target slice (NO in step S700), and when the process on the series of CTU is completed (YES in step S700), the application of the SAO process to the target slice is completed.

(Step S200)

Further, when the SAO process is not applied to the target slice (NO in step S200), the process of steps S300 to S700 is not performed on the slice.

Figure 9:
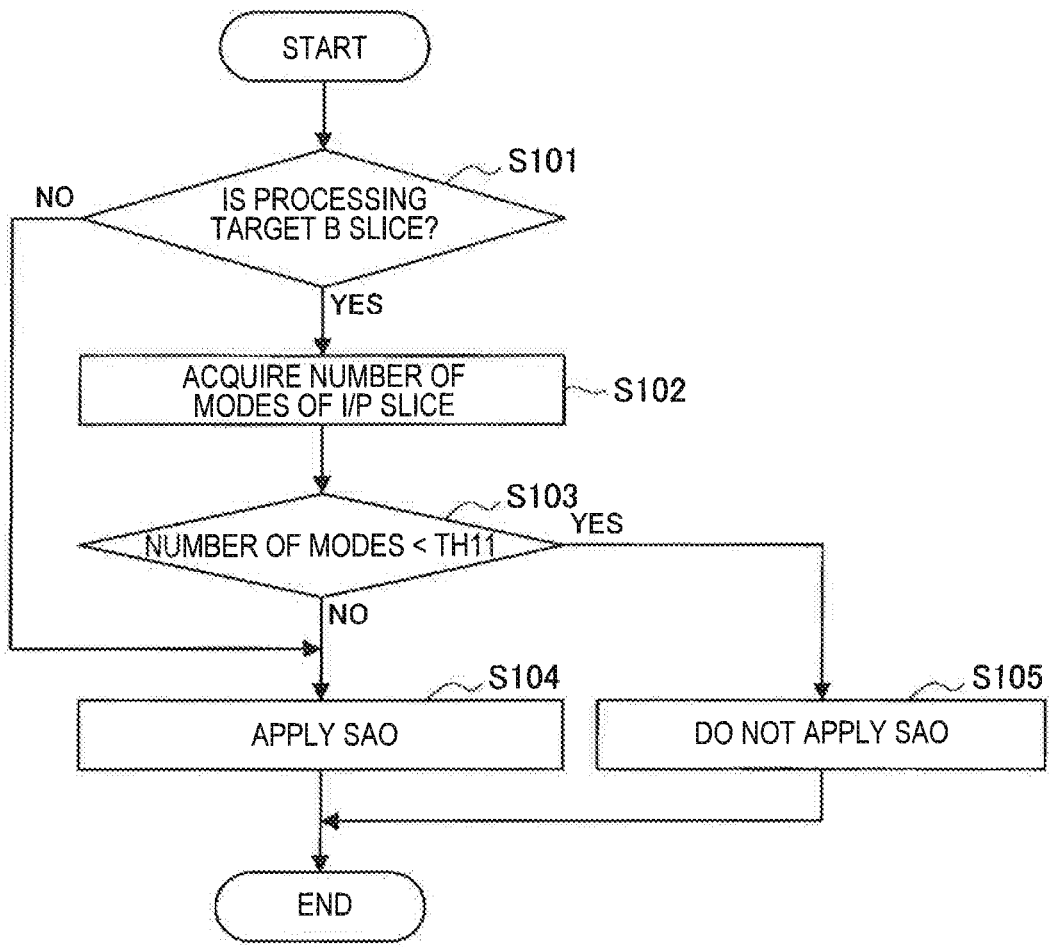
FIG. 9 is a flowchart illustrating an example of a process related to determination as to whether or not an SAO process is applied for each slice through a switching determining section according to the same embodiment.

Next, the process of step S100 in FIG. 8, that is, an example of the process of determining whether or not the SAO process is applied in units of slices through the switching determining section 360, will be described with reference to FIG. 9. FIG. 9 is a flowchart illustrating an example of the process of determining whether or not the SAO process is applied in units of slices through the switching determining section according to the present embodiment.

(Steps S101 and S104)

When the slice of the processing target is not the B slice, that is, when the slice of the processing target is either of the I slice and the P slice (NO in step S101), the switching determining section 360 instructs the analyzing section 320 to apply the SAO process to the slice (step S104).

(Steps S101 and S102)

When the slice of the processing target is the B slice (YES in step S101), the switching determining section 360 acquires the number of CTUs (the number of modes) to which the SAO process is applied in the immediately previous slice (that is, the I slice or the P slice) of the B slice (step S102).

(Steps S103 and S104)

When the acquired number of modes is equal to or larger than the predetermined threshold value TH11 (NO in step S103), the switching determining section 360 instructs the analyzing section 320 to apply the SAO process to the slice (step S104).

(Steps S103 and S105)

On the other hand, when the acquired number of modes is less than the 26 predetermined threshold value TH11 (YES in step S103), the switching determining section 360 instructs the analyzing section 320 to restrict application of the SAO process to the slice (that is, not to apply the SAO process to the slice) (step S105).

As a result, the switching determining section 360 determines whether or not the SAO process is applied for each slice, and controls the operation of the analyzing section 320 based on the determination result.

The example of the flow of the series of processes of the SAO filter 300 according to the present embodiment has been described above with reference to FIGS. 8 and 9.

2-5. Offset Determining Section

Next, the offset determining section 350 will be described in detail. The offset determining section 350 calculates the costs for the values applicable as the offset value based on the statistic generated by the statistic acquiring section 330, compares the calculated costs, and specifies the offset value in which the coding efficiency can be most improved.

As described above, in H.265/HEVC, 8 bits (the pixel value is 0 to 255) and bits (the pixel value is 0 to 1023) can be used as the bit depth of the pixel, and the applicable candidates of the offset value differ according to the bit depth. Specifically, when the bit depth is 8 bits, the applicable value of the offset value is 0 to 7, and when the bit depth is 10 bits, the applicable value of the offset value is 0 to 31.

For this reason, in the scheme according to the related art, when the bit depth of the pixel is 10 bits, the number of candidates of the offset value is four times as large as when the bit depth is 8 bits, and thus the processing amount of the cost calculation may increase, leading to the increase in the circuit size and the power consumption. In this regard, in this specification, in order to facilitate understanding of the characteristics of the offset determining section 350 according to the present embodiment, first, an overview of an offset determining section based on the scheme according to the related art will be described as a comparative example, and then the offset determining section 350 according to the present embodiment will be described.

<<2-5-1. Comparative Example of Offset Determining Section>>

Figure 12:
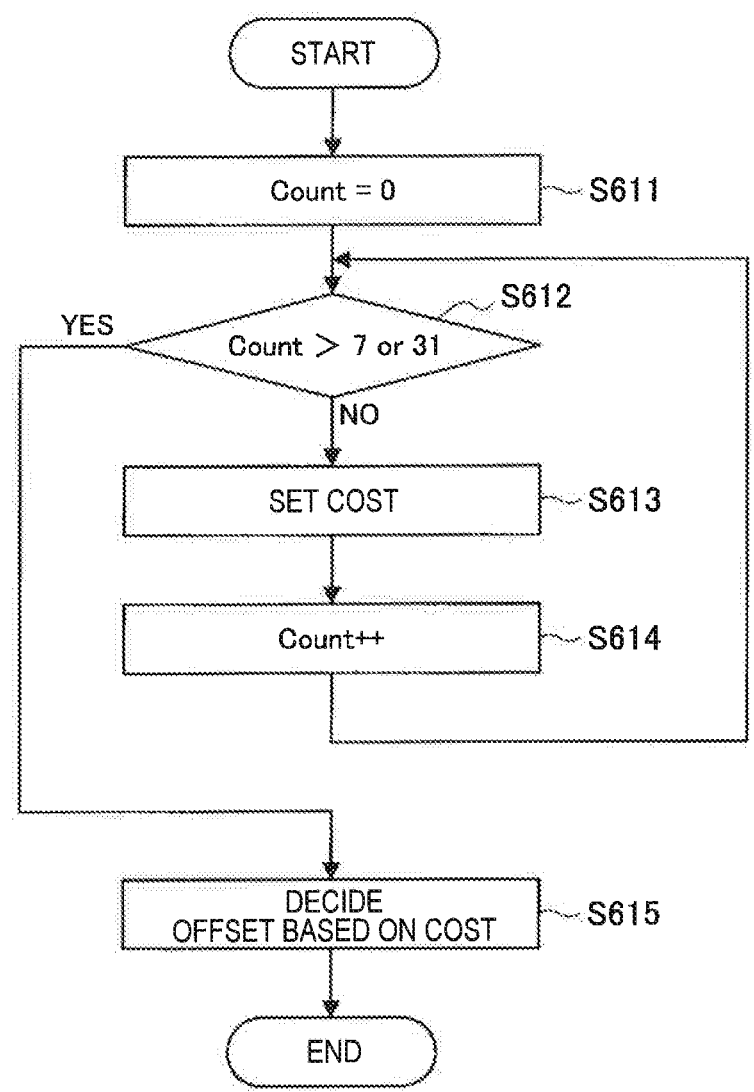
FIG. 12 is a flowchart illustrating an example of the flow of a series of processes of an offset determining section according to the comparative example.

An offset determining section according to a comparative example will be described with reference to FIGS. 10 to 12. Hereinafter, when the offset determining section according to the comparative example is explicitly distinguished from the offset determining section 350 according to the present embodiment, the offset determining section according to the comparative example is also referred to as an "offset determining section 350a."

First, an example of a configuration of the offset determining section 350a according to the comparative example will be described with reference to FIG. 10. FIG. 10 is a block diagram illustrating an example of a configuration of the offset determining section 350a according to the comparative example.

Figure 10:
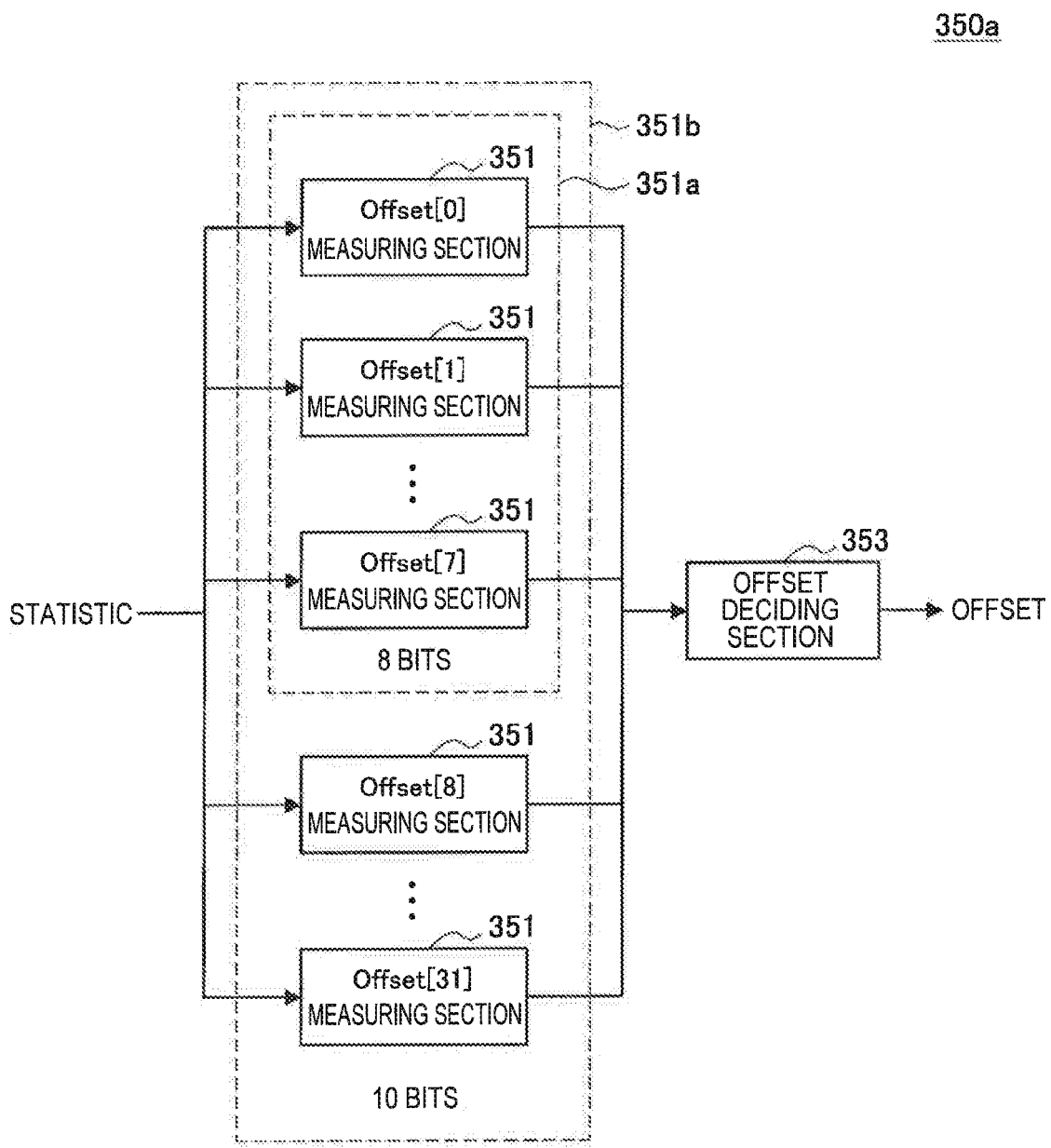
FIG. 10 is a block diagram illustrating an example of a configuration of an offset determining section according to a comparative example.

As illustrated in FIG. 10, the offset determining section 350a includes one or more offset measuring sections 351 and an offset deciding section 353.

The offset measuring section 351 calculates the cost when the offset value is applied for each offset value based on the statistic generated by the statistic acquiring section 330 (for example, the appearance frequency of the pixel serving as the processing target or the difference in the pixel value between the decoded image data and the original image data). At this time, as the calculated cost, for example, there is a data amount required for the offset process based on each offset value (that is, a data amount to be transmitted to a decoder side) in order to approximate to the original image data by alleviating an error with the original image data generated in the decoded image data (for example, the quantization error). A detailed description of specific content of the cost calculation is omitted in this specification.

In the example illustrated in FIG. 10, an Offset[0] measuring section to an Offset[31] measuring section are provided as the offset measuring section 351 in order to calculate the cost for the offset values 0 to 31 when the bit depth is 10 bits in parallel.

For example, a table denoted by reference numeral d40 in FIG. 11 illustrates a correspondence relation between the offset measuring sections 351 (that is, the Offset[0] measuring section to the Offset[31] measuring section) illustrated in FIG. 10 and the offset values. As illustrated in FIG. 11, the Offset[0] measuring section calculates the cost when the offset value is 0. Similarly, the Offset[1] measuring section to the Offset[31] measuring section are associated with the offset values 1 to 31.

In other words, in the example illustrated in FIG. 10, when the bit depth is 8 bits, the Offset[0] measuring section to the Offset[7] measuring section denoted by reference numeral 351a among the Offset[0] measuring section to the Offset[31] measuring section are used. Further, when the bit depth is 10 bits, all of the Offset[0] measuring section to the Offset[31] measuring section denoted by reference numeral 351b are used.

The offset deciding section 353 compares the costs calculated by the offset measuring sections 351, and decides the offset value in which the cost is lowest among the candidates of the offset value based on the comparison result. Then, the offset deciding section 353 outputs the decided offset value and the cost corresponding to the offset value. Upon receiving this output, the mode determining section 340 (see FIG. 7) compares the costs calculated for the respective SAO modes, and specifies the SAO mode in which the coding efficiency can be most improved and the offset value corresponding to the mode in units of CTUs (that is, in units of LCUs) based on the comparison result.

Next, an example of the flow of a series of processes the offset determining section 350a according to the comparative example will be described with reference to FIG. 12. FIG. 12 is a flowchart illustrating an example of the flow of a series of processes of the offset determining section 350a according to the comparative example.

(Steps S611 to S614)

First, the offset determining section 350a initializes Count serving as a counter value to 0 (step S611). Then, the cost is calculated for the candidates of the offset value indicated by the counter value Count. For example, when the counter value Count is 0, the offset determining section 350a calculates the cost of the offset value "0." At this time, in the case of the example illustrated in FIG. 10, the Offset[0] measuring section among the offset measuring sections 351 calculates the cost of the offset value "0." Similarly, when the counter value Count is 1, the offset determining section 350a calculates the cost of the offset value "1" (step S613). When the cost calculation is completed, the offset determining section 350a increments the counter value Count (step S614).

As described above, the offset determining section 350a calculates the costs for the offset values according to the bit depth of the pixel (NO in step S612). For example, when the bit depth is 8 bits, the offset determining section 350a calculates the costs for the offset values "0" to "7." Further, when the bit depth is 10 bits, the offset determining section 350a calculates the costs for the offset values "0" to "31."

(Step S615)

When the cost calculation of the counter values according to the bit depth is completed (YES in step S612), the offset determining section 350a compares the calculated costs for the offset values, and decides the offset value in which the cost is lowest based on the comparison result.

As described above with reference to FIGS. 10 to 12, when the bit depth of the pixel is 8 bits, the applicable value of the offset value is 0 to 7, and the offset determining section 350a performs the cost calculation eight times for the offset values 0 to 7. Further, when the bit depth is 10 bits, the applicable value of the offset value is 0 to 31, and thus the offset determining section 350*a* performs the cost calculation 32 times for the offset values 0 to 31.

In other words, when the bit depth of the pixel is 10 bits, the number of candidates of the offset value is four times as large as when the bit depth is 8 bits, and thus the processing amount of the cost calculation is four times as large as when the bit depth is 8 bits as well. Thus, when an image in which the bit depth is 10 bits is the processing target, as described above with reference to FIG. 12, the number of cost calculations of the offset value (the processing amount) is four times as large as when the bit depth is 8 bits, leading to the increase in the power consumption.

Further, when the image in which the bit depth is 10 bits is the processing target, as illustrated in FIG. 10, the number of offset measuring sections 351 (that is, the Offset[0] measuring section to the Offset[31] measuring section) is four times as large as when the bit depth is 8 bits, and thus the circuit size is usually increased. Further, when the image in which the bit depth is 10 bits is the processing target, the circuits that are additionally necessary for calculating the costs of the offset values 8 to 31, that is, the Offset[8] measuring section to the Offset[31] measuring section, are not used when the bit depth of the pixel is 8 bits. In other words, the Offset[8] measuring section to the Offset[31] measuring section are redundant components if the image in which the bit depth of the pixel is 8 bits is set as the processing target.

In this regard, the offset determining section 350 according to the present embodiment restricts the candidates of the offset value among the values (that is, 0 to 31) applicable as the offset value when the bit depth is 10 bits, and specifies the offset value to be applied among the restricted candidates. Through this configuration, the offset determining section 350 according to the present embodiment causes the processing amount for the cost calculation of the offset values when the bit depth is 8 bits to be equal to that when the bit depth is 10 bits, and thus reduces the circuit size or the power consumption. In this regard, the offset determining section 350 according to the present embodiment will be described below in detail.

<<2-5-2. Exemplary Configuration of Offset Determining Section>>

Figure 13:
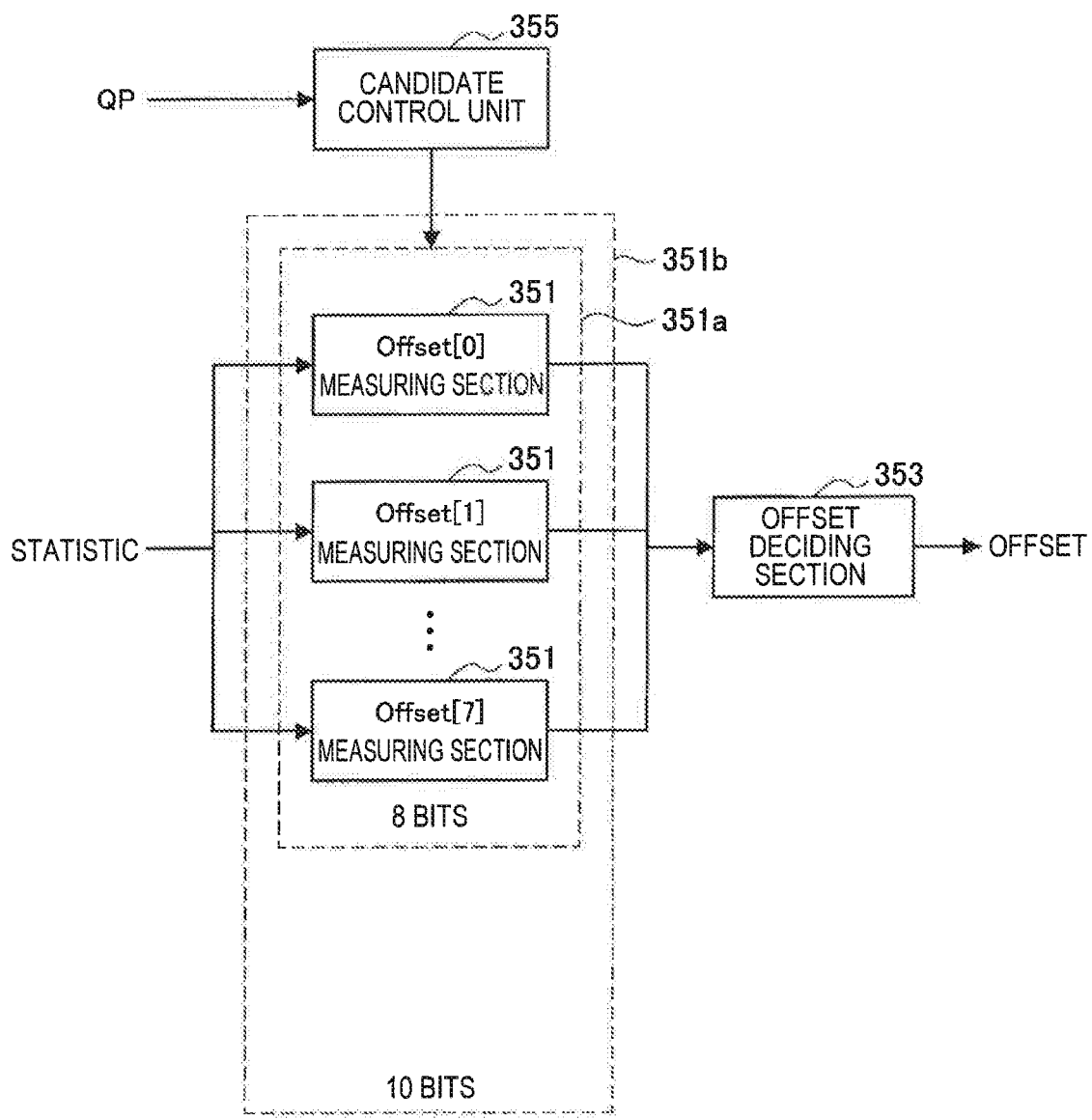
FIG. 13 is a block diagram illustrating an example of a configuration of an offset determining section according to the same embodiment.

First, an example of a configuration of the offset determining section 350 according to the present embodiment will be described with reference to FIG. 13. FIG. 13 is a block diagram illustrating an example of a configuration of the offset determining section 350 according to the first embodiment.

As illustrated in FIG. 13, the offset determining section 350 according to the present embodiment differs from the offset determining section 350*a* according to the comparative example illustrated in FIG. 10 in that a candidate control unit 355 is provided, and only the Offset[0] measuring section to the Offset[7] measuring section are provided as the offset measuring section 351. Thus, in this specification, a configuration of the offset determining section 350 according to the present embodiment will be described focusing on different portions from the offset determining section 350*a*.

The candidate control unit 355 decides the candidates of the offset value based on the bit depth of the pixel and the quantization step (QP) used for generating the quantized data serving as the decoding source of the decoded image data, and allocates the decided candidates to the Offset[0] measuring section to the Offset[7] measuring section. The acquisition source of the quantization step is not particularly limited as described above. As a specific example, the candidate control unit 355 may acquire the quantization step applied when the quantization section 15 generates the quantized data serving as the decoding source of the decoded image data from the quantization section 15.

Here, a tendency of a relation between the quantization step and the offset value applied for the SAO process will be described. Generally, when the quantized data is generated by quantizing the transform coefficient data (the prediction error data after the orthogonal transform), as the quantization step decreases, the difference between the original image data and the decoded image data tends to decrease (that is, the quantization error tends to decrease). Thus, when the quantization step is small, a relatively small value is often selected as the offset value applied for the SAO process.

Further, when the pixel value of the image changes (for example, in the case of an image in which texture is fine), a large quantization step tends to be selected. Further, as the quantization step increases, the difference between the original image data and the decoded image data tends to increase (that is, the quantization error tends to increase). As described above, when the quantization error is large, it is common for the difference in the calculated cost not to change significantly between neighboring candidates even if the costs for the candidates of the offset value are calculated.

Using such a trend, the candidate control unit 355 restricts the candidates of the offset value among the values applicable as the offset value when the bit depth of the pixel is 10 bits (that is, 0 to 31) based on the quantization step. Then, the candidate control unit 355 allocates the restricted candidates of the offset value to the Offset[0] measuring section to the Offset[7] measuring section.

Here, an example of a correspondence relation between the candidates of the offset value and the Offset[0] measuring section to the Offset[7] measuring section will be described with reference to FIGS. 14 to 16. FIGS. 14 to 16 are explanatory views for describing examples of a control table indicating the correspondence relation between the candidates of the offset value and the Offset[0] measuring section to the Offset[7] measuring section. In FIGS. 14 to 16, a constant N (N is an integer of $0 \le N$) is a value that is set according to the number of candidates of the offset value according to the number of candidates of the offset value (that is, the number of offset measuring sections 351), and N+1 corresponds to the number of candidates of the offset value.

For example, a control table d51 illustrated in FIG. 14 corresponds to either a case in which the bit depth of the pixel is 8 bits or a case in which the bit depth of the pixel is 10 bits, and the quantization step is less than a first threshold value TH21 (QP<TH21).

In the control table d51 illustrated in FIG. 14, 0 to N are associated with the Offset[0] measuring section to the Offset [N] measuring section as the candidates of the offset value. In other words, when the candidates of the offset value are allocated to the offset measuring sections 351 based on the control table d51, the candidate control unit 355 allocates "i" to the Offset[i] measuring section (i is an integer of $0 \le i \le N$) as the offset value. For example, when N=7, as illustrated in FIG. 13, 0, 1, . . . , and 7 are allocated to the Offset[0] measuring section, the Offset[1] measuring section, . . . , and the Offset[7] measuring section as the candidates of the offset value.

Next, a control table d52 illustrated in FIG. 15 will be described. The control table d52 corresponds to a case in which the bit depth of the pixel is 10 bits, and the quantization step is larger than the first threshold value TH21 and equal to or less than a second threshold value TH22 (TH21<QP≤TH22). It will be appreciated that the second threshold value TH22 is a value larger than the first threshold value TH21.

In the control table d52 illustrated in FIG. 15, 0 to 2×N are associated with the Offset[0] measuring section to the Offset [N] measuring section as the candidates of the offset value. In other words, when the candidates of the offset value are allocated to the offset measuring sections 351 based on the control table d52, the candidate control unit 355 allocates "2×i" to the Offset[i] measuring section (i is an integer of 0≤i≤N) as the offset value. For example, when N=7, as illustrated in FIG. 15, 0, 2, . . . , and 14 are allocated to the Offset[0] measuring section, the Offset[1] measuring section, . . . , and the Offset[7] measuring section as the candidates of the offset value.

Next, a control table d53 illustrated in FIG. 16 will be described. The control table d53 corresponds to a case in which the bit depth of the pixel is 10 bits, and the quantization step is larger than the second threshold value TH22 (TH22<QP).

In the control table d53 illustrated in FIG. 14, 0 to 4×N are associated with the Offset[0] measuring section to the Offset [N] measuring section as the candidates of the offset value. In other words, when the candidates of the offset value are allocated to the offset measuring sections 351 based on the control table d52, the candidate control unit 355 allocates "4×i" to the Offset[i] measuring section (i is an integer of 0≤i≤N) as the offset value. For example, when N=7, as illustrated in FIG. 16, 0, 4, . . . , and 28 are allocated to the Offset[0] measuring section, the Offset[1] measuring section, . . . , and the Offset[7] measuring section as the candidates of the offset value.

As described above, the candidate control unit 355 selects any one of the control tables d51 to d53 based on the bit depth of the pixel and the acquired quantization step, and allocates the candidates of the offset value to the Offset[0] measuring section to the Offset[7] measuring section according to the selected control table.

Specifically, when the bit depth of the pixel is 10 bits, the candidate control unit 355 performs a setting such that, as the quantization step decreases, the maximum value of the candidates of the offset value decreases, and an interval between neighboring candidates (that is, a difference between neighboring candidates) becomes smaller. Further, when the bit depth of the pixel is 10 bits, the candidate control unit 355 performs a setting such that, as the quantization step increases, the maximum value of the candidates of the offset value increases, and an interval between neighboring candidates (that is, a difference between neighboring candidates) becomes larger. Through this configuration, the candidate control unit 355 can restrict the number of candidates of the offset value when the bit depth of the pixel is 10 bits to the number of candidates of the offset value when the bit depth of the pixel is 8 bits (the range of the value applicable as the offset value when the bit depth of the pixel is 8 bits).

The values of the first threshold value TH21 and the second threshold value TH22 are preferably decided in advance by an experiment performed according to a configuration of the image encoding device or various kinds of parameters (for example, the resolution of the original image data and the like). The above-described configuration is merely an example, and the number of offset measuring sections 351 or the number of control tables for specifying the candidates of the offset value may be appropriately changed. Of course, when the number of offset measuring sections 351 or the number of control tables is changed, it is desirable to set an appropriate value decided based on an experiment or the like in advance to the candidates of the offset value set in the respective control tables or the threshold value for switching the control tables in advance.

The subsequent process is similar to the process of the offset determining section 350a according to the comparative example. In other words, the offset measuring sections 351 (that is, the Offset[O] measuring section to the Offset[7] measuring section) calculate the costs for the allocated candidates of the offset value, and output the costs to the offset deciding section 353.

The offset deciding section 353 compares the costs calculated by the offset measuring sections 351, and decides the offset value in which the cost is lowest among the candidates of the offset value based on the comparison result. Then, the offset deciding section 353 outputs the decided offset value and the cost corresponding to the offset value. Upon receiving this output, the mode determining section 340 (see FIG. 7) compares the costs calculated for the respective SAO modes, and specifies the SAO mode in which the coding efficiency can be most improved and the offset value corresponding to the mode in units of CTUs (that is, in units of LCUs) based on the comparison result.

The example of the configuration of the offset determining section 350 according to the present embodiment has been described above with reference to FIGS. 13 to 16. Through the above-described configuration, the offset determining section 350 according to the present embodiment can restrict the processing amount of the cost calculation when the bit depth of the pixel is 10 bits to the processing amount when the bit depth of the pixel is 8 bits. Thus, even when the bit depth is bits, the offset determining section 350 according to the present embodiment can decide the offset value using the same configuration as when the bit depth of the pixel is 8 bits (that is, the Offset[0] measuring section to the Offset [7] measuring section) as the offset measuring section 351. In other words, according to the offset determining section 350 according to the present embodiment, the circuit size can be reduced to be smaller than in the offset determining section 350a according to the comparative example. Further, with the reduction in the processing amount of the cost calculation, the offset determining section 350 according to the present embodiment can reduce the power consumption to be lower than in the offset determining section 350a according to the comparative example.

The configuration of the offset determining section 350 described above with reference to FIG. 13 is merely an example, and the present disclosure is not necessarily limited to the configuration illustrated in FIG. 10. For example, the offset determining section 350 according to the present embodiment may include the Offset[0] measuring section to the Offset[31] measuring section as the offset measuring section 351, and the offset determining section 350 may be configured to perform switching between a mode in which some of the Offset[0] measuring section to the Offset[31] measuring section are used as the offset measuring section 351 and a mode in which all the Offset[0] measuring section to the Offset[31] measuring section are used as the offset measuring section 351.

For example, when it is powered by a battery, and it is necessary to restrict the power consumption, only the Offset [0] measuring section to the Offset[7] measuring section may be used as the offset measuring section 351 as described above. Further, for example, when it is powered by a power source, and it is possible to further improve the processing amount, the operation may be performed with all of the Offset[0] measuring section to the Offset[31] measuring section used as the offset measuring section 351, similarly to the offset determining section 350a according to the comparative example. As described above, the offset measuring section 351 according to the present embodiment may be configured to perform switching to the mode in which some of the offset measuring sections 351 may be used according to a predetermined condition, for example, a situation in which the image encoding device operates and thus reduce the processing amount of the cost calculation.

<<2-5-3. Process Flow of Offset Determining Section>>

Figure 17:
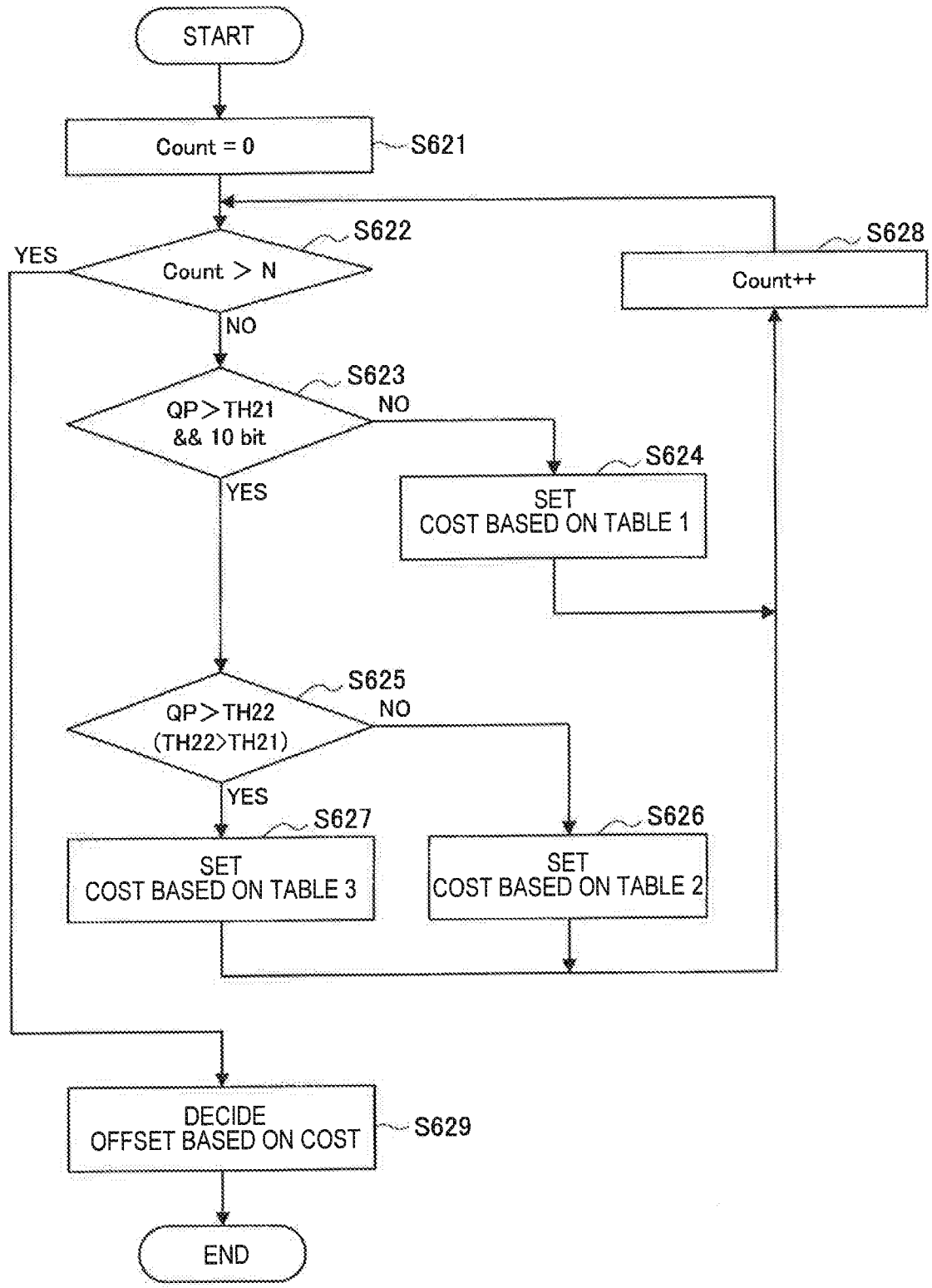
FIG. 17 is a flowchart illustrating an example of the flow of a series of processes of an offset determining section according to the same embodiment.

Next, an example of the flow of a series of processes of the offset determining section 350 according to the present embodiment will be described with reference to FIG. 17. FIG. 17 is a flowchart illustrating an example of the flow of a series of processes of the offset determining section 350 according to the present embodiment. In FIG. 17, a constant N (N is an integer of 0≤N) is a value that is set according to the number of candidates of the offset value (that is, the number of offset measuring sections 351) as described above, and N+1 corresponds to the number of candidates of the offset value.

(Step S621)

First, the offset determining section 350 initializes Count serving as the counter value to 0 (step S611). Then, the cost is calculated for the candidates of the offset value indicated by the counter value Count. At this time, the offset determining section 350 restricts the candidates of the offset value based on the bit depth of the pixel and the quantization step (QP) used for generating the quantized data serving as the decoding source of the decoded image data.

(Steps S623 and S624)

Specifically, when the bit depth of the pixel is 8 bits or when the bit depth of the pixel is 10 bits, and the quantization step is equal to or less than the first threshold value TH21 (QP≤TH21) (NO in step S623), the offset determining section 350 selects a table 1 corresponding to this condition. As a specific example of the table 1, the control table d51 illustrated in FIG. 14 is used.

Then, the offset determining section 350 specifies the candidates of the offset value indicated by the counter value Count based on the selected table 1, and calculates the cost for the specified candidate. In this case, when the counter value Count=i (i is an integer of 0≤i≤N), "i" is specified as the candidates of the offset value.

(Step S625)

Further, when the bit depth of the pixel is 10 bits, and the quantization step is larger than the first threshold value TH21 (YES in step S624), the offset determining section 350 determines whether or not the quantization step is larger than the second threshold value TH22 (TH22>TH21).

(Step S626)

When the quantization step is equal to or less than the second threshold value TH22 (NO in step S625), the offset determining section 350 selects a table 2 corresponding to this condition. As a specific example of the table 2, the control table d52 illustrated in FIG. 15 is used.

Then, the offset determining section 350 specifies the candidates of the offset value indicated by the counter value Count based on the selected table 2, and calculates the cost for the specified candidates. In this case, when the counter value Count=i (i is an integer of 0≤i≤N), "2×i" is specified as the candidates of the offset value.

(Step S627)

When the quantization step is larger than the second threshold value TH22 (YES in step S625), the offset determining section 350 selects a table 3 corresponding to this condition. As a specific example of the table 3, the control table d53 illustrated in FIG. 16 is used.

Then, the offset determining section 350 specifies the candidates of the offset value indicated by the counter value Count based on the selected table 3, and calculates the cost for the specified candidates. In this case, when the counter value Count=i (i is an integer of 0≤i≤N), "4×i" is specified as the candidates of the offset value.

(Step S628)

The offset determining section 350 specifies the candidates of the offset value indicated by the counter value Count, and increments the counter value Count when the cost calculation for the specified candidates is completed.

(Step S622)

As described above, the offset determining section 350 specifies the candidates of the offset value and calculates the cost for the specified candidates until the counter value Count is larger than a predetermined constant N (NO in step S622).

(Step S629)

When the candidates of the offset value are specified for each of the counter values Count 0 to N, and the cost calculation for the specified candidates is completed (YES in step S622), the offset determining section 350 compares the costs calculated for the candidates of the offset value. Then, the offset determining section 350 decides the candidate in which the cost is lowest as the offset value based on the comparison result.

The example of the flow of the series of processes of the offset determining section 350 according to the present embodiment has been described above with reference to FIG. 17.

2-6. Conclusion

As described above, in the image encoding device according to the present embodiment, the offset determining section 350 restricts the candidates of the offset value for the SAO process based on the bit depth of the pixel and the quantization step (QP) used for generating the quantized data serving as the decoding source of the decoded image data.

Through this configuration, the offset determining section 350 according to the present embodiment can restrict the processing amount of the cost calculation when the bit depth of the pixel is 10 bits to the processing amount when the bit depth of the pixel is 8 bits. Thus, according to the offset determining section 350 according to the present embodiment, even when the bit depth is 10 bits, the offset value can be decided using the same configuration as when the bit depth of the pixel is 8 bits as the configuration of calculating the costs of the candidates of the offset value. In other words, according to the image encoding device according to the present embodiment, the circuit size of the offset determining section 350 can be reduced to be smaller than when the cost is calculated for each of the applicable offset value when the bit depth of the pixel is 10 bits. Further, in the image encoding device according to the present embodiment, with the reduction of the processing amount of the cost calculation when the bit depth of the pixel is 10 bits, the power consumption can be reduced as well.

The example in which the candidates of the offset value are restricted based on the quantization step has been described above, but a determination criterion for restriction of the candidates of the offset value is not necessarily limited to the quantization step. As a specific example, the offset determining section 350 may restrict the candidates of the offset value based on an amount of characteristic of the original image data.

As a specific example of the amount of characteristic of the original image data, for example, there is a variance value serving as an index of an amount of change in the pixel value in the original image data.

For example, when the variance value of the original image data is small, it indicates that the change in the pixel value is small. As a specific example of the original image data in which the variance value is small, there is a flat image in which contrasting density is small or a change in contrasting density is gentle. In this case, there is a tendency for similarity between blocks (CTUs) to be high and the difference between the original image data and the decoded image data to be small. For this reason, when the variance value of the original image data is small, the offset determining section 350 may restrict the candidates of the offset so that the offset value is decreased as in the control table d51 illustrated in FIG. 14.

Further, when the variance value of the original image data is large, it indicates that the change in the pixel value is large. As a specific example of the original image data in which the variance value is large, there is an image in which texture is fine. In this case, there is a tendency for similarity between blocks (CTUs) to be low and the difference between the original image data and the decoded image data to be large. For this reason, when the variance value of the original image data is large, the offset determining section 350 may restrict the candidates of the offset so that the offset value is increased as in the control tables d52 and d53 illustrated in FIGS. 15 and 16.

Regarding the amount of characteristic of the original image data, for example, the statistic acquiring section 330 may calculate the amount of characteristic based on the acquired original image data.

As described above, the determination criterion for restricting the candidates of the offset value is not particularly limited as long as a condition is set according to the tendency of the offset value to be applied in advance, and the offset determining section 350 can restrict the candidates of the offset value according to the condition. It will be appreciated that a parameter other than the variance value may be used as the amount of characteristic of the original image data as long as a condition can be set according to the tendency of the offset value to be applied.

3. SECOND EMBODIMENT

3-1. Overview

Next, the image encoding device according to the second embodiment will be described. In the image encoding device according to the first embodiment, the SAO filter reduces the processing amount for specifying the offset value and the processing amount related to a series of cost calculations by restricting the candidates of the offset value. On the other hand, in the image encoding device according to the present embodiment, the SAO filter restricts the candidates of the SAO mode according to the prediction mode specified as a result of intra prediction for the CTU serving as the processing target. As a result, in the image encoding device according to the present embodiment, the processing amount related to a series of cost calculations is reduced by reducing the processing amount for specifying the SAO mode. In this regard, first, an overview of the image encoding device according to the present embodiment will be described with reference to FIGS. 18 to 20, particularly focusing on the SAO filter.

Figure 18:
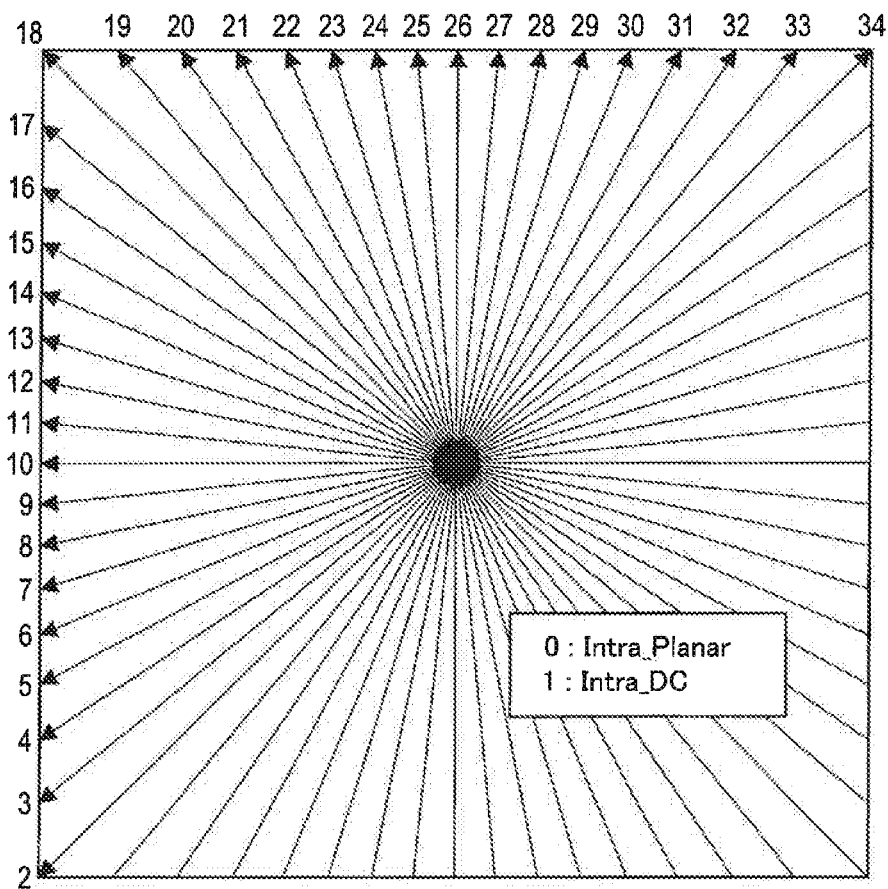
FIG. 18 is an explanatory view for describing a prediction mode of intra prediction in H.265/HEVC.

FIG. 18 is an explanatory view for describing the prediction mode of the intra prediction in H.265/HEVC. As the prediction mode of the intra prediction, there are planar prediction, DC prediction, and directional prediction, and 32 types of prediction directions are set in the directional prediction. For this reason, in H.265/HEVC, the prediction methods of the planar prediction, the DC prediction, and the directional prediction and the prediction directions in the directional prediction are set as the prediction mode to be distinguished from each other.

Specifically, as illustrated in FIG. 18, in the case of the planar prediction, "0" is set as a mode value of the prediction mode. In the case of the DC prediction, "1" is set as the mode value of the prediction mode.

In the case of the directional prediction, any one of "2 to 34" is set as the mode value of the prediction mode according to the prediction direction. As a specific example, as illustrated in FIG. 18, when the prediction direction of the directional prediction is a horizontal direction (a leftward direction), "10" is set as the mode value of the prediction mode. As another example, when the prediction direction of the directional prediction is a vertical direction (an upward direction), "26" is set as the mode value of the prediction mode.

Figure 19:
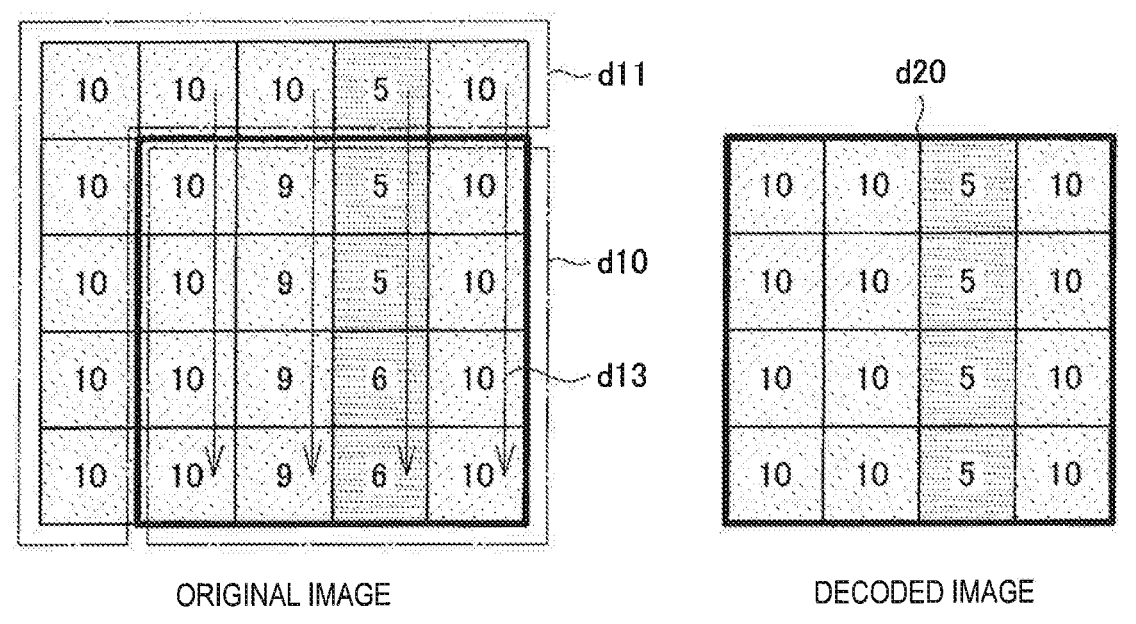

Here, characteristics of the decoded image data when the directional prediction is selected as the prediction mode of the intra prediction will be described with reference to FIG. 19. FIG. 19 is an explanatory view for describing characteristics of the decoded image data when the directional prediction is selected as the prediction mode of the intra prediction.

In FIG. 19, reference numeral d10 denotes a prediction target block in the original image, and reference numeral d20 denotes decoded image data of the prediction target block d10. Reference numeral d11 denotes a prediction block for the intra prediction for the prediction target block d10, and reference numeral d13 denotes the prediction direction of the directional prediction.

In the example illustrated in FIG. 19, the prediction target block d10 is high in correlation between pixels in the longitudinal direction. For this reason, in the case of the example illustrated in FIG. 19, the directional prediction indicating the prediction direction in the longitudinal direction as indicated by the reference numeral d13 is selected as the prediction mode of the intra prediction, and "26" is set as the mode value of the prediction mode.

In the example illustrated in FIG. 19, as can be seen by a comparison of the prediction target block d10 and the decoded image data d20, pixels of the decoded image data d20 are high in correlation between pixels in the same direction as the prediction direction d13. Thus, in the decoded image data d20, an edge is unlikely to be formed in the same direction as the prediction direction d13 of the intra prediction. For this reason, for example, when the decoded image data d20 illustrated in FIG. 19 is the processing target, the classes EO_1 to EO_3 having the same component as the prediction direction d13 among the classes EO_0 to EO_3 of the edge offset illustrated in FIG. 1 are unlikely to be selected, and the class EO_0 is likely to be selected.

In this regard, in the image encoding device according to the present embodiment, the SAO filter associates the prediction modes of the intra prediction with the respective SAO modes in advance using the above-described trend. For example, a control table d30 illustrated in FIG. 20 is an example of a correspondence relation between the prediction mode of the intra prediction and the respective SAO modes in the image encoding device according to the present embodiment.

In the control table d30 illustrated in FIG. 20, "intra mode" indicates mode values in the prediction modes of the intra prediction described above with reference to FIG. 18. "SAO mode" indicates the respective SAO modes illustrated in FIGS. 1 and 2. "SaoTypeIdx" indicates the encoding parameters set according to the SAO mode and the same parameters are defined based on the H.265/HEVC standard.

As illustrated in FIG. 20, when the mode value of the prediction mode is "0" (that is, the planar prediction), and when the mode value is "1" (that is, the DC prediction), the band offset is set as the SAO mode. In FIG. 20, "BO" indicates the band offset.

When the mode value of the prediction mode is "2 to 34" (that is, the directional prediction), the edge offset is set as the SAO mode. Specifically, the mode values are associated with the classes EO_0 to EO_3 of the edge offset such that a relative positional relation between the prediction direction indicated by the mode value of the prediction mode and directions of the neighboring pixels a and b with respect to the target pixel c of the edge offset is closer to vertical.

For example, when the mode value of the prediction mode is 2 to 5 or 30 to 34, the class EO_2 of the edge offset is associated. Further, when the mode value of the prediction mode is 6 to 13, the class EO_1 is associated. Similarly, when the mode value of the prediction mode is 14 to 21, the class EO_3 is associated, and when the mode value of the prediction mode is 22 to 29, the class EO_0 is associated.

The SAO filter collates the prediction mode of the prediction target block d10 corresponding to the decoded image data d20 (a CTU unit) with the control table d30 illustrated in FIG. 20, and specifies the SAO mode in the decoded image data d20.

As described above, in the image encoding device according to the first embodiment, the SAO filter calculates the offset values and the costs for the respective SAO modes (that is, for the band offset and the classes of the edge offset), compares the costs, and decides the SAO mode and the offset value to be applied. On the other hand, in the image encoding device according to the present embodiment, the SAO filter decides the SAO mode according to the prediction mode of the intra prediction and thus preferably performs only the calculation of the offset value in the decided mode. In other words, in the image encoding device according to the present embodiment, the processing amount of the cost calculation and the power consumption can be reduced to be smaller than when the offset value and the cost are calculated for each SAO mode.

In this regard, the image encoding device according to the present embodiment will be described below in further detail, focusing on different portions from the first embodiment, particularly the SAO filter in the loop filter.

3-2. Exemplary Configuration of Loop Filter

Figure 21:
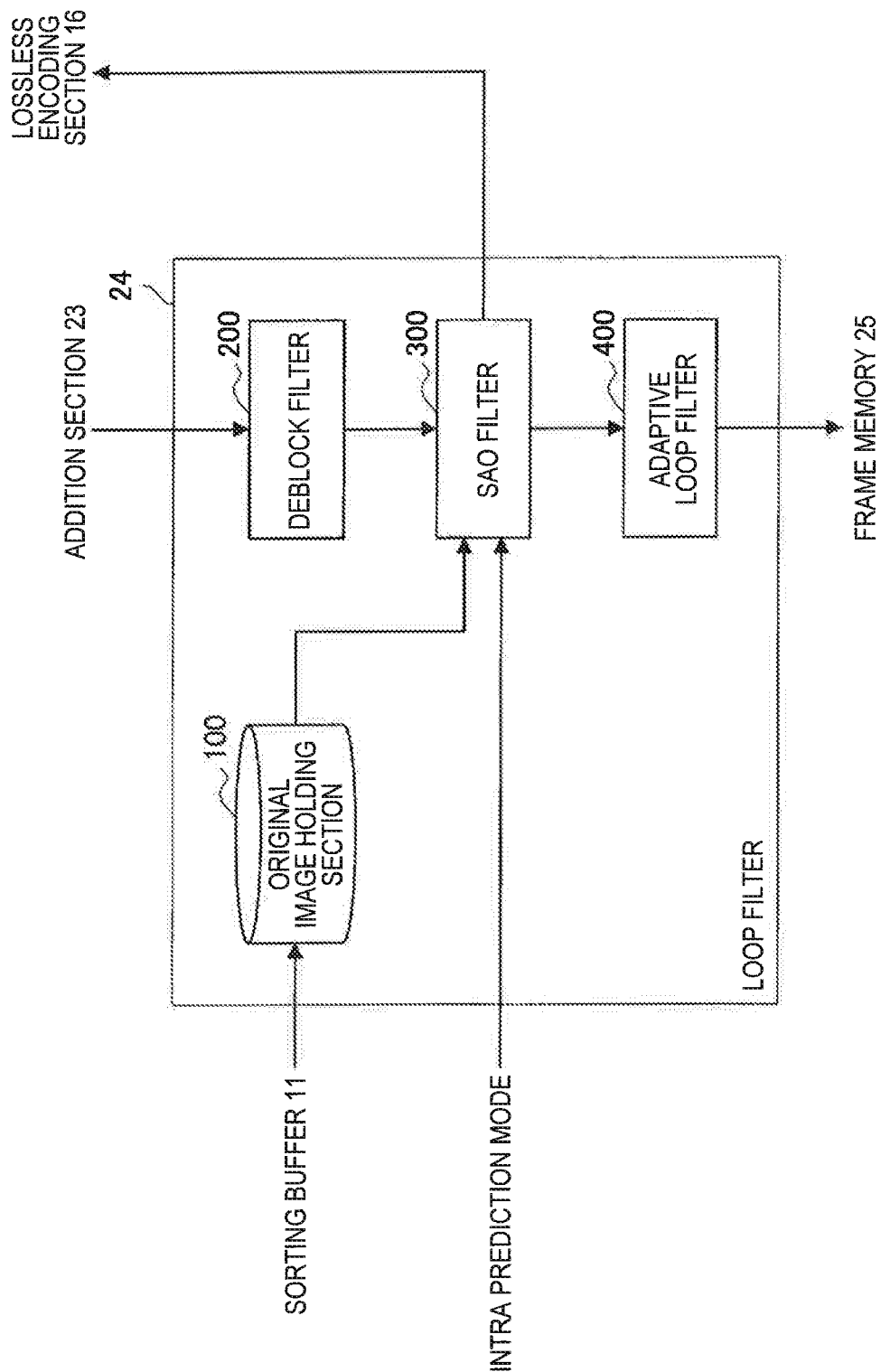
FIG. 21 is a block diagram illustrating an example of a configuration of a loop filter according to the same embodiment.

First, an example of a configuration of the loop filter 24 in the image encoding device according to the present embodiment will be described with reference to FIG. 21. FIG. 21 is a block diagram illustrating an example of a configuration of the loop filter 24 according to the present embodiment. In this description, the description will proceed with different components from the loop filter 24 (see FIG. 4) according to the first embodiment, and a description of the other components is omitted.

As illustrated in FIG. 21, in the loop filter 24 according to the present embodiment, the SAO filter 300 acquires the prediction mode specified at the time of intra prediction for the blocks of the decoded image data serving as the processing target (that is, the prediction parameter among the encoding parameters). For example, in the flow of the series of processes of the image encoding device illustrated in FIG. 6, the prediction mode of the intra prediction is decided in step S11, and in the process of step S17, the SAO filter 300 uses the prediction mode decided in step S11.

The acquisition source of the prediction mode is not particularly limited as long as the SAO filter 300 can acquire the prediction mode of the intra prediction set in the CTU serving as the processing target. As a specific example, the SAO filter 300 may acquire the prediction mode of the intra prediction corresponding to the block serving as the processing target from the intra prediction section 30 (see FIG. 3).

The loop filter 24 according to the present embodiment has been described above with reference to FIG. 21.

[3-3. Exemplary Configuration of SAO Filter]

Figure 22:
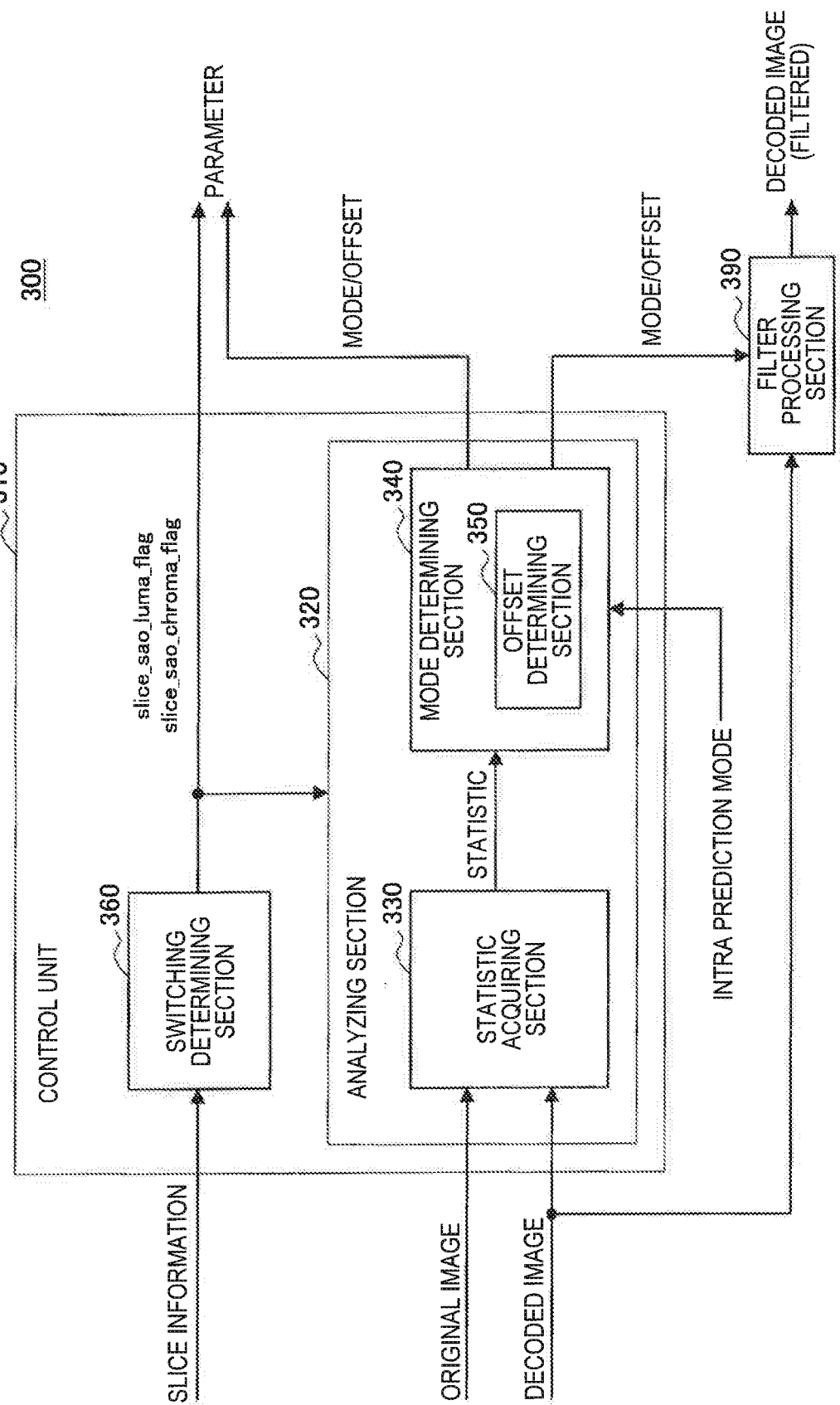
FIG. 22 is a block diagram illustrating an example of a configuration of an SAO filter according to the same embodiment.

Next, an example of a configuration of the SAO filter 300 according to the present embodiment will be described with reference to FIG. 22. FIG. 22 is a block diagram illustrating an example of a configuration of the SAO filter 300 according to the present embodiment. In the SAO filter 300 according to the present embodiment, an operation of the mode determining section 340 differs from that in the SAO filter 300 according to the first embodiment (see FIG. 7). In this regard, in this specification, the description will proceed with the mode determining section 340, and a detailed description of the other components is omitted.

The mode determining section 340 according to the present embodiment acquires the prediction mode of the intra prediction (that is, the prediction parameter among the encoding parameters) set in the CTU for each CTU in the decoded image data. As the acquisition source of the prediction mode, for example, there is the intra prediction section 30 (see FIG. 3).

The mode determining section 340 is configured to be able to refer to the control table d30 of FIG. 20 in which the prediction modes of the intra prediction are associated with the SAO modes in advance. A location at which data of the control table d30 is stored is not particularly limited as long as the mode determining section 340 can refer to the control table d30.

The mode determining section 340 collates the acquired prediction mode of the intra prediction with the control table d30, and decides the SAO mode to be set in the CTU serving as the processing target.

For example, when the mode value of the prediction mode of the intra prediction is 0, that is, in the planar prediction, the mode determining section 340 selects the band offset as the SAO mode based on the control table d30. Even when the mode value of the prediction mode of the intra prediction is 1, that is, in the DC prediction, the mode determining section 340 selects the band offset as the SAO mode based on the control table d30. In this case, 1 indicating the band offset is set in SaoTypeIdx.

When the mode value of the prediction mode of the intra prediction is 2 to 34, that is, in the directional prediction, the mode determining section 340 selects the edge offset as the SAO mode based on the control table d30, and specifies the class of the edge offset. In this case, 2 indicating the edge offset is set in SaoTypeIdx.

When the SAO mode is decided, the mode determining section 340 causes the offset determining section 350 to calculate the offset value and the cost corresponding to the offset value for the decided SAO mode.

For example, when the SAO mode is the band offset, the mode determining section 340 causes the offset determining section 350 to calculate the offset value and the cost corresponding to the offset value for each of the bands of the band offset.

When the SAO mode is the edge offset, the mode determining section 340 sets only the decided class among the classes EO_0 to EO_3 of the edge offset as the calculation target of the offset value and the cost corresponding to the offset value. In other words, the mode determining section 340 causes the offset determining section 350 to calculate the offset value and the cost corresponding to the offset value for each of the categories 1 to 4 (see FIG. 1) of the decided class.

The offset determining section 350 is the same as in the first embodiment. In other words, the offset determining section 350 calculates the cost for each of the candidates of the offset value, compares the calculated costs, and specifies the offset value in which the coding efficiency can be most improved.

Then, the mode determining section 340 evaluates the cost calculated by the offset determining section 350, and specifies the SAO mode and the offset value corresponding to the mode in units of CTUs. For example, when the SAO mode is the band offset, the mode determining section 340 compares the costs calculated for the respective bands, and specifies bands (four consecutive bands) in which the coding efficiency can be most improved. Further, when the SAO mode is the edge offset, the mode determining section 340 compares the costs calculated for the categories 1 to 4 (see FIG. 1) of the specified class, and specifies the category in which the coding efficiency can be most improved.

Then, the mode determining section 340 outputs the mode specified in units of CTUs and the offset value corresponding to the mode to the filter processing section 390 and the lossless encoding section 16.

The subsequent process is the same as in the SAO filter 300 according to the first embodiment. In other words, the filter processing section 390 performs the SAO process on each CTU of the decoded image data based on the SAO mode and the offset value supplied from the mode determining section 340. Then, the filter processing section 390 outputs the decoded image that has undergone the SAO process to the adaptive loop filter 400 (see FIG. 4).

3-4. Process Flow of Mode Determining Section

Next, a process flow of the mode determining section will be described. In this specification, in order to facilitate understanding of the features of the mode determining section according to the present embodiment, first, a process flow of a mode determining section based on the scheme according to the related art will be described as a comparative example, and then a process flow of the mode determining section 340 according to the present embodiment will be described.

<<3-4-1. Comparative Example of Mode Determining Section>>

Figure 23:
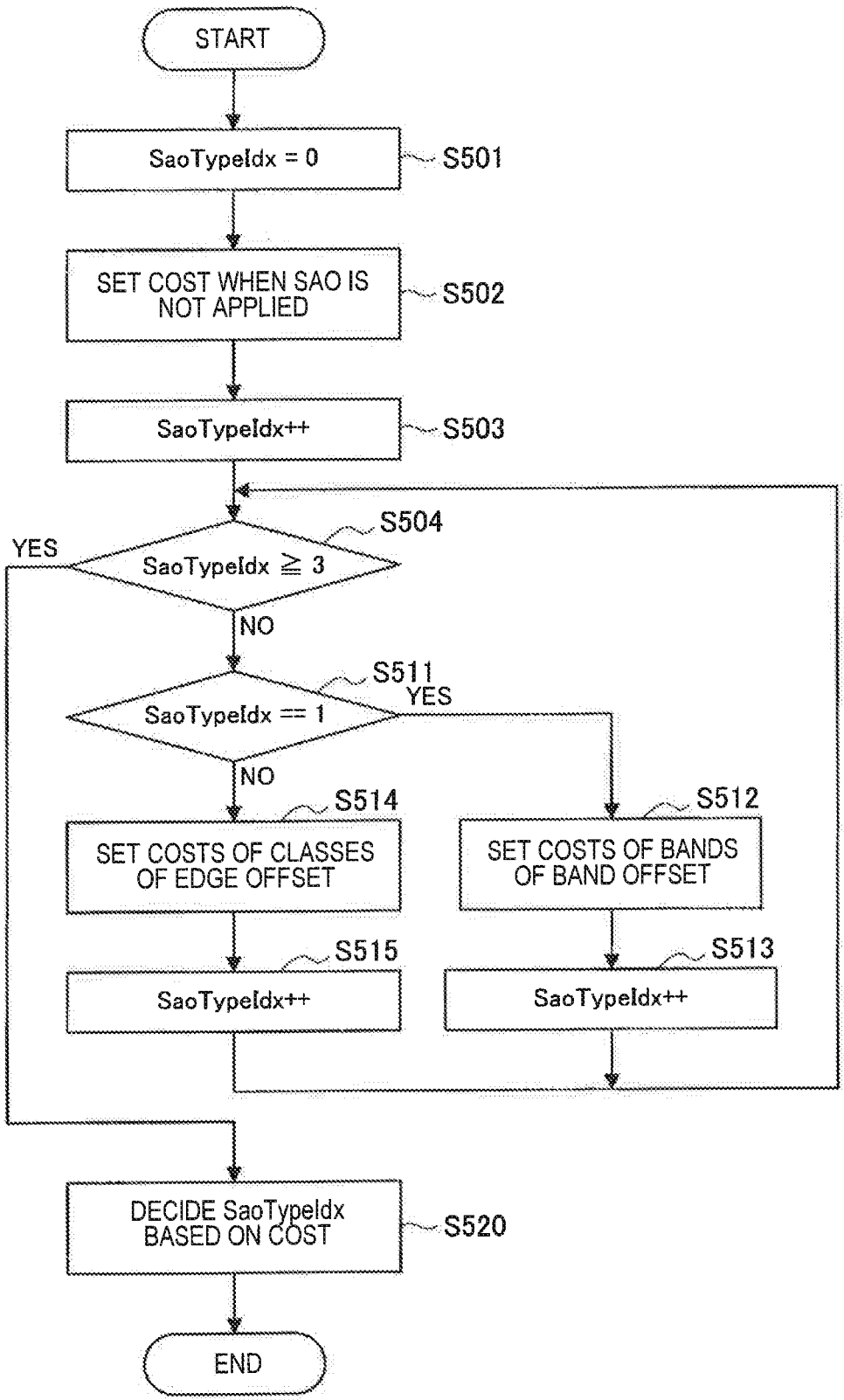
FIG. 23 is a flowchart illustrating an example of the flow of a series of processes of a mode determining section according to the comparative example.

An example of the flow of a series of processes of the mode determining section according to the comparative example will be described with reference to FIG. 23. FIG. 23 is a flowchart illustrating an example of the flow of a series of processes of the mode determining section according to the comparative example. Hereinafter, when the mode determining section according to the comparative example is explicitly distinguished from the mode determining section 340 according to the present embodiment, the mode determining section according to the comparative example is also referred to as a "mode determining section 340a."

(Steps S501 to S503)

The mode determining section 340a first sets 0 in a parameter "SaoTypeIdx" indicating the SAO mode (step S501), and calculates the cost when the SAO process is not applied (step S502). Then, when the calculation of the cost when the SAO process is not applied is completed, the mode determining section 340a increments SaoTypeIdx (step S503). Thus, 1 is set in SaoTypeIdx.

(Steps S504, S511, and S512)

Next, since the value of SaoTypeIdx is 1 (NO in step S504 and YES in step S511), the mode determining section 340a causes the offset determining section 350 to calculate the offset value and the cost corresponding to the offset value for the respective bands of the band offset (step S512). Thus, the offset value and the cost corresponding to the offset value are set for the respective bands of the band offset.

(Step S513)

When the cost calculation for the respective bands of the band offset is completed, the mode determining section 340a increments SaoTypeIdx. Thus, 2 is set in SaoTypeIdx.

(Steps S504, S511, and S514)

Then, since the value of SaoTypeIdx is 2 (NO in step S504 and YES in step S511), the mode determining section 340a causes the offset determining section 350 to calculate the offset value and the cost corresponding to the offset value for each of the combinations of the classes EO_0 to EO_3 of the edge offset and the categories 1 to 4 (step S514). As a result, the offset value and the cost corresponding to the offset value are set for each of the categories 1 to 4 of each of the classes of the edge offset.

(Step S515)

When the cost calculation for the combinations of the classes and the categories of the edge offset is completed, the mode determining section 340a increments SaoTypeIdx. Thus, 3 is set in SaoTypeIdx.

(Step S504)

As described above, the offset value and the cost corresponding to the offset value are set for each of the respective SAO modes. At this time, 3 is set in SaoTypeIdx as described above.

(Step S520)

When SaoTypeIdx is 3 or larger (YES in step S504), the mode determining section 340a compares the costs calculated for the respective SAO modes, and specifies the SAO mode in which the coding efficiency can be most improved and the offset value corresponding to the mode based on the comparison result.

As described above, the mode determining section 340a according to the comparative example performs the cost calculation for all the SAO modes, that is, the band offset and the classes of the edge offset. Then, the mode determining section 340a compares the costs calculated for the respective modes, and specifies the SAO mode for the SAO process based on the comparison result.

Specifically, when the bit depth of the pixel is 8 bits, the mode determining section 340a calculates the costs of the candidates 0 to 7 of the offset value for the bands 0 to 31 in the band offset. In other words, the mode determining section 340a performs the cost calculation the number of times corresponding to (the number of bands)×(the number of candidates of the offset) (=32×8=256) for the band offset.

Similarly, the mode determining section 340a calculates the costs of the candidates 0 to 7 of the offset value for each of the combination of the classes EO_0 to EO_3 and the categories 1 to 4 in the edge offset. In other words, the mode determining section 340a performs the cost calculation the number of times corresponding to (the number of classes)×(the number of categories)×(the number of candidates of the offset) (=4×4×8=128) in the edge offset.

In other words, the mode determining section 340a according to the comparative example performs 384 cost calculations to specify the SAO mode when the bit depth of the pixel is 8 bits. Further, when the bit depth of the pixel is 10 bits, the same applies to the other processes except the candidates 0 to 31 of the offset value. As described above, the mode determining section 340a according to the comparative example tends to increase the processing amount of the cost calculation for specifying the SAO mode, leading to the increase in the power consumption.

In this regard, the mode determining section 340 according to the present embodiment restricts the candidates of the SAO mode according to the prediction mode specified as a result of the intra prediction on the CTU serving as the processing target. As a result, the image encoding device according to the present embodiment reduces the processing amount regarding the cost calculation by reducing the processing amount for specifying the SAO mode.

<<3-4-2. Process Flow of Mode Determining Section>>

Figure 24:
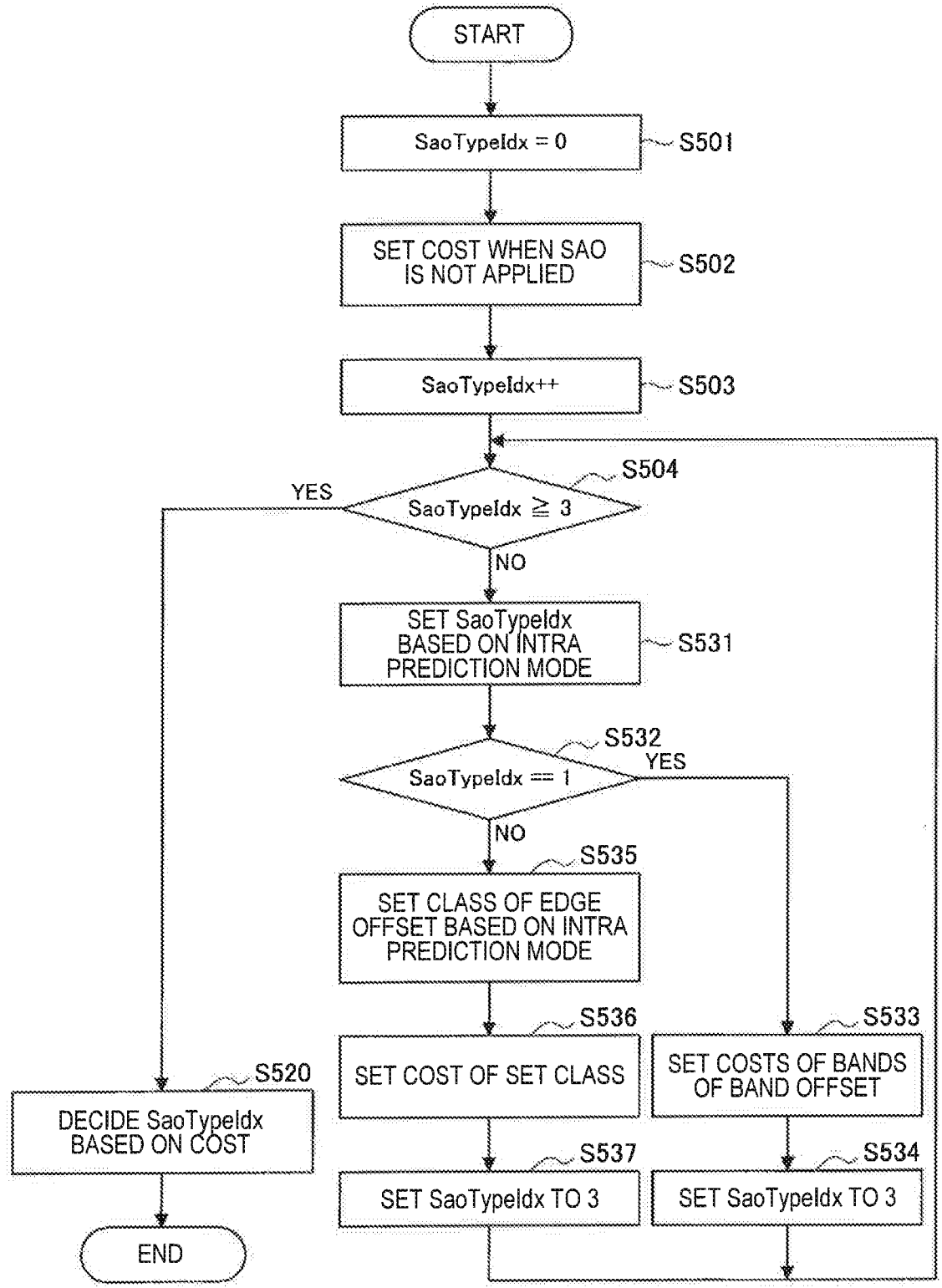
FIG. 24 is a flowchart illustrating an example of the flow of a series of processes of a mode determining section according to the same embodiment.

An example of the flow of a series of processes of the mode determining section 240 according to the present embodiment will be described below with reference to FIG. 24. FIG. 24 is a flowchart illustrating an example of the flow of a series of processes of the mode determining section 240 according to the present embodiment.

The process of steps S501 to S503 is the same as in the mode determining section 340a according to the comparative example, and a detailed description thereof is omitted. In other words, the mode determining section 340 sets the parameter "SaoTypeIdx" indicating the SAO mode to 0 (step S501), and calculates the cost when the SAO process is not applied (step S502). Then, when the calculation of the cost when the SAO process is not applied is completed, the mode determining section 340 increments SaoTypeIdx (step S503). Thus, 1 is set in SaoTypeIdx.

(Steps S504 and S531)

Then, since the value of SaoTypeIdx is 1 (NO in step S504), the mode determining section 340 acquires the prediction mode of the intra prediction set in the CTU serving as the processing target. As the acquisition source of the prediction mode, there is, for example, the intra prediction section 30 (see FIG. 3).

The mode determining section 340 collates the acquired prediction mode with the control table d30 (see FIG. 20) in which the prediction modes of the intra prediction are associated with the SAO modes in advance, and decides the SAO mode to be set in the CTU serving as the processing target. Then, the mode determining section 340 sets SaoTypeIdx according to the decided SAO mode.

As a specific example, when the mode value of the prediction mode of the intra prediction is 0, that is, indicates the planar prediction, the mode determining section 340 sets "1" indicating the band offset in SaoTypeIdx based on the control table d30. Further, even when the mode value of the prediction mode of the intra prediction is 1, that is, indicates the DC prediction, the mode determining section 340 sets "1" indicating the band offset in SaoTypeIdx based on the control table d30.

When the mode value of the prediction mode of the intra prediction is 2 to 34, that is, indicates the directional prediction, the mode determining section 340 sets "2" indicating the edge offset in SaoTypeIdx based on the control table d30.

(Steps S532 and S533)

When "1" indicating the band offset is set in SaoTypeIdx (YES in step S532), the mode determining section 340 causes the offset determining section 350 to calculate the offset value and the cost corresponding to the offset value for the respective bands of the band offset.

(Step S534)

When the calculation of the offset value and the cost corresponding to the offset value for the respective bands of the band offset are completed, the mode determining section 340 sets "3" in SaoTypeIdx.

(Steps S532 and S535)

Further, when a value other than "1" is set in SaoTypeIdx (YES in step S532), for example, when "2" indicating the edge offset is set, the mode determining section 340 sets the class of the edge offset (see FIG. 1) based on the mode value of the prediction mode and the control table d30.

(Step S536)

Then, the mode determining section 340 causes the offset determining section 350 to calculate the offset value and the cost corresponding to the offset value for the categories 1 to 4 (see FIG. 1) of the decided class.

(Step S537)

When the calculation of the offset value and the cost corresponding to the offset value for the categories 1 to 4 of the decided class is completed, the mode determining section 340 sets "3" in SaoTypeIdx.

(Step S504)

As described above, the SAO mode is decided, and the offset value and the cost corresponding to the offset value are set to the mode. At this time, "3" is set in SaoTypeIdx as described above.

(Step S520)

When SaoTypeIdx is 3 or larger (YES in step S504), the mode determining section 340 evaluates the cost calculated by the offset determining section 350, and specifies the SAO mode and the offset value corresponding to the mode.

For example, when the SAO mode is the band offset, the offset and the cost corresponding to the offset are set only for the bands of the band offset. In this case, the mode determining section 340 compares the costs calculated for the respective bands, and specifies bands (four consecutive bands) in which the coding efficiency can be most improved. In this case, the mode determining section 340 sets "1" indicating the band offset in SaoTypeIdx again.

Further, when the SAO mode is the edge offset, the offset and the cost corresponding to the offset are set to the categories 1 to 4 (see FIG. 1) only for the selected classes. In this case, the mode determining section 340 compares the costs calculated for the specified classes, and specifies the category in which the coding efficiency can be most improved. In this case, the mode determining section 340 sets "2" indicating the edge offset in SaoTypeIdx again.

As described above, the mode determining section 340 according to the present embodiment specifies the SAO mode and the offset value corresponding to the mode. The example of the flow of the series of processes of the mode determining section 340 according to the present embodiment has been described above with reference to FIG. 24.

3-5. Modified Example

Next, a modified example of the mode determining section 340 according to the present embodiment will be described. In the above-described example, the mode determining section 340 restricts the candidates of the SAO mode based on the prediction mode of the intra prediction. However, the method of restricting the SAO mode is not necessarily limited to the method using the prediction mode of the intra prediction as long as the candidates of the SAO mode can be restricted 26 according to the characteristics of the original image data or the decoded image data. In this regard, an example of the method of restricting the candidates of the SAO mode according to the characteristics of the original image data or the decoded image data will be described as a modified example.

For example, in H.265/HEVC, a technique called "transform skip" of generating the quantized data by quantizing the prediction error data without performing the orthogonal transform on the prediction error data can be applied.

For example, when the prediction error data that has undergone the orthogonal transform is quantized, an offset associated with quantization is applied to some bands (for example, high frequencies). On the other hand, when the prediction error data is quantized without performing the orthogonal transform, an offset is uniformly applied to the entire image data. Thus, when the transform skip is applied, the band offset is likely to be selected as the SAO mode.

Using such a trend, when the transform skip is applied, the mode determining section 340 may set the band offset as the SAO mode.

As another example, in H.265/HEVC, a technique called "strong-intra-smoothing" can be applied. In the strong-intra-smoothing, the smoothing process is performed on the prediction block for the intra prediction on the prediction target block. Thus, the prediction target block is likely to be an image in which the change in the pixel value is small, that is, a flat image in which contrasting density is small or a change in contrasting density is gentle. In other words, when the strong-intra-smoothing is applied, the band offset is likely to be selected as the SAO mode.

Using such a trend, when the strong-intra-smoothing is applied, the mode determining section 340 may set the band offset as the SAO mode.

In the mode determining section 340 according to the above embodiment, the direction in which the correlation between pixels is high is recognized based on the prediction direction in the directional prediction of the intra prediction. However, the present disclosure is not necessarily limited to the method based on the prediction direction in the directional prediction of the intra prediction as long as the direction in which the correlation between pixels is high can be recognized.

For example, the mode determining section 340 may recognize the direction in which the correlation between pixels is high based on the amount of characteristic of the original image data. As a method based on the amount of characteristic of the original image data, for example, there is a method of recognizing the direction in which the correlation between pixels is high according to the texture of the original image data.

Specifically, the mode determining section 340 may recognize the direction in which the correlation between pixels is high based on the direction of the edge extracted from the original image data. In this case, for example, the statistic acquiring section 330 (see FIG. 7 or FIG. 22) preferably performs the filter process of the Sobel filter or the like on the original image data to extract the edge from the original image data and output information of the extracted edge to the mode determining section 340 as the statistic.

The example of the method of restricting the candidates of the SAO mode according to the characteristics of the original image data or the decoded image data has been described above as the modified example. Some or all of the methods described above as the modified example may be appropriately combined with the method based on the prediction mode of the intra prediction. The method based on the prediction mode of the intra prediction may be appropriately replaced with some or all of the methods described above as the modified example.

3-6. Conclusion

As described above, in the image encoding device according to the present embodiment, the mode determining section 340 associates the prediction modes of the intra prediction with the respective SAO modes in advance. The mode determining section 340 acquires the prediction mode of the intra prediction set in the CTU serving as the processing target, and specifies the SAO mode based on the acquired prediction mode. As described above, the mode determining section 340 according to the present embodiment restricts the candidates of the SAO mode according to the acquired prediction mode of the intra prediction. In addition, the mode determining section 340 calculates the offset value and the cost corresponding to the offset value only for the specified mode.

Through this configuration, in the mode determining section 340 according to the present embodiment, similarly to the mode determining section 340*a* according to the comparative example, the processing amount related to the cost calculation can be reduced to be significantly smaller than when the cost calculation is performed for the respective SAO modes.

Specifically, when the bit depth of the pixel is 8 bits, when the band offset is selected, the mode determining section 340 according to the present embodiment preferably calculates the costs of the candidates 0 to 7 of the offset value only for the bands 0 to 31. In other words, when the band offset is selected, the mode determining section 340 preferably performs the cost calculation the number of times corresponding to (the number of bands)×(the number of candidates of the offset) (=32×8=256).

Similarly, when the edge offset is selected, the mode determining section 340 preferably calculates the costs of the candidates 0 to 7 of the offset value for the categories 1 to 4 of only the selected class of the edge offset. In other words, when the edge offset is selected, the mode determining section 340 preferably performs the cost calculation the number of times corresponding to (the number of categories)×(the number of candidates of the offset) (=4×8=32).

In the mode determining section 340*a* according to the comparative example, in view of the fact that it is necessary to perform 384 cost calculations for specifying the SAO mode, it can be understood that the mode determining section 340 according to the present embodiment can significantly reduce the processing amount related to the cost calculation. It will be appreciated that in the mode determining section 340 according to the present embodiment, with the reduction in the processing amount of the cost calculation, the power consumption can be reduced to be smaller than in the mode determining section 340*a* according to the comparative example.

The SAO filter 300 according to the present embodiment may be combined with the SAO filter 300 according to the first embodiment.

As a specific example, in the SAO filter 300 according to the present embodiment, the offset determining section 350 according to the first embodiment may be applied as the offset determining section 350 in the mode determining section 340. Through this configuration, it is possible to further reduce the processing amount of the cost calculation for specifying the offset value, and it is possible to reduce the circuit size of the offset determining section 350. It will be appreciated that since the processing amount of the cost calculation is further reduced, the power consumption can be further reduced.

4. THIRD EMBODIMENT

4-1. Overview

Next, an image encoding device according to the third embodiment will be described. In the image encoding device according to the first embodiment, the SAO filter controls whether or not the SAO process is applied in units of slices. In the image encoding device according to the present embodiment, the SAO filter controls whether or not the SAO process is applied in units of CTUs (that is, LCUs) based on the encoding parameters set in the decoded image data in addition to control in units of slices. In this regard, first, an overview of the image encoding device according to the present embodiment will be described with reference to FIG. 25, particularly, focusing on the SAO filter.

Figure 25:
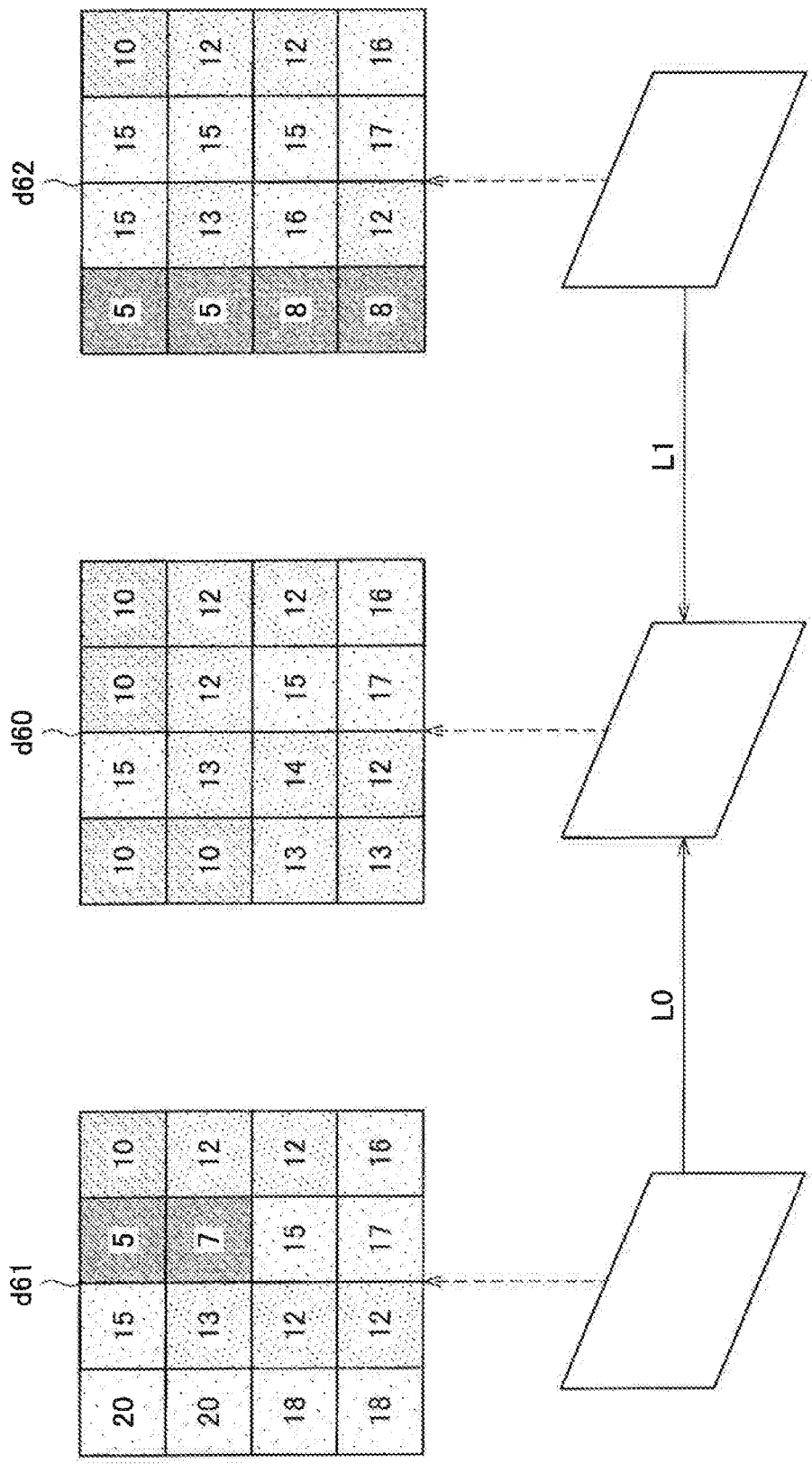
FIG. 25 is an explanatory view for describing an example of predicted image data generated based on bi-prediction in inter prediction among B slices.

FIG. 25 schematically illustrates an example of the predicted image data generated based on the bi-prediction in the inter prediction among the B slices (or the B pictures). In FIG. 25, reference numeral d60 schematically indicates examples of pixel values of pixels of predicted image data (TU) generated based on the bi-prediction in the inter prediction. Reference numeral d61 schematically indicates examples of pixel values of pixels of predicted image data (TU) of an I slice or a P slice in an L0 direction (past) used for generating the predicted image data d60. Similarly, reference numeral d62 schematically indicates examples of pixel values of pixels of predicted image data (TU) of an I slice or a P slice in an L1 direction (future) used for generating the predicted image data d60.

As illustrated in FIG. 25, when the bi-prediction of the inter prediction is applied, the pixel values of the pixels of the predicted image data d60 to be generated are averages of the pixel values of the pixels of the decoded image data d61 and d62 for prediction. For this reason, when the bi-prediction of the inter prediction is applied, the decoded image data of the B slice (for example, the decoded image data of the predicted image data d60) is more likely to be an image in which a sense of detail is damaged, and the change in the pixel value is smaller than the decoded image data of the I slice or the P slice. It is understood that there is the same tendency even when the intra prediction is applied to the B slice.

In the predicted image data of the B slice, a larger quantization step (QP) tends to be selected than in the predicted image data of the I slice or the P slice. As described above, even when the quantization step is large, it is more likely to be the image in which a sense of detail is damaged, and the change in the pixel value is smaller than when the quantization step is small.

As described above, the SAO process corresponds to the process of alleviating the error (for example, the quantization error) with the original image data generated in the decoded image data, and corresponds to the process of performing the smoothing process of adding or subtracting the offset to or from the target pixel value. For this reason, when the SAO process is performed on the decoded image data of the B slice such as the decoded image data of the predicted image data d60 illustrated in FIG. 25, a sense of detail may be further damaged. In this case, as the SAO process is performed, the difference in the image quality between the B slice and the proceeding or subsequent I slice or P slice is further increased, and thus the subjective image quality may be degraded.

In this regard, the SAO filter according to the present embodiment further controls whether or not the SAO process is applied according to the encoding parameter set in the decoded image data of the target. Further, the SAO filter according to the present embodiment controls whether or not the SAO process is applied in units of CTUs in addition to control in units of slices. As will be described later, examples of the encoding parameter include the prediction parameter such as the prediction mode of the inter prediction or the intra prediction and the quantization parameter such as the quantization step.

Specifically, when the change in the pixel value is smaller than that in other slices, for example, when the bi-prediction of the inter prediction is applied, the SAO filter does not apply the SAO process serving as the processing target in units of slices or in units of CTUs.

Through this configuration, in the image encoding device according to the present embodiment, the SAO filter suppresses degradation of the image quality accompanied by encoding, and reduces the processing amount of the cost calculation. It will be appreciated that in the image encoding device according to the present embodiment, the processing amount of the cost calculation is reduced, and thus the power consumption can be reduced.

In this regard, the image encoding device according to the present embodiment will be described below in further detail, focusing on different portions from the first embodiment, particularly the SAO filter in the loop filter.

4-2. Exemplary Configuration of SAO Filter

Figure 26:
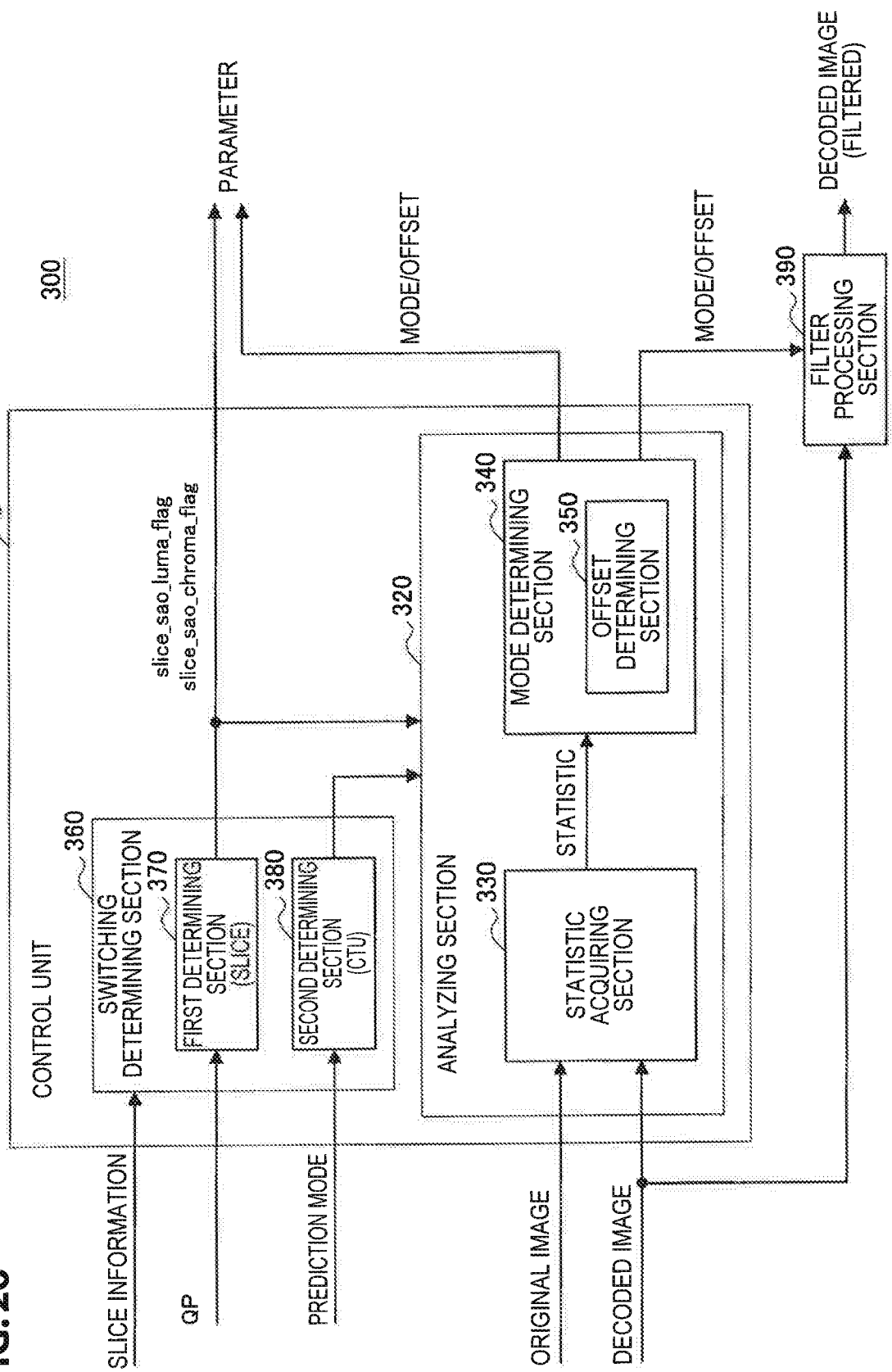
FIG. 26 is a block diagram illustrating an example of a configuration of an SAO filter according to a third embodiment of the present disclosure.

First, an example of a configuration of the SAO filter 300 according to the present embodiment will be described with reference to FIG. 26. FIG. 26 is a block diagram illustrating an example of a configuration of the SAO filter 300 according to the present embodiment. The SAO filter 300 according to the present embodiment differs from the SAO filter 300 according to the first embodiment (see FIG. 7) in a configuration of the switching determining section 360. In this regard, in this specification, the description will proceed with the switching determining section 360, and a detailed description of the other components is omitted.

As illustrated in FIG. 26, the switching determining section 360 according to the present embodiment includes a first determining section 370 and a second determining section 380.

A function of the first determining section 370 corresponds to the function of the switching determining section 360 according to the first embodiment. In other words, the first determining section 370 controls whether or not the SAO process is applied to the decoded image data in units of slices.

Figure 27:
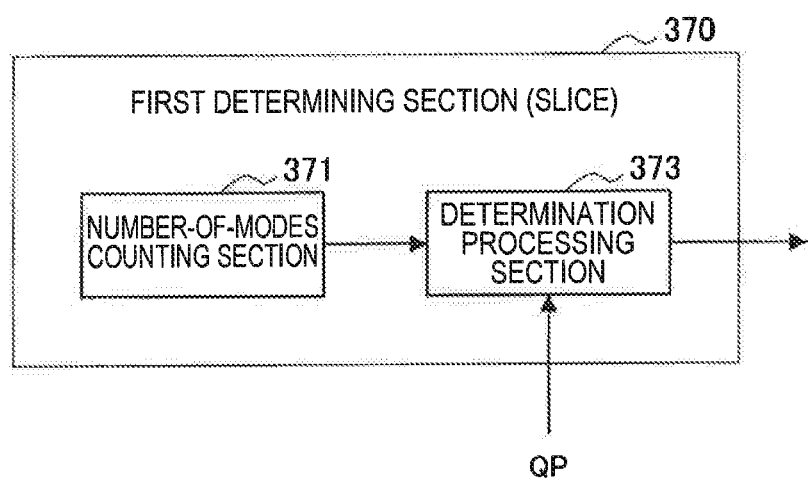
FIG. 27 is a block diagram illustrating an example of a configuration of a first determining section according to the same embodiment.

Here, a configuration of the first determining section 370 according to the present embodiment will be described in detail with reference to FIG. 27. FIG. 27 is a block diagram illustrating an example of a configuration of the first determining section 370 that controls whether or not the SAO process is applied in units of slices.

As illustrated in FIG. 27, the first determining section 370 includes a number-of-modes counting section 371 and a determination processing section 373.

When the slice of the processing target is the B slice, the number-of-modes counting section 371 adds up the number of blocks (CTUs) to which the SAO process is applied in the immediately previous slice (that is, the I slice or the P slice) of the B slice. Then, the number-of-modes counting section 371 outputs the added-up number, that is, the number of blocks (CTUs) to which the SAO process is applied in the immediately previous slice, to the determination processing section 373 as the number of modes.

When the slice of the processing target is either of the I slice and the P slice, the determination processing section 373 instructs the analyzing section 320 to apply the SAO process to the slice.

Further, when the slice of the processing target is the B slice, the determination processing section 373 acquires the number of blocks (CTUs) to which the SAO process is applied in the immediately previous slice of the B slice, that is, the number of modes from the number-of-modes counting section 371. Then, the determination processing section 373 controls whether or not the SAO process is applied to the B slice according to the acquired number of modes.

As a specific example, when the acquired number of modes is less than the predetermined threshold value TH11, the determination processing section 373 instructs the analyzing section 320 to restrict the application of the SAO process to the B slice of the processing target (that is, not to apply the SAO process to the B slice of the processing target).

The above process is the same as in the switching determining section 360 according to the first embodiment.

The determination processing section 373 according to the present embodiment acquires the quantization step (QP) used for generating the quantized data serving as the decoding source of the decoded image data when the acquired number of modes, that is, the number of blocks (CTUs) to which the SAO process is applied, is equal to or larger than the threshold value TH11. The acquisition source is not particularly limited as long as the determination processing section 373 can acquire the quantization step of the quantized data serving as the decoding source of the decoded image data. As a specific example, the determination processing section 373 may acquire the quantization step from the quantization section 15 (see FIG. 3).

Then, the determination processing section 373 controls whether or not the SAO process is applied to the B slice of the processing target based on the acquired quantization step.

Specifically, when the acquired quantization step is equal to or less than a predetermined threshold value TH12, the determination processing section 373 instructs the analyzing section 320 to apply the SAO process to the B slice of the processing target. Further, when the acquired quantization step is larger than the predetermined threshold value TH12, the determination processing section 373 instructs the analyzing section 320 to restrict the application of the SAO process to the B slice of the processing target (that is, not to apply the SAO process to the B slice of the processing target).

As the threshold value TH12 used for restricting whether or not the SAO process is applied to the B slice of the processing target based on the quantization step, an appropriate value decided based on an experiment or the like in advance is preferably set in advance.

Further, the determination processing section 373 outputs information indicating whether or not the SAO process is applied in units of slices to the lossless encoding section 16 as the encoding parameter. The present process is the same as in the switching determining section 360 according to the first embodiment.

As described above, the first determining section 370 controls whether or not the SAO process is applied in units of slices.

As described above, in the decoded image data of the B slice in which the quantization step is relatively large, the sense of detail tends to be damaged compared to the decoded image data of the I slice or the P slice, and there are cases in which, as the SAO process is performed, loss of the sense of detail is remarkably shown.

However, the first determining section 370 restricts the application of the SAO process to the B slice in which the quantization step is relatively large. In other words, the first determining section 370 controls whether or not the SAO process is applied in units of slices, and thus the degradation of the image quality is suppressed, and the processing amount of the cost calculation is reduced.

Next, the second determining section 380 will be described with reference to FIG. 26. The second determining section 380 controls whether or not the SAO process is applied to the decoded image data in units of CTUs (that is, LCUs) based on the encoding parameter set in the CTU.

As a specific example, the second determining section 380 uses the prediction parameter indicating the prediction mode (that is, the intra prediction or the inter prediction) set in the CTU serving as the processing target as the encoding parameter used for determining whether or not the SAO process is applied.

The acquisition source is not particularly limited as long as the second determining section 380 can acquire the prediction parameter indicating the prediction mode set in the CTU serving as the processing target. As a specific example, the second determining section 380 may acquire the prediction parameter from the selector 27 as information (that is, information related to the intra prediction or the inter prediction) which the selector 27 (see FIG. 3) switches and outputs according to the magnitudes of the costs of the intra prediction and the inter prediction.

The second determining section 380 recognizes the prediction mode set in the CTU serving as the processing target based on the acquired prediction parameter. Then, when the prediction mode set in the CTU serving as the processing target is either the intra prediction or the bi-prediction of the inter prediction, the second determining section 380 instructs the analyzing section 320 to restrict the application of the SAO process to the CTU (that is, not to apply the SAO process to the CTU). Further, when the prediction mode is neither the intra prediction nor the bi-prediction of the inter prediction, the second determining section 380 instructs the analyzing section 320 to apply the SAO process to the CTU serving as the processing target.

As described above, the second determining section 380 controls whether or not the SAO process is applied in units of CTUs.

As described above, in the decoded image data of the B slice to which the bi-prediction of the inter prediction is applied, the sense of detail tends to be damaged compared to the decoded image data of the I slice or the P slice, and there are cases in which, as the SAO process is performed, loss of the sense of detail is remarkably shown. Further, it is understood that there is the same tendency even when the intra prediction is applied to the B slice.

However, when the prediction mode set in the CTU serving as the processing target is either the intra prediction or the bi-prediction of the inter prediction, the second determining section 380 restricts the application of the SAO process to the CTU. In other words, the second determining section 380 controls whether or not the SAO process is applied in units of CTUs, thus suppressing the degradation of the image quality and reducing the processing amount of the cost calculation.

The subsequent process, that is, the operations of the analyzing section 320 and the filter processing section 390 according to the control of the switching determining section 360 is the same as in the first and second embodiments. The example of the configuration of the SAO filter 300 according to the present embodiment has been described above with reference to FIGS. 26 and 27.

4-3. Process Flow of SAO Filter

Figure 28:
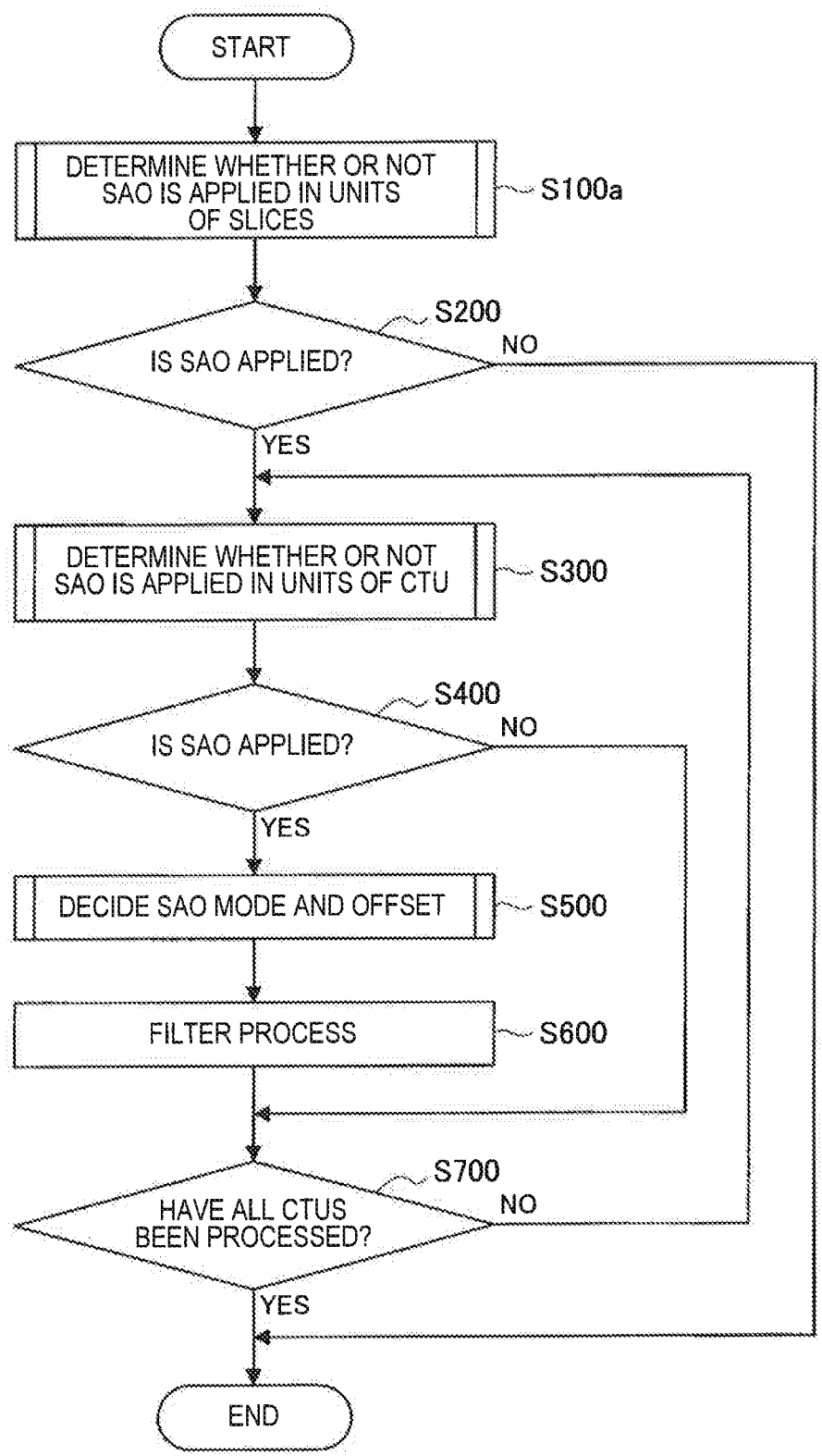
FIG. 28 is a flowchart illustrating an example of the flow of a series of processes of an SAO filter according to the same embodiment.

Next, the flow of a series of processes of the SAO filter 300 according to the present embodiment will be described with reference to FIG. 28. FIG. 28 is a flowchart illustrating an example of the flow of a series of processes of the SAO filter 300 according to the present embodiment.

The SAO filter 300 according to the present embodiment differs from the SAO filter 300 according to the first embodiment (see FIG. 8) in that content of a process of step S100a is different and processes of steps S300 and S400 are added. In this regard, the following description will proceed focusing on step S100a, S300, and S400 which are different from the SAO filter 300 according to the first embodiment, and a detailed description of the other processes is omitted.

(Step S100a)

The switching determining section 360 determines whether or not the SAO process is applied to luminance and chrominance in units of slices of the decoded image data, and controls the operation of the analyzing section 320 based on the determination result. Particularly, the switching determining section 360 according to the present embodiment restricts the application of the SAO process to the slice when the slice of the processing target is the B slice, and the quantization step is equal to or larger than the predetermined threshold value TH12. An operation of determining whether or not the SAO process is applied in units of slices through the switching determining section 360 will be separately described later.

(Step S300)

When the SAO process is determined to be applied to the slice (YES in step S200), the switching determining section 360 determines whether or not the SAO process is applied to luminance and chrominance for each CTU of the slice, and controls the operation of the analyzing section 320 based on the determination result. Particularly, the switching determining section 360 according to the present embodiment restricts the application of the SAO process to the CTU when the prediction mode set in the CTU serving as the processing target is either the intra prediction or the bi-prediction of the inter prediction. An operation of determining whether or not the SAO process is applied in units of CTUs through the switching determining section 360 will be separately described later.

(Step S500)

When the SAO process is determined to be applied to the CTU (YES in step S400), the analyzing section 320 decides the SAO mode for performing the SAO process and the offset value for the CTU based on the original image data and the decoded image data (that has undergone the deblock filter process).

(Step S600)

The filter processing section 390 performs the SAO process on each CTU of the decoded image data based on the SAO mode and the offset value supplied from the mode determining section 340.

(Step S700)

The above determination and process are performed on a series of CTUs of the target slice (NO in step S700), and when the determination and process on the series of CTUs is completed (YES in step S700), the application of the SAO process to the target slice is completed.

(Step S200)

Further, when the SAO process is not applied to the target slice (NO in step S200), the processes of step S300 to S700 are not performed on the slice.

Figure 29:
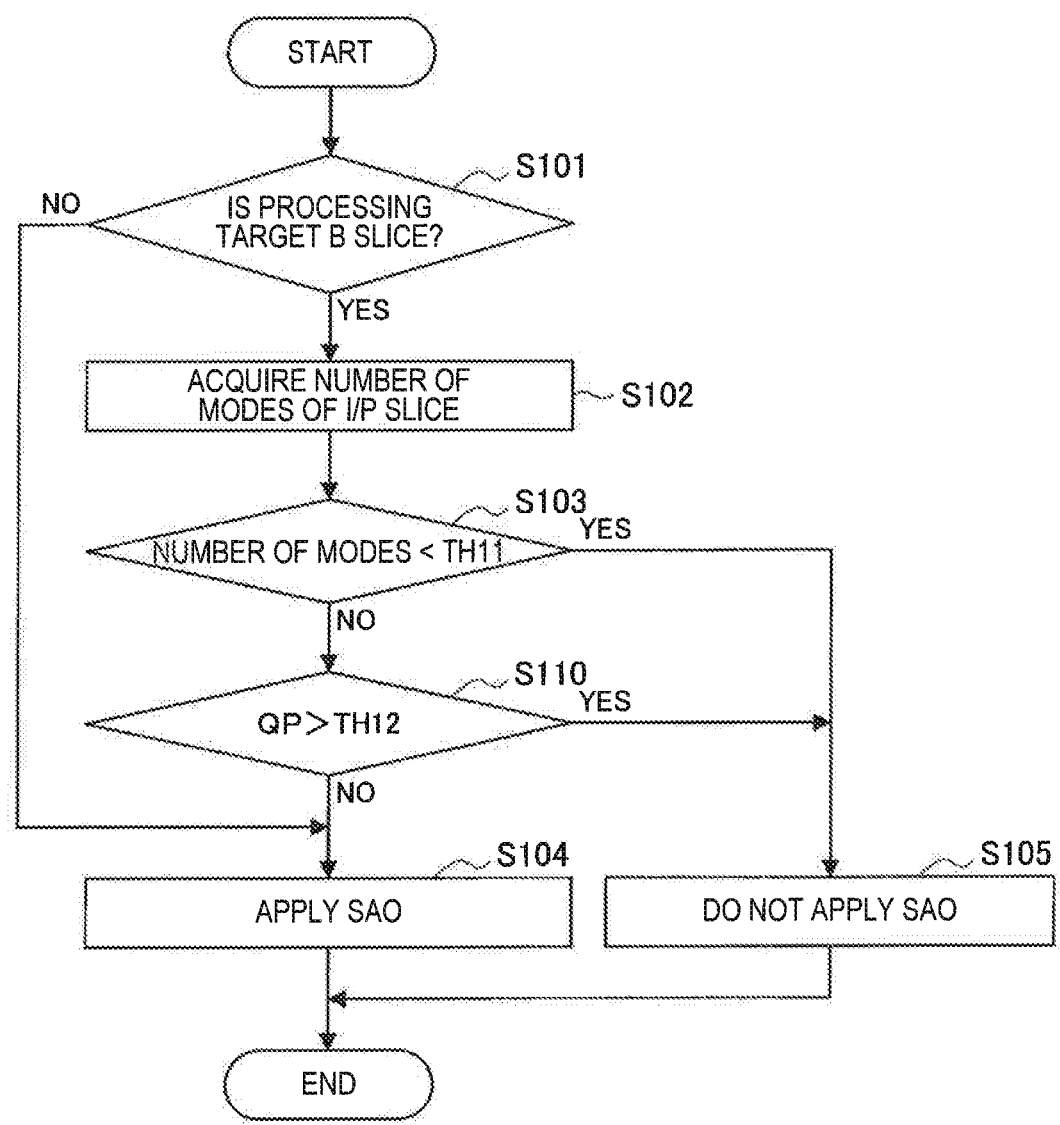
FIG. 29 is a flowchart illustrating an example of the flow of a series of processes of a first determining section according to the same embodiment.

Next, the process of step S100a in FIG. 28, that is, an example of a process of determining whether or not the SAO process is applied in units of slices through the switching determining section 360 (specifically, the first determining section 370) according to the present embodiment, will be described with reference to FIG. 29. FIG. 29 is a flowchart illustrating an example of a process of determining whether or not the SAO process is applied in units of slices through the switching determining section according to the present embodiment.

The switching determining section 360 according to the present embodiment differs from the switching determining section 360 according to the first embodiment (see FIG. 9) in that a process of step S110 is added. In this regard, the following description will proceed focusing on the process of step S110 that is different from the switching determining section 360 according to the first embodiment, and a detailed description of the other processes is omitted.

(Steps S101 and S102)

When the slice of the processing target is the B slice (YES in step S101), the switching determining section 360 according to the present embodiment acquires the number of CTUs (the number of modes) to which the SAO process is applied in the immediately previous slice (that is, the I slice or the P slice) of the B slice (step S102).

(Step S103)

When the acquired number of modes is equal to or larger than the predetermined threshold value TH11 (NO in step S103), the switching determining section 360 acquires the quantization step (QP) used for generating the quantized data serving as the decoding source of the decoded image data. Then, the determination processing section 373 controls whether or not the SAO process is applied to the B slice of the processing target based on the acquired quantization step.

(Step S104)

Specifically, when the acquired quantization step is equal to or less than the predetermined threshold value TH12 (NO in step S103), the switching determining section 360 instructs the analyzing section 320 to apply the SAO process to the B slice of the processing target.

(Step S105)

Further, when the acquired quantization step is larger than the predetermined threshold value TH12 (YES in step S103), the switching determining section 360 instructs the analyzing section 320 to restrict the application of the SAO process to the B slice of the processing target (that is, not to apply the SAO process to the B slice of the processing target).

As described above, the switching determining section 360 according to the present embodiment determines whether or not the SAO process is applied in units of slices, and controls the operation of the analyzing section 320 based on the determination result.

Figure 30:
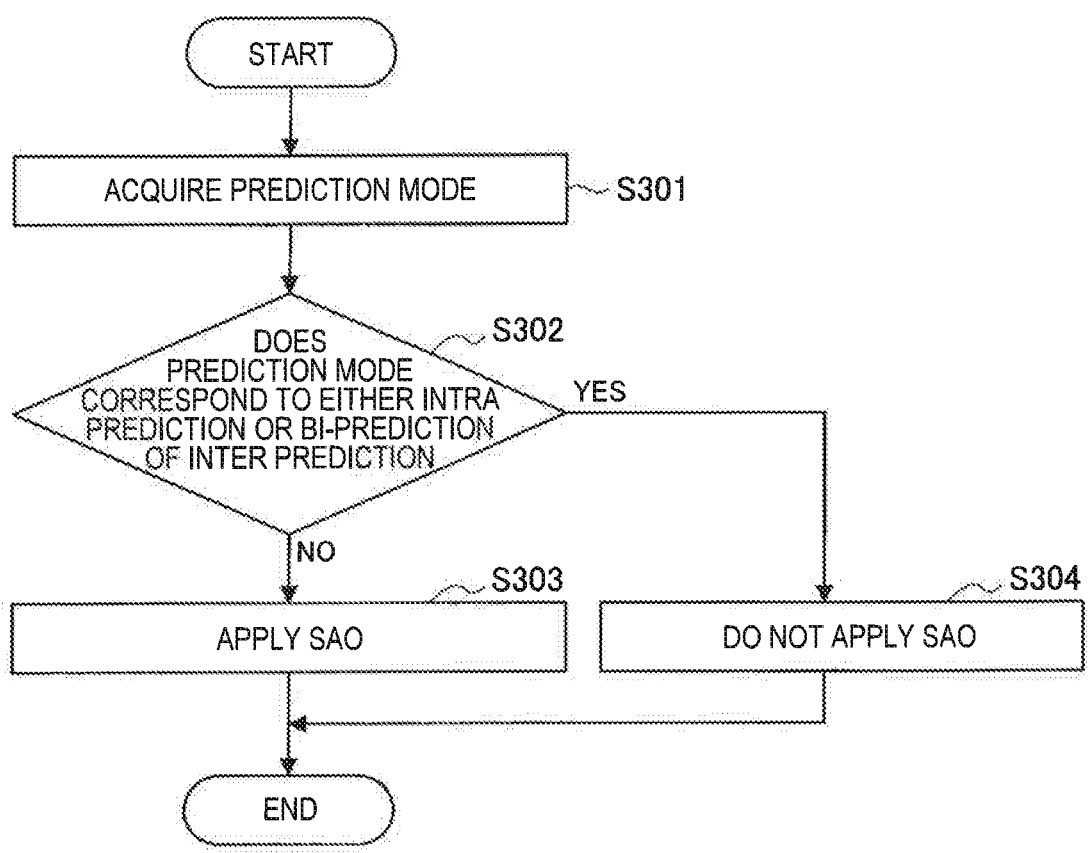
FIG. 30 is a flowchart illustrating an example of the flow of a series of processes of a second determining section according to the same embodiment.

Next, the process of step S300 in FIG. 28, that is, an example of a process of determining whether or not the SAO process is applied in units of CTUs through the switching determining section 360 (specifically, the second determining section 380) according to the present embodiment, will be described with reference to FIG. 30. FIG. 30 is a flowchart illustrating an example of a process of determining whether or not the SAO process is applied in units of CTUs through the switching determining section according to the present embodiment.

(Step S301)

The switching determining section 360 uses the prediction parameter indicating the prediction mode (that is, the intra prediction or the inter prediction) set in the CTU serving as the processing target as the encoding parameter used for determining whether or not the SAO process is applied. The switching determining section 360 acquires the prediction parameter, for example, from the selector 27 (see FIG. 3), and recognizes the prediction mode set in the CTU serving as the processing target based on the acquired prediction parameter.

(Step S302)

Then, the switching determining section 360 determines whether or not the recognized prediction mode corresponds to either the intra prediction or the bi-prediction of the inter prediction.

(Step S304)

When the recognized prediction mode is either the intra prediction or the bi-prediction of the inter prediction (YES in step S302), the switching determining section 360 instructs the analyzing section 320 to restrict the application of the SAO process to the CTU (that is, not to apply the SAO process to the CTU).

(Step S303)

When the recognized prediction mode is neither the intra prediction nor the bi-prediction of the inter prediction (NO in step S302), the switching determining section 360 instructs the analyzing section 320 to apply the SAO process to the CTU.

Thereafter, the analyzing section 320 performs the cost calculation and specifies the SAO mode and the offset value only for the CTU serving as the application target of the SAO process, and the filter processing section 390 performs the SAO process based on the SAO mode and the offset value.

The flow of the series of processes of the SAO filter 300 according to the present embodiment has been described above with reference to FIGS. 28 to 30. As described above, the SAO filter according to the present embodiment controls whether or not the SAO process is applied according to the encoding parameter set in the decoded image data of the target. The SAO filter according to the present embodiment controls whether or not the SAO process is applied in units of CTUs in addition to control in units of slices.

Through this configuration, in the image encoding device according to the present embodiment, the SAO filter suppresses the degradation of the image quality accompanied by encoding, and reduces the processing amount of the cost calculation. It will be appreciated that in the image encoding device according to the present embodiment, the processing amount of the cost calculation is reduced, and thus the power consumption can be reduced.

4-4. Modified Example

Next, a modified example of the switching determining section 360 according to the present embodiment will be described. In the above-described example, the switching determining section 360 controls whether or not the SAO process is applied in units of slices or in units of CTUs based on the type of slice, the prediction parameter such as the prediction mode of the inter prediction or the intra prediction, or the quantization parameter such as the QP. However, as described above, the method is not necessarily limited to the method based on the prediction parameter or the quantization parameter as long as it is possible to control whether or not the SAO process is applied in units of slices or in units of CTUs in view of influence on the image quality accompanied by the application of the SAO process.

As a specific example, of the luminance component and the chrominance component of each pixel of the decoded image data, the chrominance component is found to be larger in influence of the image quality improvement by the execution of the SAO process through an experiment or the like.

Using such a trend, the switching determining section 360 may perform control such that the application of the SAO process to the luminance component of the decoded image data is restricted, and the SAO process is applied only to the chrominance component.

At this time, the switching determining section 360 may control whether or not the SAO process is applied in units of slices or in units of CTUs. It will be appreciated that the switching determining section 360 may perform control such that the SAO process is applied only to the chrominance components of the decoded image collectively.

The method described above as the modified example may be appropriately combined with the method based on the prediction parameter or the quantization parameter. The method based on the prediction parameter or the quantization parameter may be replaced with the method described above as the modified example.

4-5. Conclusion

As described above, the SAO filter according to the present embodiment controls whether or not the SAO process is applied according to the encoding parameter set in the decoded image data of the target. Further, the SAO filter according to the present embodiment controls whether or not the SAO process is applied in units of CTUs in addition to control in units of slices.

Through this configuration, in the image encoding device according to the present embodiment, the SAO filter suppresses the degradation of the image quality accompanied by encoding, and reduces the processing amount of the cost calculation. It will be appreciated that in the image encoding device according to the present embodiment, the processing amount of the cost calculation is reduced, and thus the power consumption can be reduced.

The SAO filter 300 according to the present embodiment may be combined with either or both of the SAO filters 300 according to the first and second embodiments.

As a specific example, in the SAO filter 300 according to the present embodiment, the offset determining section 350 according to the first embodiment may be applied as the offset determining section 350 in the mode determining section 340. Through this configuration, it is possible to reduce the processing amount of the cost calculation for specifying the offset value and reduce the circuit size of the offset determining section 350.

Further, in the SAO filter 300 according to the present embodiment, the mode determining section 340 according to the second embodiment may be applied as the mode determining section 340. Through this configuration, the processing amount of the cost calculation for specifying the SAO mode can be further reduced.

As described above, it will be appreciated that the SAO filters 300 according to the respective embodiments are appropriately combined, the processing amount of the cost calculation is further reduced, and the power consumption can be further reduced.

5. FOURTH EMBODIMENT

5-1. Overview

Next, an image encoding device according to the fourth embodiment will be described. In the image encoding device according to the first embodiment, the SAO filter reduces the processing amount for specifying the offset value by restricting the candidates of the offset value and thus reduces the processing amount related to a series of cost calculations. On the other hand, in the image encoding device according to the present embodiment, the SAO filter further reduces the processing amount for specifying the offset value by further restricting the candidates of the offset value according to a picture type of a target picture.

Commonly, as a degree of divergence between each picture and the original image increases (that is, as similarity to the original image decreases), a larger offset value tends to be selected. On the other hand, a picture generated based on a prediction result of referring to another picture such as the P picture or the B picture has a temporal correlation with a picture serving as a reference destination, and a difference with the original image (that is, the number of candidates of the offset value) also depends on the picture of the reference destination. For this reason, in the picture generated based on the prediction result of referring to another picture, the candidates of the offset value (that is, the candidates of the offset value further diverging from the original image) that are higher than the offset value selected in the picture of the reference destination tend not to be selected. In other words, the candidate of the offset value (that is, the difference with the original image) that can be selected in the P picture or the B picture are candidates that are equal to or smaller in value than the candidates of the offset value selected in the picture of the reference destination, and thus the number of candidates of the offset value that can be selected in the P picture or the B picture is equal to or less than that of the picture of the reference destination.

In this regard, in the image encoding device according to the present embodiment, when the picture type of the picture serving as the processing target is the P picture or the B picture (that is, the picture generated based on the prediction result of referring to another picture), the SAO filter restricts the number of candidates of the offset value of the picture to the number of candidates in which up to a maximum value of the offset value selected in the picture of the reference destination is set as a target. Through such control, the SAO filter according to the present embodiment (particularly, the offset determining section 350) decides the offset value to be applied by restricting the number of candidates of the offset value, and the processing amount of the cost calculation of each candidate of the offset value is reduced.

Figure 31:
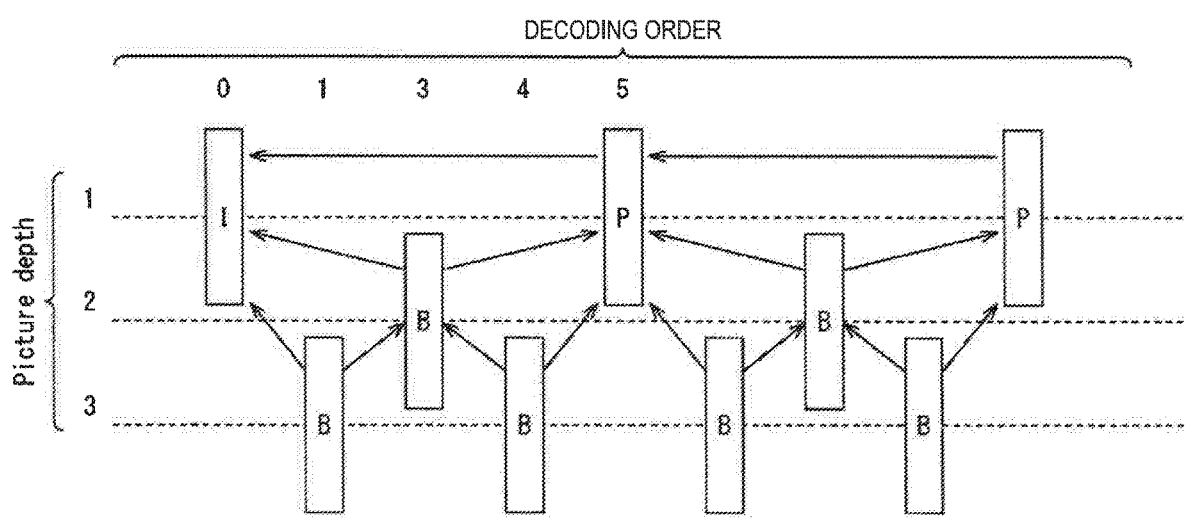
FIG. 31 is an explanatory view for describing an overview of an image encoding device according to a fourth embodiment of the present disclosure.

An operation of the SAO filter in the image encoding device according to the present embodiment will be described below in detail with reference to the drawings. For example, FIG. 31 is an explanatory diagram for describing an overview of the image encoding device according to the present embodiment and illustrates a reference relation among pictures (that is, the I picture, the P picture, and the B picture). FIG. 31 illustrates a reference relation among pictures when a picture depth is 3.

Here, an overview of the picture depth will be described. In the inter prediction, a block to be currently encoded is predicted using an encoded picture. For this reason, an order of pictures to be encoded and the reference relation are important. The picture depth is information indicating the reference relation between pictures (a GOP structure) of an image, and in detail, pictures in the same situation in the reference relation are grouped into 1 to 5, for example.

In the example illustrated in FIG. 31, a horizontal direction indicates a time of a decoding order. Each of rectangular portions indicates a picture, and each of symbols such as I, B, and P presented in the rectangular portions indicates a picture type of a picture. In other words, a picture with a symbol I indicates the I picture. Similarly, a picture with a symbol B indicates the B picture, and a picture with a symbol P indicates the P picture. Arrows connecting pictures indicate pictures that are referred to when the inter prediction is performed (that is, the reference relations between pictures).

For example, in the example illustrated in FIG. 31, a picture depth 1 includes the I picture and the P picture. The I picture does not refer to another picture. The P picture refers to a most recent picture among the I pictures and the P pictures positioned on the left side (that is, the past side) of the P picture itself. Specifically, the P picture positioned on the right side (that is, the future side) of the I picture refers to the I picture. Similarly, another P picture positioned on the right side of the I picture refers to the P picture positioned on the left side (that is, the past side) of the P picture itself.

A picture depth 2 includes the B pictures referring to the pictures of the picture depth 1. For example, in FIG. 31, the B pictures positioned between the I picture and the P picture among the B pictures included at the picture depth 2 refer to the I picture and the P picture. The B pictures positioned between the P picture and another P picture refer to the P picture and another P picture.

A picture depth 3 includes the B pictures that refer to the picture (that is, the I picture or the P picture) of the picture depth 1 in one of preceding and subsequent (that is, past and future) reference directions and refer to the picture (that is, the B picture) of the picture depth 2 in the other reference direction. For example, the B picture positioned between the I picture included at the picture depth 1 and the B picture included at the picture depth 2 among the B pictures included at the picture depth 3 refers to the I picture included at the picture depth 1 and the B picture included at the picture depth 2. Similarly, the B picture positioned between the B picture included at the picture depth 2 and the P picture included at the picture depth 1 refer to the B picture included at the picture depth 2 and the P picture included at the picture depth 1.

Here, content of a process of restricting the number of candidates of the offset value in the picture according to the picture type of the target picture through the SAO filter (particularly, the offset determining section 350) according to the present embodiment will be described using a specific example. For example, FIG. 32 is an explanatory view for describing content of a process of restricting the number of candidates of the offset value according to the picture type through the SAO filter according to the present embodiment. In FIG. 32, the I picture, the P picture, and the B picture are assumed to be in the reference relation. In other words, in FIG. 32, the P picture refers to the I picture, and the B picture refers to the I picture and the P picture.

When the picture type is the I picture, the offset determining section 350 according to the present embodiment sets the maximum value of the number of candidates of the offset value to "8," similarly to the offset determining section 350 according to the first embodiment. In other words, when the picture type is the I picture, for example, all of the Offset[0] measuring section to the Offset[7] measuring section among the offset measuring sections 351 illustrated in FIG. 13 are used.

Further, when the picture type is the P picture, the offset determining section 350 sets up to the maximum value among the offset values selected in the I picture serving as the reference destination of the P picture as a target, and restricts the number of candidates of the offset value in the P picture. For example, the maximum value of the offset value selected in the picture of the reference destination can be acquired based on the statistic calculated for specifying the offset value in the picture of the reference destination.

As a specific example, in the example illustrated in FIG. 32, the maximum of the offset value selected in the I picture is assumed to be an offset value serving as the target of the Offset[5] measuring section. In this case, the offset determining section 350 sets up to the offset value serving as the target of the Offset[5] measuring section (that is, the offset values serving as the target of the Offset[0] measuring section to the Offset[5] measuring section) for the P picture referring to the I picture as the candidates of the offset value corresponding to the P picture. In other words, in the case of the example illustrated in FIG. 32, for the P picture, the number of candidates of the offset value is restricted to "6," and the Offset[0] measuring section to the Offset[5] measuring section among the offset measuring sections 351 illustrated in FIG. 13 are used.

When the picture type is the B picture, the offset determining section 350 sets up to the maximum values of the offset values selected in the I picture and the P picture serving as the reference destination of the B picture as the target, and restricts the number of candidates of the offset value in the B picture.

At this time, the offset determining section 350 restricts the number of candidates of the offset value in the B picture based on a smaller one of the maximum values of the offset values selected in the reference destinations (for example, the I picture and the P picture). This is because the B picture can refer to pictures preceding and subsequent thereto (for example, the I picture and the P picture in FIG. 32), and thus it is desirable to refer to a picture that is smaller in the difference with the original image among the pictures of the reference destination.

For example, in the example illustrated in FIG. 32, the maximum of the offset value selected in the I picture is assumed to be the offset value serving as the target of the Offset[5] measuring section, and the maximum of the offset value selected in the P picture is assumed to be the offset value serving as the target of the Offset[3] measuring section. In this case, the offset determining section 350 sets up to the offset value serving as the target of the Offset[3] measuring section (that is, the offset values serving as the target of the Offset[0] measuring section to the Offset[3] measuring section) as the candidates of the offset value corresponding to the B picture for the B picture referring to the I picture and the P picture. In other words, in the case of the example illustrated in FIG. 32, for the B picture, the number of candidates of the offset value is restricted to "4," and the Offset[0] measuring section to the Offset[3] measuring section among the offset measuring sections 351 illustrated in FIG. 13 are used.

In the example illustrated in FIG. 32, the example of the B picture included at the picture depth 2 in the example illustrated in FIG. 31 has been described above as the B picture, but the basic concept is the same for the B pictures in the other picture depths.

For example, in the example illustrated in FIG. 31, the B picture (that is, the B picture in which the decoding order is indicated by "1") positioned between the I picture included at the picture depth 1 and the B picture included at the picture depth 2 is focused on. In this case, based on the smaller one of the maximum values of the offset values selected in the I picture included at the picture depth 1 and the B picture included at the picture depth 2, the offset determining section 350 restricts the number of candidates of the offset value in the B picture included at the picture depth 2.

As a specific example, the maximum value of the offset values selected on the I picture side is assumed to be the offset value serving as the target of the Offset[5] measuring section, and the maximum value of the offset values selected on the B picture side included at the picture depth 2 is assumed to be the offset value serving as the target of the Offset[3] measuring section. In this case, the offset determining section 350 restricts the number of candidates of the offset value in the B picture included at the picture depth 2 based on the offset value serving as the target of the Offset[3] measuring section.

At this time, the B picture included at the picture depth 2 refers to the I picture included at the picture depth 1. For this reason, the maximum value of the offset values selected in the B picture included at the picture depth 2 does not exceed the maximum value of the offset values selected in the I picture included at the picture depth 1. Using such a trend, for example, when any one of the pictures of the reference destination is the B picture, the offset determining section 350 may restrict the number of candidates of the offset value in the target picture (that is, the B picture having the deep picture depth) based on the maximum value of the offset values selected in the B picture.

Due to the above-described trends, as the picture depth in which the picture is included increases, the maximum value of the offset values decreases, and the number of candidates of the offset value is further restricted. For this reason, for example, in the case of the picture having a plurality of reference destinations (that is, the B picture), the offset determining section 350 may restrict the number of candidates of the offset value in the target picture based on the maximum value of the offset values selected in the picture included at the deeper picture depth.

The overview of the SAO filter in the image encoding device according to the present embodiment has been described above with reference to FIGS. 31 and 32.

5-2. Process

Next, an example of the flow of a series of processes of the SAO filter in the image encoding device according to the present embodiment will be described, particularly focusing on the process of the offset determining section 350. For example, FIGS. 33 and 34 are flowcharts illustrating an example of the flow of a series of processes of the offset determining section 350 in the image encoding device according to the present embodiment.

Figure 33:
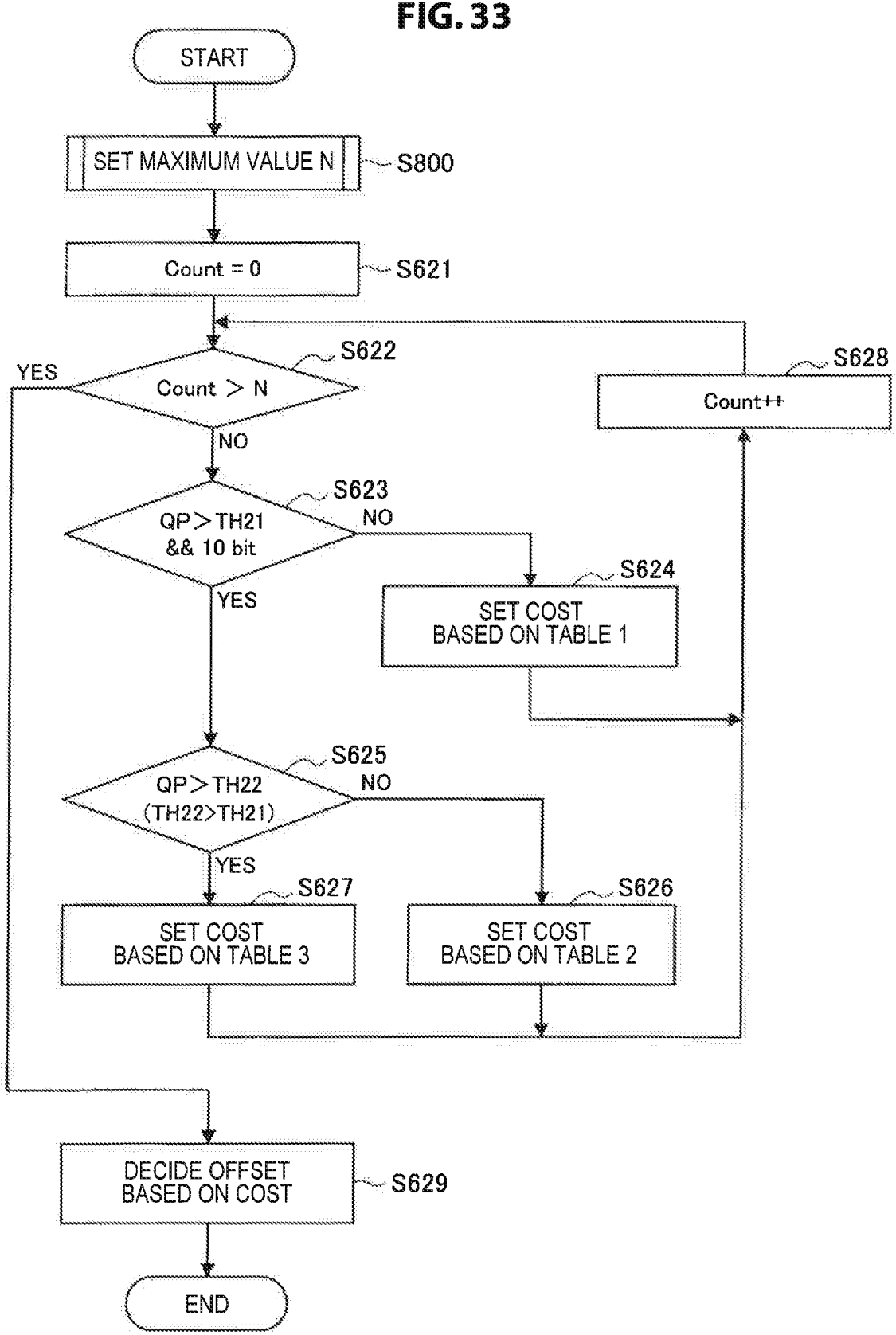
FIG. 33 is a flowchart illustrating an example of the flow of a series of processes of an offset determining section according to the same embodiment
Figure 34:
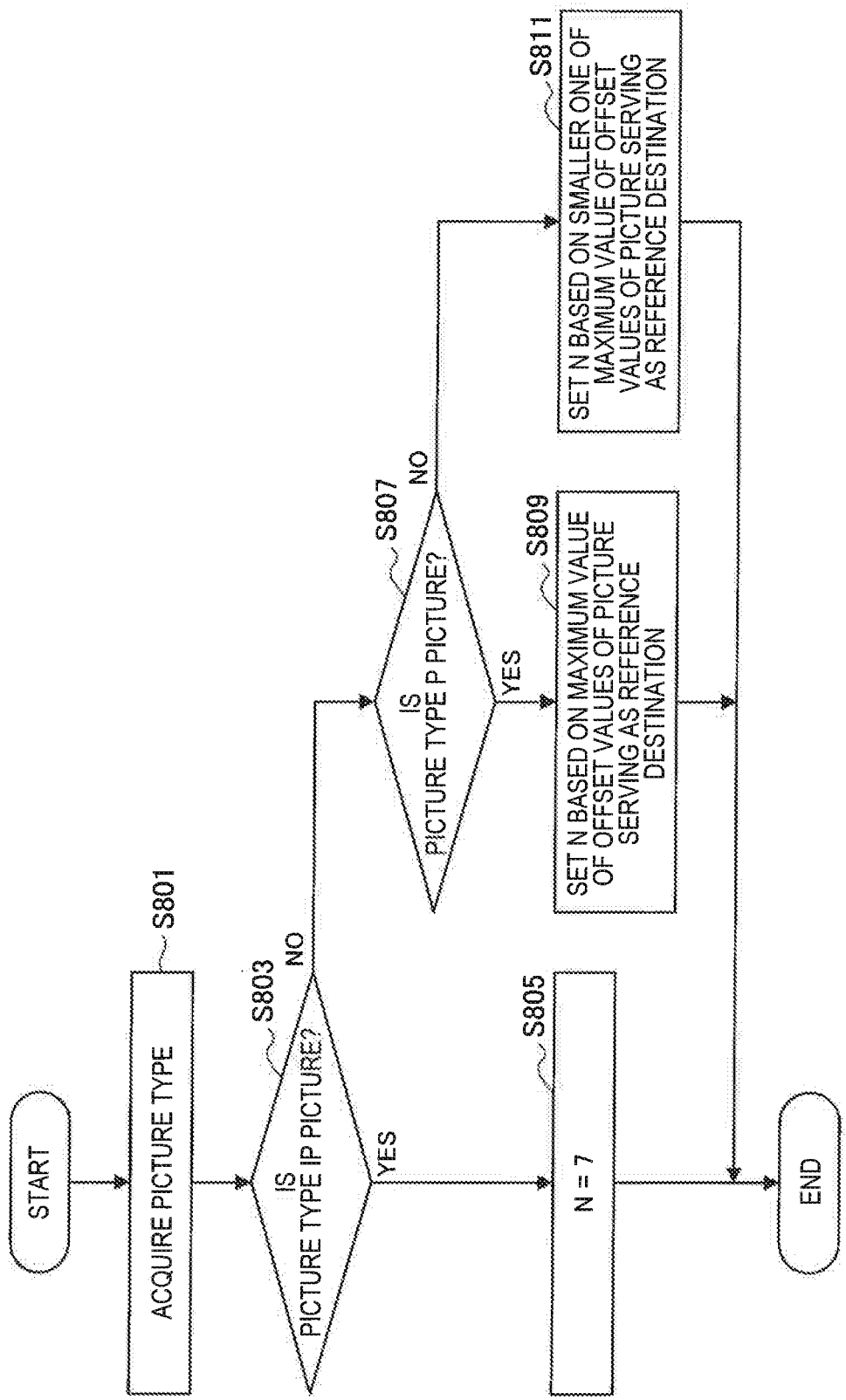
FIG. 34 is a flowchart illustrating an example of the flow of a series of processes of an offset determining section according to the same embodiment.

As can be seen from a comparison of the flowchart illustrated in FIG. 33 and the flowchart illustrated in FIG. 17, the offset determining section 350 according to the present embodiment differs from the offset determining section 350 according to the first embodiment in that a process of step S800 (that is, a process of restricting the number of candidates of the offset value) is included. In this regard, in this specification, an example of a process flow of the offset determining section 350 according to the present embodiment will be described, focusing on different portions from the offset determining section 350 according to the first embodiment (see FIG. 17), and a detailed description of the other components is omitted.

(Step S800)

First, the offset determining section 350 restricts the number of candidates of the offset value (that is, the maximum value N of the number of candidates of the offset value) according to the picture type of the target picture.

Here, FIG. 34 is referred to. FIG. 34 is a flowchart illustrating an example of the flow of a process of restricting the number of candidates of the offset value according to the picture type of the target picture through the offset determining section 350 (that is, the process of step S800 in FIG. 33).

(Step S801)

First, the offset determining section 350 determines whether or not the picture corresponds to any one of the I picture, the P picture, and the B picture based on information indicating the picture type of the processing target picture.

(Step S805)

When the target picture is the I picture (YES in step S803), the offset determining section 350 sets the maximum value N of the number of candidates of the offset value to 7.

(Step S809)

When the target picture is the P picture (NO in step S803 and YES in step S807), the offset determining section 350 restricts the maximum value N of the number of candidates of the offset value of the picture based on the maximum value of the offset values selected in another picture (for example, the I picture or the P picture) referred to by the picture. At this time, the offset determining section 350 preferably specifies the maximum value of the offset values selected in another picture based on the statistic calculated for specifying the offset value in another picture serving as the reference destination.

(Step S809)

When the target picture is the B picture (NO in step S803 and NO in step S807), the offset determining section 350 restricts the maximum value N of the number of candidates of the offset value of the picture based on the smaller one of the maximum values of the offset values selected in other pictures (for example, the I picture, the P picture, or the B picture) referred to by the picture. At this time, the offset determining section 350 preferably specifies the maximum value of the offset values selected in another picture based on the statistic calculated for specifying the offset value in other pictures serving as the reference destination.

As described above, the offset determining section 350 restricts the number of candidates of the offset value (that is, the maximum value N of the number of candidates of the offset value) according to the picture type of the target picture.

The subsequent process (that is, the process subsequent to step S621 in FIG. 33) is the same as in the offset determining section 350 according to the first embodiment.

In the example illustrated in FIG. 33 compared with the example illustrated in FIG. 17, the maximum value N of the number of candidates of the offset value is restricted based on the processing result of step S800. Thus, according to the offset determining section 350 according to the present embodiment, when the picture type is the P picture or the B picture, it is possible to omit the cost calculation corresponding to the candidate by the restricted number of candidates of the offset value (that is, the number of executions (the number of loops) of a series of processes of steps S622 to S628 is restricted). Thus, the offset determining section 350 according to the present embodiment can reduce the processing amount related to the cost calculation of each candidate of the offset value for specifying the offset value to be smaller than the offset determining section 350 according to the first embodiment (see FIG. 17).

The example of the flow of the series of processes of the SAO filter in the image encoding device according to the present embodiment has been described above with reference to FIGS. 33 and 34, particularly focusing on the process of the offset determining section 350.

5-3. Conclusion

As described above, the SAO filter of the image encoding device according to the present embodiment further restricts the candidates of the offset value according to the picture type of the target picture. Specifically, when the target picture is the P picture or the B picture (that is, the picture generated based on the prediction result of referring to another picture), the SAO filter restricts the number of candidates of the offset value of the picture based on the maximum value of the offset values selected in another picture serving as the reference destination. Through this configuration, the SAO filter according to the present embodiment decides the offset value to be applied, and thus it is possible to reduce the processing amount of the cost calculation of each candidate of the offset value.

Particularly, in the SAO filter, generally, when the B picture or the P picture is the processing target, the processing amount tends to be larger than when the I picture is the processing target. On the other hand, in the SAO filter according to the present embodiment, when the P picture or the B picture is the target, the processing load of the cost calculation of each candidate of the offset value is reduced, and thus it is possible to reduce the processing amount when the P picture or the B picture is the target.

As similarity between pictures that are in the reference relation tends to increase, the offset value selected in each picture tends to decrease. In other words, in the SAO filter according to the present embodiment, due to trends of the above-described process, as similarity between pictures that are in the reference relation increases, the number of candidates of the offset value in the P picture or the B picture is further restricted.

As a specific example, as the frame rate increases, a chronological distance between frames decreases, and similarity between frames tends to increase, and thus the smaller offset value tends to be selected. Thus, in the SAO filter according to the present embodiment, as the frame rate increases, it is possible to further restrict the number of candidates of the offset value in the P picture or the B picture and further reduce the processing amount.

6. EXEMPLARY HARDWARE CONFIGURATION

The embodiments may be implemented using software, hardware, or a combination of software and hardware. For example, when the image encoding device 10 uses software, a program constituting software is stored in a storage medium (a non-transitory medium) in advance installed inside or outside an apparatus. For example, each program is read in a random access memory (RAM) and executed by a processor such as a central processing unit (CPU).

Figure 35:
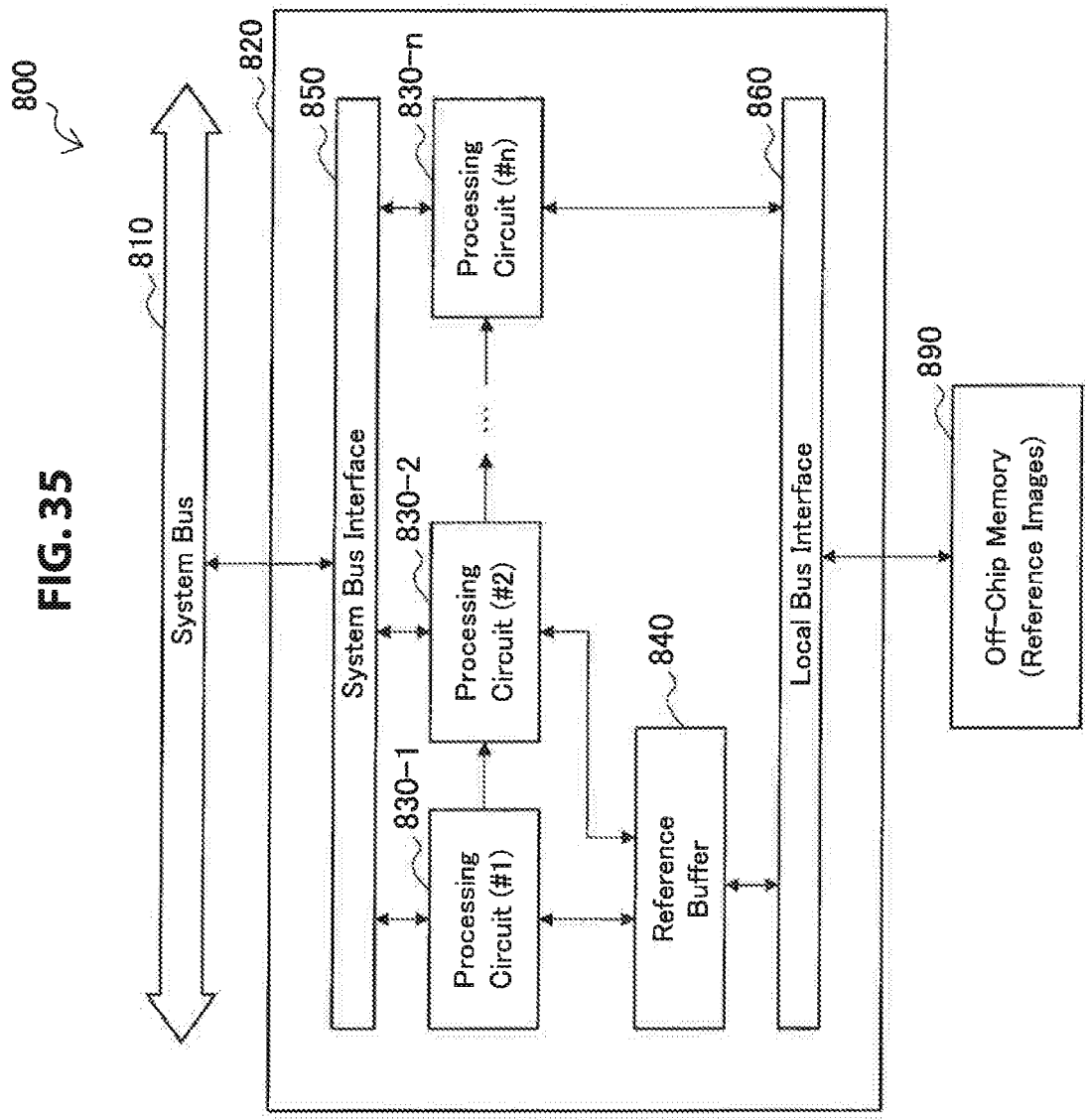
FIG. 35 is a block diagram illustrating an example of a hardware configuration of an encoder.

FIG. 35 is a block diagram illustrating an example of a hardware configuration of an encoder to which the above embodiments can be applied. Referring to FIG. 35, an encoder 800 includes a system bus 810, an image processing chip 820, and an off-chip memory 890. The image processing chip 820 includes n (n is 1 or more) processing circuits 830-1, 830-2, . . . , and 830-n, a reference buffer 840, a system bus interface 850, and a local bus interface 860.

The system bus 810 provides a communication path between the image processing chip 820 and an external module (for example, a central control function, an application function, a communication interface, a user interface, or the like). The processing circuits 830-1, 830-2, . . . , and 830-n are connected with the system bus 810 through the system bus interface 850 and are connected with the off-chip memory 890 through the local bus interface 860. The processing circuit 830-1, 830-2, . . . , and 830-n can access the reference buffer 840 that may correspond to an on-chip memory (for example, a SRAM). For example, the off-chip memory 890 may be a frame memory that stores image data to be processed by the image processing chip 820.

As an example, the processing circuit 830-1 may correspond to the intra prediction section 30, the processing circuit 830-2 may correspond to the inter prediction section 35, another processing circuit may correspond to the orthogonal transform section 14, and another processing circuit may correspond to the lossless encoding section 16. Another processing circuit may correspond to the loop filter 24. Each of the deblock filter 200, the SAO filter 300, and the adaptive loop filter 400 constituting the loop filter 24 may be configured as another processing circuit. The processing circuits may be formed on another chip instead of the same image processing chip 820.

7. APPLICATION EXAMPLES

7-1. Applications to Various Products

The above embodiments can be applied to various electronic devices such as a transmitting device that transmits an encoded stream of a video using a satellite circuit, a cable television circuit, the Internet, a cellular communication network, or the like or a recording device that records an encoded stream of a video in a medium such as an optical disc, a magnetic disk, or a flash memory. Three application examples will be described below.

(1) First Application Example

Figure 36:
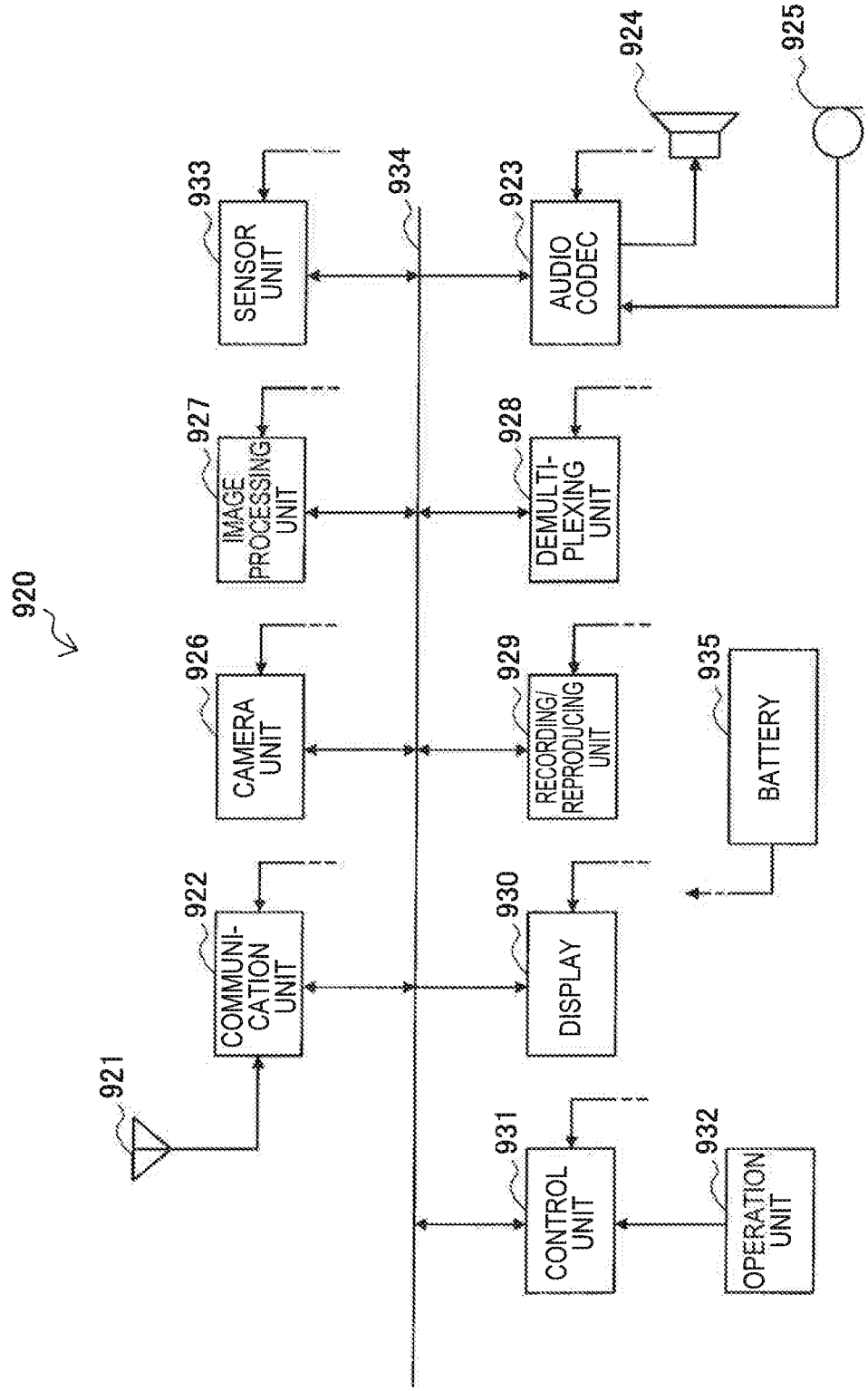
FIG. 36 is a block diagram illustrating an example of a schematic configuration of a mobile phone.

FIG. 36 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, a sensor unit 933, a bus 934, and a battery 935.

The antenna 921 is connected to the communication unit 922. The speaker 924 and the microphone 925 are connected to the audio codec 923. The operation unit 932 is connected to the control unit 931. The bus 934 mutually connects the communication unit 922, the audio codec 923, the camera unit 926, the image processing unit 927, the demultiplexing unit 928, the recording/reproducing unit 929, the display 930, the control unit 931, and the sensor unit 933.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The sensor unit 933 includes a group of sensors such as an acceleration sensor and a gyro sensor, and outputs an index indicating motion of the mobile telephone 920. The battery 935 supplies electric power to the communication unit 922, the audio codec 923, the camera unit 926, the image processing unit 927, the demultiplexing unit 928, the recording/reproducing unit 929, the display 930, the control unit 931, and the sensor unit 933 through a power supply line (not illustrated).

In the mobile telephone 920 having the above configuration, the image processing unit 927 has the function of the image encoding device 10 according to the above embodiments. Thus, in the mobile telephone 920, it is possible to reduce the processing amount of the cost calculation for deciding the SAO mode to be applied and the offset value to be applied and reduce the power consumption and the circuit size of the mobile telephone 920.

(2) Second Application Example

Figure 37:
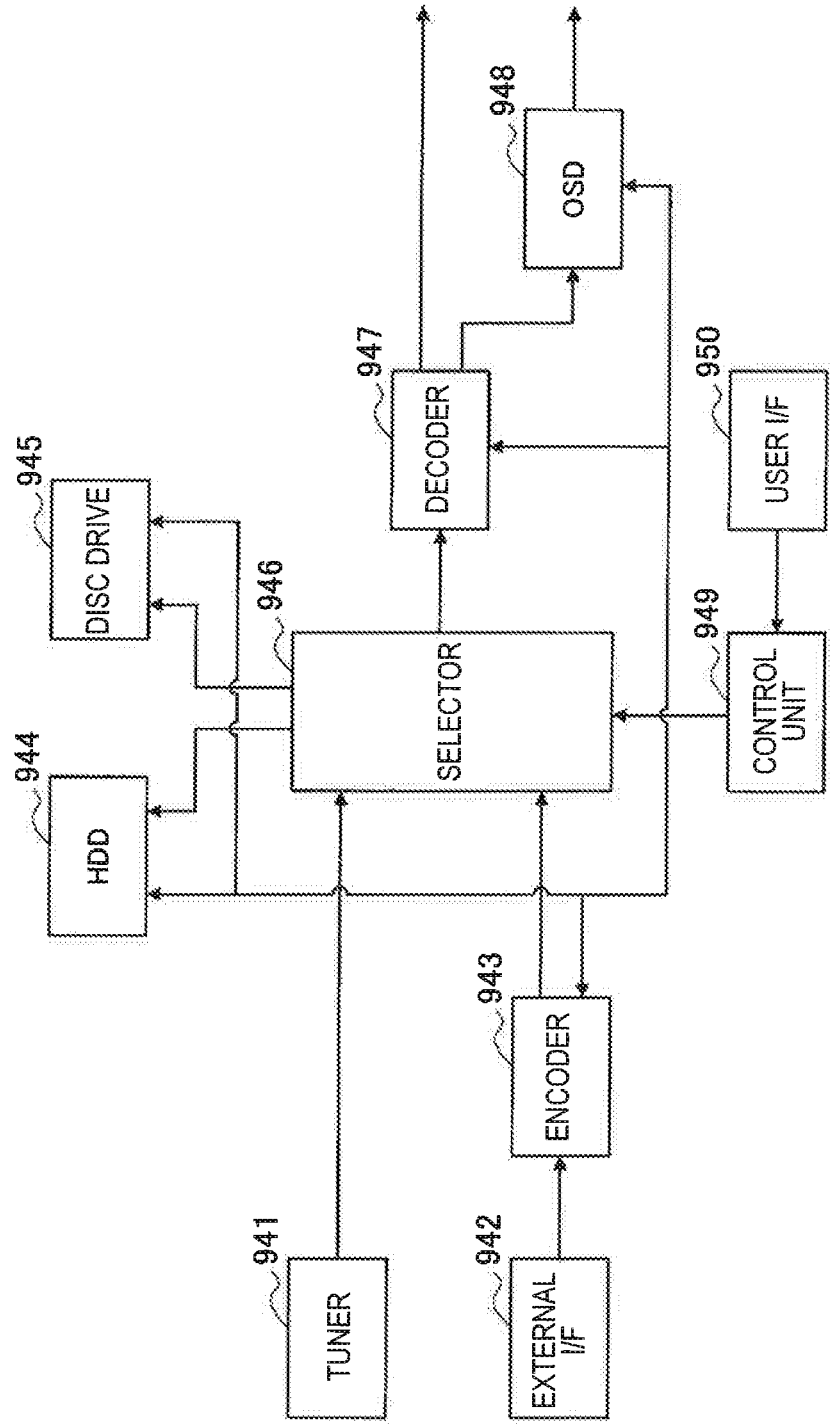
FIG. 37 is a block diagram illustrating an example of a schematic configuration of a recording/reproduction device.

FIG. 37 is a diagram illustrating an example of a schematic configuration of a recording/reproducing device applying the aforementioned embodiment. A recording/reproducing device 940 encodes audio data and video data of a broadcast program received and records the data into a recording medium, for example. The 16 recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

In the recording/reproducing device 940 having the above configuration, the encoder 943 has the function of the image encoding device 10 according to the above embodiments. Thus, in the recording/reproducing device 940, it is possible to reduce the processing amount of the cost calculation for deciding the SAO mode to be applied and the offset value to be applied and reduce the power consumption and the circuit size of the recording/reproducing device 940.

(3) Third Application Example

Figure 38:
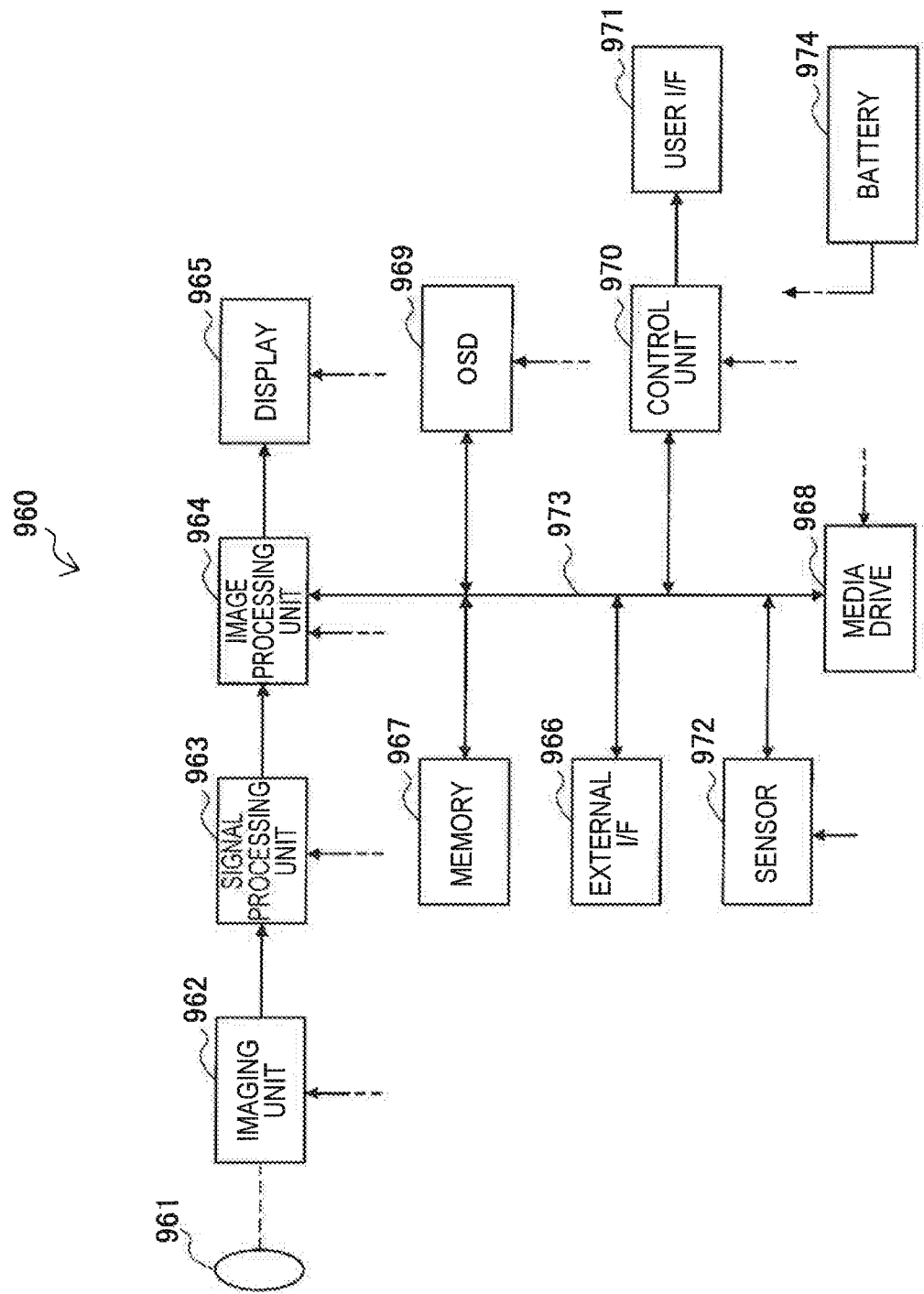
FIG. 38 is a block diagram illustrating an example of a schematic configuration of an image capturing device.

FIG. 38 shows an example of a schematic configuration of an image capturing device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, a sensor 972, a bus 973, and a battery 974.

The optical block 961 is connected to the imaging unit 962. The imaging unit 962 is connected to the signal processing unit 963. The display 965 is connected to the image processing unit 964. The user interface 971 is connected to the control unit 970. The bus 973 mutually connects the image processing unit 964, the external interface 966, the memory 967, the media drive 968, the OSD 969, the control unit 970, and the sensor 972.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The sensor 972 includes a group of sensors such as an acceleration sensor and a gyro sensor, and outputs an index indicating motion of the imaging device 960. The battery 974 supplies electric power to the imaging unit 962, the signal processing unit 963, the image processing unit 964, the display 965, the media drive 968, the OSD 969, the control unit 970, and the sensor 972 through a power supply line (not illustrated).

In the imaging device 960 having the above configuration, the image processing unit 964 has the function of the image encoding device 10 according to the above embodiments. Thus, in the imaging device 960, it is possible to reduce the processing amount of the cost calculation for deciding the SAO mode to be applied and the offset value to be applied and reduce the power consumption and the circuit size of the imaging device 960.

7-2. Various Implementation Levels

The technology according to the present disclosure may be implemented at various implementation levels such as a processor including a system large scale integration (LSI) or the like, a module using a plurality of processors, a unit using a plurality of modules, and a set in which other functions are further added to a unit.

(1) Video Set

Figure 39:
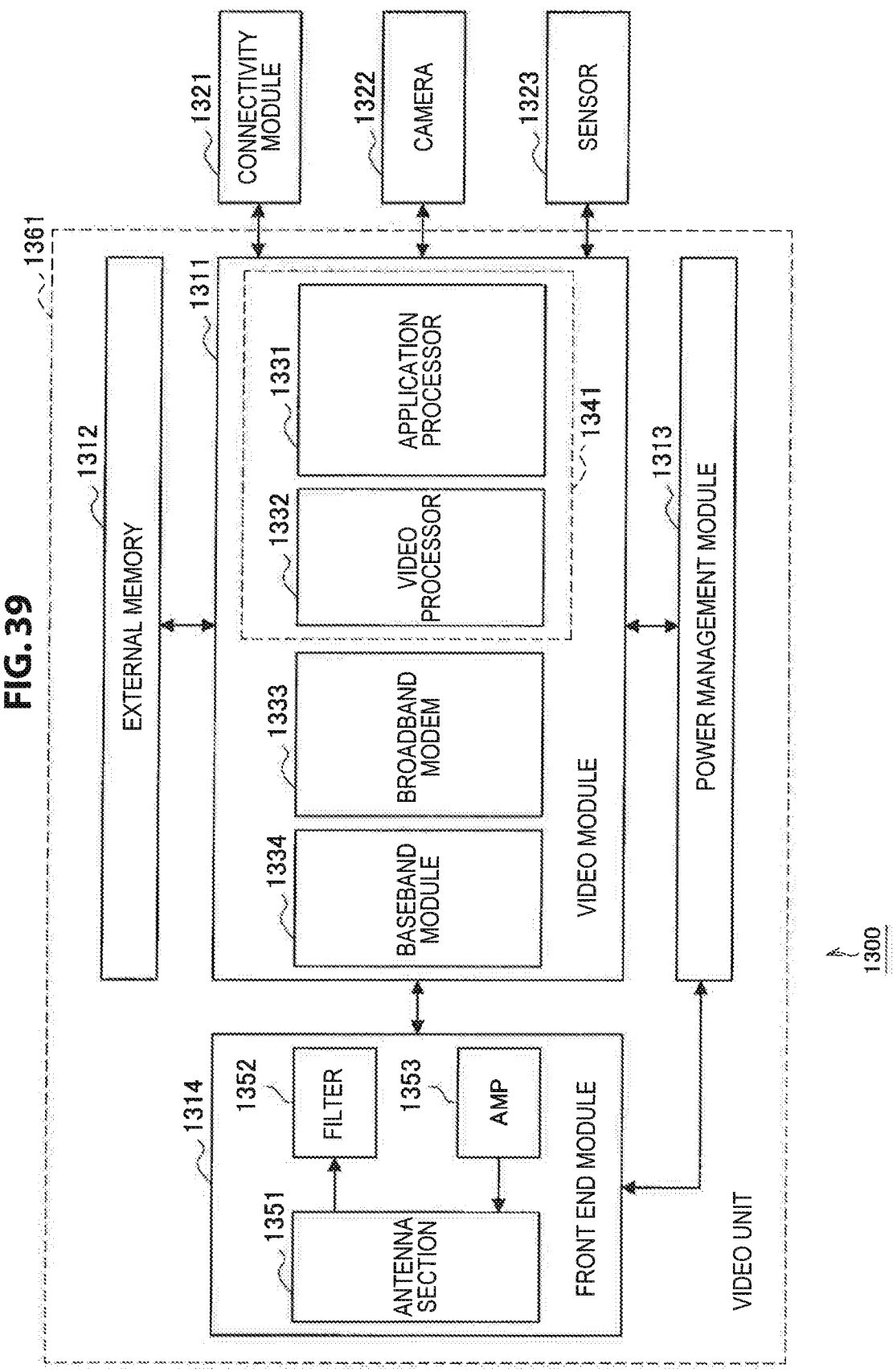
FIG. 39 is a block diagram illustrating an example of a schematic configuration of a video set.

An example in which the technology according to the present disclosure is implemented as a set will be described with reference to FIG. 39. FIG. 39 is a block diagram illustrating an example of a schematic configuration of a video set.

In recent years, functions of electronic devices have become diverse. In development and manufacturing of electronic devices, development and manufacturing are performed for each individual function, and then a plurality of functions are integrated. Thus, there are companies that manufacture or sell only some electronic devices. The companies provide components having a single function or a plurality of relevant functions or provide sets having an integrated function group. A video set 1300 illustrated in FIG. 39 is a set that includes a component for encoding and decoding (or one of encoding and decoding) of an image and a component having another function relevant to the functions in an integrated manner.

Referring to FIG. 39, the video set 1300 includes a module group such as a video module 1311, an external memory 1312, a power management module 1313, and a front end module 1314 and a device group having relevant functions such as a connectivity module 1321, a camera 1322, and a sensor 1323.

The module is a component formed by integrating parts for several relevant functions. The module may have any physical configuration. As an example, the module may be formed by arranging a plurality of processors having the same or different functions, electronic circuit elements such as a resistor and a capacitor, and other devices in an integrated manner on a circuit board. Another module may be formed by combining a module with another module, a processor, or the like.

In the example of FIG. 39, parts for functions related to image processing are integrated in the video module 1311. The video module 1311 includes an application processor 1331, a video processor 1332, a broadband modem 1333, and a baseband module 1334.

The processor may be, for example, a system on a chip (SOC) or a system LSI. The SoC or the system LSI may include hardware for implementing a predetermined logic. The SoC or the system LSI may include a CPU and a non-transitory tangible medium that stores a program for causing the CPU to execute a predetermined function. The program may be, for example, stored in a ROM and read in a RAM at the time of execution and executed by the CPU.

The application processor 1331 is a processor that executes an application related to image processing. The application executed in the application processor 1331 may perform, for example, control of the video processor 1332 and other components in addition to some sort of operations for image processing. The video processor 1332 is a processor having a function related to encoding and decoding of an image. The application processor 1331 and the video processor 1332 may be integrated into one processor (see a dotted line 1341 in FIG. 39).

The broadband modem 1333 is a module that performs a process related to communication via a network such as the Internet or a public switched telephone network (PSTN). For example, the broadband modem 1333 performs digital modulation of converting a digital signal including transmission data into an analogue signal and digital demodulation of converting an analogue signal including reception data into a digital signal. The transmission data and the reception data processed by the broadband modem 1333 may include arbitrary information such as image data, an encoded stream of image data, application data, an application program, and setting data.

The baseband module 1334 is a module that performs a baseband process for a radio frequency (RF) signal transmitted and received through the front end module 1314. For example, the baseband module 1334 modulates a transmission baseband signal including transmission data, performs a frequency transform of the transmission baseband signal into an RF signal, and outputs the RF signal to the front end module 1314. The baseband module 1334 performs a frequency transform on an RF signal input from the front end module 1314, performs demodulations, and generates a reception baseband signal including reception data.

The external memory 1312 is a memory device that is installed outside the video module 1311 and accessible from the video module 1311. When large-scale data such as video data including a plurality of frames is stored in the external memory 1312, the external memory 1312 may include a large-capacity semiconductor memory that is relatively cheap such as a dynamic random access memory (DRAM).

The power management module 1313 is a module that controls power supply to the video module 1311 and the front end module 1314.

The front end module 1314 is a module that is connected to the baseband module 1334 and provides a front end function. In the example of FIG. 39, the front end module 1314 includes an antenna section 1351, a filter 1352, and an amplification section 1353. The antenna section 1351 includes one or more antenna elements that transmit or receive a radio signal and a relevant component such as an antenna switch. The antenna section 1351 transmits the RF signal amplified by the amplification section 1353 as the radio signal. The antenna section 1351 outputs the RF signal received as the radio signal to the filter 1352, and causes the filter 1352 to filter the RF signal.

The connectivity module 1321 is a module having a function related to an external connection of the video set 1300. The connectivity module 1321 may support an arbitrary external connection protocol. For example, the connectivity module 1321 may include a sub module that supports a wireless connection protocol such as Bluetooth (a registered trademark), IEEE 802.11 (for example, Wi-Fi (a registered trademark)), Near Field Communication (NFC), or InfraRed Data Association (IrDA) and a corresponding antenna. The connectivity module 1321 may include a sub module that supports a wired connection protocol such as Universal Serial Bus (USB) or High-Definition Multimedia Interface (HDMI) and a corresponding connection terminal.

The connectivity module 1321 may include a drive that writes or reads data in or from a storage device such as a storage medium such as a magnetic disk, an optical disc, a magneto optical disc, or a semiconductor memory, a Solid State Drive (SSD), or a Network Attached Storage (NAS). The connectivity module 1321 may include the storage medium or the storage device. The connectivity module 1321 may provide connectivity with a display displaying an image or a speaker outputting a sound.

The camera 1322 is a module that acquires a photographed image by photographing a subject. A series of photographed images acquired by the camera 1322 constitutes video data. For example, the video data generated by the camera 1322 may be encoded by the video processor 1332 as necessary and stored in the external memory 1312 or a storage medium connected to the connectivity module 1321.

The sensor 1323 is a module that may include one or more of, for example, a GPS sensor, a sound sensor, an ultrasonic sensor, an optical sensor, an illuminance sensor, an infrared sensor, an angular velocity sensor, an angular acceleration sensor, a velocity sensor, an acceleration sensor, a gyro sensor, a geomagnetic sensor, a shock sensor, and a temperature sensor. For example, sensor data generated by the sensor 1323 may be used for execution of an application by the application processor 1331.

In the video set 1300 having the above configuration, the technology according to the present disclosure may be used, for example, in the video processor 1332. In this case, the video set 1300 is a set to which the technology according to the present disclosure is applied.

The video set 1300 may be implemented as various kinds of devices processing image data. For example, the video set 1300 may correspond to the television device 900, the mobile telephone 920, the recording/reproducing device 940, or the imaging device 960 described above with reference to FIGS. 20 to 23. The video set 1300 may correspond to a terminal device such as the personal computer 1004, the AV device 1005, the tablet device 1006, or the mobile telephone 1007 in the data transmission system 1000 described above with reference to FIG. 24, the broadcasting station 1101 or the terminal device 1102 in the data transmission system 1100 described above with reference to FIG. 25, or the imaging device 1201 or the stream storage device 1202 in the imaging system 1200 described above with reference to FIG. 26.

(2) Video Processor

Figure 40:
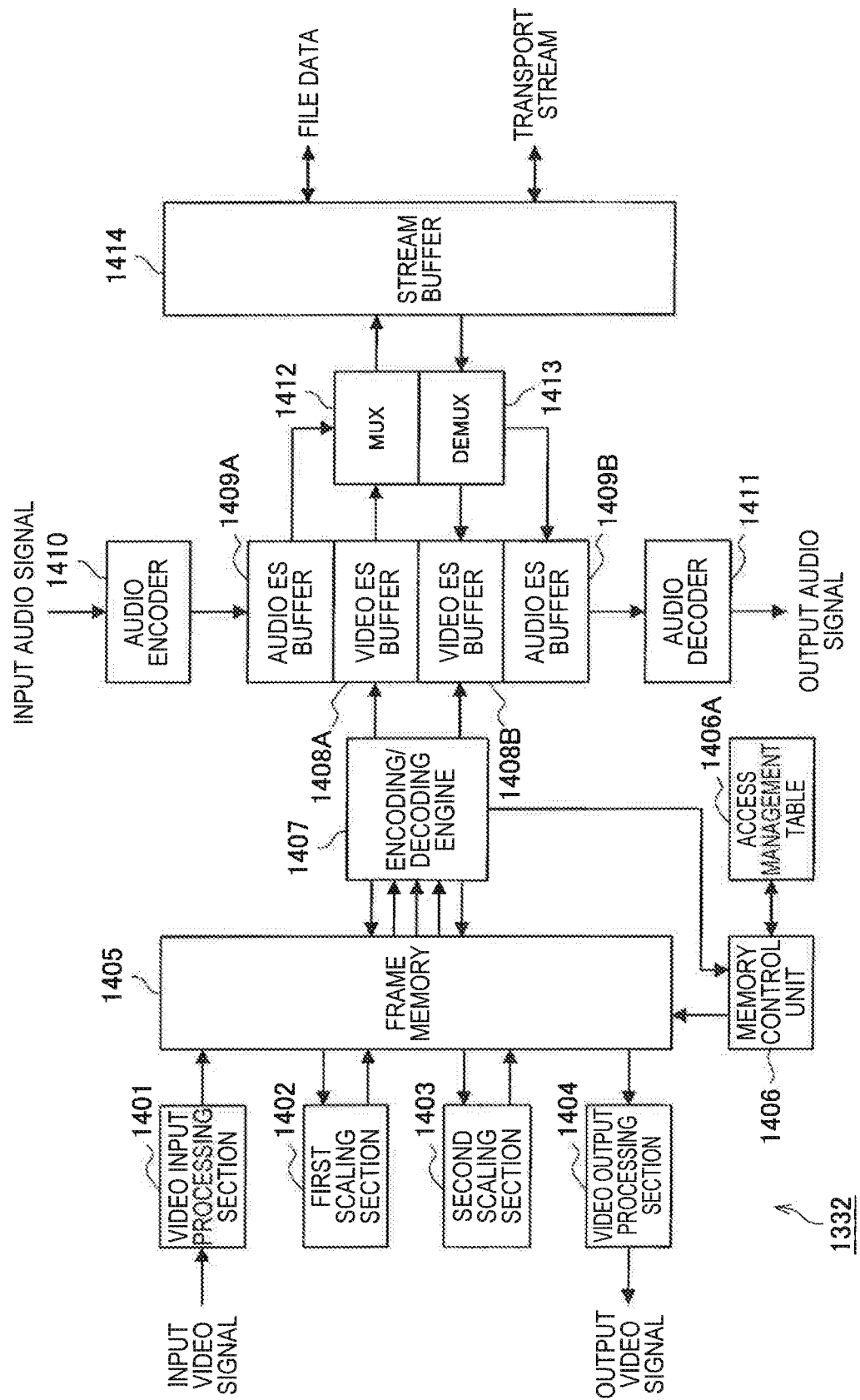
FIG. 40 is a block diagram illustrating an example of a schematic configuration of a video processor.

FIG. 40 is a block diagram illustrating an example of a schematic configuration of the video processor 1332. The video processor 1332 has a function of encoding an input video signal and an input audio signal and generating video data and audio data and a function of decoding encoded video data and audio data and generating an output video signal and an output audio signal.

Referring to FIG. 40, the video processor 1332 includes a video input processing section 1401, a first scaling section 1402, a second scaling section 1403, a video output processing section 1404, a frame memory 1405, a memory control unit 1406, an encoding/decoding engine 1407, video elementary stream (ES) buffers 1408A and 1408B, audio ES buffers 1409A and 1409B, an audio encoder 1410, an audio decoder 1411, a multiplexer (MUX) 1412, a demultiplexer (DEMUX) 1413, and the stream buffer 1414.

The video input processing section 1401 converts, for example, the video signal input from the connectivity module 1321 into digital image data. The first scaling section 1402 performs format conversion and scaling (enlargement/reduction) on the image data input from the video input processing 6 section 1401. The second scaling section 1403 performs format conversion and scaling (enlargement/reduction) on the image data to be output to the video output processing section 1404. The format conversion in the first scaling section 1402 and the second scaling section 1403 may be, for example, conversion between a 4:2:2/Y-Cb-Cr scheme and a 4:2:0/Y-Cb-Cr scheme or the like. The video output processing section 1404 converts the digital image data to the output video signal, and outputs the output video signal, for example, to the connectivity module 1321.

The frame memory 1405 is a memory device that stores the image data shared by the video input processing section 1401, the first scaling section 1402, the second scaling section 1403, the video output processing section 1404, and the encoding/decoding engine 1407. For example, the frame memory 1405 may be implemented using a semiconductor memory such as a DRAM.

The memory control unit 1406 controls access to the frame memory 1405 according to an access schedule for the frame memory 1405 which is stored in an access management table 1406A based on a synchronous signal input from the encoding/decoding engine 1407. The access management table 1406A is updated by the memory control unit 1406 depending on the process performed in the encoding/decoding engine 1407, the first scaling section 1402, the second scaling section 1403, and the like.

The encoding/decoding engine 1407 performs an encoding process of encoding image data and generating an encoded video stream and a decoding process of decoding image data from the encoded video stream. For example, the encoding/decoding engine 1407 encodes image data read from the frame memory 1405, and sequentially writes the encoded video stream in the video ES buffer 1408A. For example, the image data that is sequentially read from the video ES buffer 1408B to the encoded video stream and decoded is stored in the frame memory 1405. The encoding/decoding engine 1407 may use the frame memory 1405 as a work area in these processes. The encoding/decoding engine 1407 outputs the synchronous signal to the memory control unit 1406, for example, at a timing at which processing of each LCU starts.

The video ES buffer 1408A buffers the encoded video stream generated by the encoding/decoding engine 1407. The encoded video stream buffered in the video ES buffer 1408A is output to the multiplexer 1412. The video ES buffer 1408B buffers the encoded video stream input from the demultiplexer 1413. The encoded video stream buffered in the video ES buffer 1408B is output to the encoding/decoding engine 1407.

The audio ES buffer 1409A buffers the encoded audio stream generated by the audio encoder 1410. The encoded audio stream buffered in the audio ES buffer 1409A is output to the multiplexer 1412. The audio ES buffer 1409B buffers the encoded audio stream input from the demultiplexer 1413. The encoded audio stream buffered in the audio ES buffer 1409B is output to the audio decoder 1411.

For example, the audio encoder 1410 performs digital conversion on the input audio signal input from the connectivity module 1321, and encodes the input audio signal according to an audio coding scheme such as an MPEG audio scheme or an Audio Code number 3 (AC3) scheme. The audio encoder 1410 sequentially writes the encoded audio stream in the audio ES buffer 1409A. The audio decoder 1411 decodes audio data from the encoded audio stream input from the audio ES buffer 1409B, and converts the audio data into an analogue signal. For example, the audio decoder 1411 outputs an audio signal to the connectivity module 1321 as a reproduced analogue audio signal.

The multiplexer 1412 multiplexes the encoded video stream and the encoded audio stream, and generates a multiplexed bitstream. The multiplexed bitstream may have any format. The multiplexer 1412 may add predetermined header information to the bitstream. The multiplexer 1412 may convert the format of the stream. For example, the multiplexer 1412 may generate a transport stream (a bitstream of a transport format) in which the encoded video stream and the encoded audio stream are multiplexed. The multiplexer 1412 may generate file data (data of a recording format) in which the encoded video stream and the encoded audio stream are multiplexed.

The demultiplexer 1413 demultiplexes the encoded video stream and the encoded audio stream from the multiplexed bitstream through a technique opposite to the multiplexing by the multiplexer 1412. In other words, the demultiplexer 1413 extracts (or separates) the video stream and the audio stream from the bitstream read from the stream buffer 1414. The demultiplexer 1413 may perform conversion (inverse conversion) of the format of the stream. For example, the demultiplexer 1413 may acquire the transport stream that can be input from the connectivity module 1321 or the broadband modem 1333 through the stream buffer 1414 and convert the transport stream into the video stream and the audio stream. The demultiplexer 1413 may acquire the file data read from the storage medium through the connectivity module 1321 through the stream buffer 1414 and convert the file data into the video stream and the audio stream.

The stream buffer 1414 buffers the bitstream. For example, the stream buffer 1414 buffers the transport stream input from the multiplexer 1412 and outputs the transport stream, for example, to the connectivity module 1321 or the broadband modem 1333 at a predetermined timing or according to a request from the outside. For example, the stream buffer 1414 buffers the file data input from the multiplexer 1412 and outputs the file data, for example, to the connectivity module 1321 at a predetermined timing or according to a request from the outside for recording. Further, the stream buffer 1414 buffers the transport stream acquired, for example, through the connectivity module 1321 or the broadband modem 1333 and outputs the transport stream to the demultiplexer 1413 at a predetermined timing or according to a request from the outside. The stream buffer 1414 buffers the file data read from the storage medium, for example, through the connectivity module 1321 and outputs the file data to the demultiplexer 1413 at a predetermined timing or according to a request from the outside.

In the video processor 1332 having the above configuration, the technology according to the present disclosure may be used, for example, in the encoding/decoding engine 1407. In this case, the video processor 1332 is a chip or a module to which the technology according to the present disclosure is applied.

FIG. 41 is a block diagram illustrating another example of a schematic configuration of the video processor 1332. In the example of FIG. 41, the video processor 1332 has a function of encoding and decoding the video data according to a predetermined scheme.

Referring to FIG. 41, the video processor 1332 includes a control unit 1511, a display interface 1512, a display engine 1513, an image processing engine 1514, an internal memory 1515, a codec engine 1516, a memory interface 1517, a multiplexer/demultiplexer (MUX DMUX) 1518, a network interface 1519, and a video interface 1520.

The control unit 1511 controls operations of various processing sections in the video processor 1332 such as the display interface 1512, the display engine 1513, the image processing engine 1514, and the codec engine 1516. For example, the control unit 1511 includes a main CPU 1531, a sub CPU 1532, and a system controller 1533. The main CPU 1531 executes a program for controlling the operations of the processing sections in the video processor 1332. The main CPU 1531 supplies a control signal generated by execution of the program to the respective processing sections. The sub CPU 1532 serves as an auxiliary role of the main CPU 1531. For example, the sub CPU 1532 executes a child process and a sub routine of the program executed by the main CPU 1531. The system controller 1533 manages execution of the program by the main CPU 1531 and the sub CPU 1532.

The display interface 1512 outputs the image data, for example, to the connectivity module 1321 under control of the control unit 1511. For example, the display interface 1512 outputs an analogue image signal converted from the digital image data or digital image data to a display connected to the connectivity module 1321. The display engine 1513 performs format conversion, size conversion, and color gamut conversion on the image data under control of the control unit 1511 so that an attribute of the image data complies with a specification of the display serving as an output destination. The image processing engine 1514 performs image processing that may include a filtering process for improving the image quality or the like on the image data under control of the control unit 1511.

The internal memory 1515 is a memory device that is shared by the display engine 1513, the image processing engine 1514, and the codec engine 1516 and installed in the video processor 1332. For example, the internal memory 1515 is used when the image data is input or output among the display engine 1513, the image processing engine 1514, and the codec engine 1516. The internal memory 1515 may be any type of memory device. For example, the internal memory 1515 may have a relatively small memory size for storing image data of block units and a relevant parameter. The internal memory 1515 may be a memory that has a smaller capacity (for example, than the external memory 1312) but a high response speed such as a static random access memory (SRAM).

The codec engine 1516 performs the encoding process for encoding the image data and generating the encoded video stream and the decoding process of decoding the image data from the encoded video stream. The image coding scheme supported by the codec engine 1516 may be an arbitrary one or more schemes. In the example of FIG. 41, the codec engine 1516 includes an MPEG-2 video block 1541, an AVC/H.264 block 1542, a HEVC/H.265 block 1543, a HEVC/H.265 (scalable) block 1544, a HEVC/H.265 (multi-view) block 1545, and an MPEG-DASH block 1551. The functional blocks encode and decode the image data according to corresponding image coding schemes.

The MPEG-DASH block 1551 is a functional block capable of transmitting the image data according to an MPEG-DASH scheme. The MPEG-DASH block 1551 performs control of transmission of a stream complying with the standard specification and transmission of the generated stream. The encoding and decoding of the transmitted image data may be performed by any other functional block included in the codec engine 1516.

The memory interface 1517 is an interface for connecting the video processor 1332 with the external memory 1312. The data generated by the image processing engine 1514 or the codec engine 1516 is output to the external memory 1312 through the memory interface 1517. The data input from the external memory 1312 is supplied to the image processing engine 1514 or the codec engine 1516 through the memory interface 1517.

The multiplexer/demultiplexer 1518 performs multiplexing and demultiplexing of the encoded video stream and a relevant bitstream. At the time of multiplexing, the multiplexer/demultiplexer 1518 may add predetermined header information to the multiplexed stream. At the time of demultiplexing, the multiplexer/demultiplexer 1518 may add predetermined header information to separated individual streams. In other words, the multiplexer/demultiplexer 1518 may perform format conversion together with multiplexing or demultiplexing. For example, the multiplexer/demultiplexer 1518 may support conversion and inverse conversion between a plurality of bitstreams and a transport stream serving as a multiplexed stream having a transport format and conversion and inverse conversion between a plurality of bitstreams and file data having a recording format.

The network interface 1519 is an interface for connecting, for example, the video processor 1332 with the broadband modem 1333 or the connectivity module 1321. The video interface 1520 is an interface for connecting, for example, the video processor 1332 with the connectivity module 1321 or the camera 1322.

In the video processor 1332 having the above configuration, the technology according to the present disclosure may be used, for example, in the codec engine 1516. In this case, the video processor 1332 may be a chip or a module to which the technology according to the present disclosure is applied.

The configuration of the video processor 1332 is not limited to the above two examples. For example, the video processor 1332 may be implemented as one semiconductor chip or may be implemented as a plurality of semiconductor chips. The video processor 1332 may be implemented by a 3D integrated LSI or a combination of a plurality of LSIs formed by integrating a plurality of semiconductors.

8. CONCLUSION

The image encoding devices according to the embodiments of the present disclosure have been described above with reference to FIGS. 1 to 41.

The technology according to the present disclosure may be applied to the scalable video coding technique. The scalable video coding technique of HEVC is also referred to as SHVC. For example, the above embodiments can be applied to individual layers (a base layer and an enhancement layer) included in an encoded multi-layer stream. The information related to the SAO mode or the offset value that is decided may be generated and encoded in units of layers or may be re-used between layers. The technology according to the present disclosure may be applied to a multi-view encoding technique. For example, the above embodiments can be applied to individual views (a base view and an enhancement view) included in a multi-view encoded stream. The information related to the SAO mode or the offset value that is decided may be generated and encoded in units of views or may be re-used between views.

The terms "CU," "PU," and "TU" described in the present specification refer to logical units including a syntax associated with an individual block in HEVC. When only individual blocks which are parts of an image are focused on, the blocks may be referred to with the terms "coding block (CB)," "prediction block (PB)," and "transform block (TB)." A CB is formed by hierarchically dividing a coding tree block (CTB) in a quad-tree shape. The one entire quad-tree corresponds to the CTB and a logical unit corresponding to the CTB is referred to as a coding tree unit (CTU).

Mainly described herein is the example where the various pieces of information such as the information related to the determined SAO mode or offset value are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An image processing apparatus, including:

a setting section configured to set an offset value to be applied to a pixel of a decoded image that is decoded, from among candidates of the offset value restricted according to a bit depth of an image; and a filter processing section configured to perform a filter process of applying the offset value set by the setting section to the pixel of the decoded image.

(2)

The image processing apparatus according to (1), wherein the setting section restricts the number of candidates of the offset value at a second bit depth larger than a first bit depth to the number of candidates of the offset value at the first bit depth.

(3)

The image processing apparatus according to (2), wherein the setting section restricts the number of candidates of the offset value at the second bit depth to the number of values applicable as the offset value at the first bit depth.

(4)

The image processing apparatus according to (2), wherein the values applicable as the offset value at the first bit depth are 0 to 7, and the values applicable as the offset value at the second bit depth are 0 to 31.

(5)

The image processing apparatus according to (2), wherein the setting section sets the candidates of the offset value to be applied to the pixel of the decoded image according to a quantization parameter used when the image is quantized.

(6)

The image processing apparatus according to (5), wherein the setting section restricts a maximum value of the candidates of the offset value to be applied to the pixel of the decoded image according to the quantization parameter.

(7)

The image processing apparatus according to (6), wherein the setting section sets the candidates of the offset value in a manner that the maximum value of the candidates of the offset value decreases as the quantization parameter decreases.

(8)

The image processing apparatus according to (5), wherein the setting section sets an interval between neighboring candidates according to the quantization parameter.

(9)

The image processing apparatus according to (8), wherein the setting section sets the interval in a manner that the interval between the neighboring candidates becomes larger as the quantization parameter increases.

(10)

The image processing apparatus according to (2), wherein the setting section sets the candidates of the offset value to be applied to the pixel of the decoded image according to an amount of characteristic of the image.

(11)

The image processing apparatus according to (10), wherein the amount of characteristic is a variance value of a pixel value of the pixel in the image, and the setting section sets the candidates of the offset value to be applied to the pixel of the decoded image according to the variance value.

(12)

The image processing apparatus according to (11), wherein, as the candidate of the offset value, the setting section sets a smaller value among values applicable as the offset value as the variance value decreases.

(13)

The image processing apparatus according to (1), further including:

an encoding section configured to encode the image using the decoded image that has undergone the filter process in the filter processing section.

(14)

The image processing apparatus according to (13), wherein the encoding section encodes the image in units of coding blocks (CBs) formed by recursively dividing a coding tree block (CTB).

(15)

The image processing apparatus according to (14), wherein the filter processing section performs the filter process of applying the offset value in units of the CTBs.

(16)

The image processing apparatus according to (1), wherein the setting section restricts the number of candidates of the offset value according to a picture type of the decoded image.

(17)

The image processing apparatus according to (16), wherein, when the picture type of the decoded image serving as a target is a picture type referring to another decoded image, the setting section restricts the number of candidates of the offset value to the number of candidates of the offset value in the other decoded image serving as a reference destination.

(18)

An image processing method, including:

setting, by a processor, an offset value to be applied to a pixel of a decoded image that is decoded, from among candidates of the offset value restricted according to a bit depth of an image; and performing a filter process of applying the set offset value to the pixel of the decoded image.

REFERENCE SIGNS LIST 10 image encoding device
11 buffer
13 subtraction section
14 orthogonal transform section
15 quantization section
16 lossless encoding section
17 accumulation buffer
18 rate control section
21 inverse quantization section
22 inverse orthogonal transform section
23 addition section
24 loop filter
25 frame memory
26 selector
27 selector
30 intra prediction section
35 inter prediction section
100 original image holding section
200 deblock filter
240 mode determining section
300 sample adaptive offset filter
310 control unit
320 analyzing section
330 statistic acquiring section
340 mode determining section
350 offset determining section
351 offset measuring section
353 offset deciding section
355 candidate control unit
360 switching determining section
370 first determining section
371 number-of-modes counting section
373 determination processing section
380 second determining section
390 filter processing section
400 adaptive loop filter

The invention claimed is:

1. An image processing apparatus, comprising:
a setting section configured to set an offset value to be applied to a pixel of a decoded image that is decoded, from among candidates of the offset value restricted according to a bit depth of an image; and
a filter processing section configured to perform a filter process of applying the offset value set by the setting section to the pixel of the decoded image,
wherein the candidates of the offset value are restricted to a number of candidates among values applicable as the offset value based on a quantization parameter,
wherein an interval between each set of neighboring candidates of the restricted candidates of the offset value is determined according to a comparison between the quantization parameter and one or more threshold values,
wherein the values applicable as the offset value are determined based on a control table selected according to the comparison between the quantization parameter and the one or more threshold values, and
wherein the setting section and the filter processing section are each implemented via at least one processor.

2. The image processing apparatus according to claim 1, wherein the setting section restricts the number of candidates of the offset value at a second bit depth larger than a first bit depth to the number of candidates of the offset value at the first bit depth.

3. The image processing apparatus according to claim 2, wherein the setting section restricts the number of candidates of the offset value at the second bit depth to a number of values applicable as the offset value at the first bit depth.

4. The image processing apparatus according to claim 2,
wherein the values applicable as the offset value at the first bit depth are 0 to 7, and
wherein the values applicable as the offset value at the second bit depth are 0 to 31.

5. The image processing apparatus according to claim 2, wherein the setting section sets the candidates of the offset value to be applied to the pixel of the decoded image according to the quantization parameter used when the image is quantized.

6. The image processing apparatus according to claim 5, wherein the setting section restricts a maximum value of the candidates of the offset value to be applied to the pixel of the decoded image according to the quantization parameter.

7. The image processing apparatus according to claim 6, wherein the setting section sets the candidates of the offset value in a manner that the maximum value of the candidates of the offset value decreases as the quantization parameter decreases.

8. The image processing apparatus according to claim 5, wherein the setting section sets the interval between the neighboring candidates according to the quantization parameter.

9. The image processing apparatus according to claim 8, wherein the setting section sets the interval in a manner that the interval between the neighboring candidates becomes larger as the quantization parameter increases.

10. The image processing apparatus according to claim 2, wherein the setting section sets the candidates of the offset value to be applied to the pixel of the decoded image according to an amount of characteristic of the image.

11. The image processing apparatus according to claim 10,
wherein the amount of characteristic is a variance value of a pixel value of the pixel in the image, and
the setting section sets the candidates of the offset value to be applied to the pixel of the decoded image according to the variance value.

12. The image processing apparatus according to claim 11,
wherein, as the candidate of the offset value, the setting section sets a smaller value among values applicable as the offset value as the variance value decreases.

13. The image processing apparatus according to claim 1, further comprising:
an encoding section configured to encode the image using the decoded image that has undergone the filter process in the filter processing section,
wherein the encoding section is implemented via at least one processor.

14. The image processing apparatus according to claim 13,
wherein the encoding section encodes the image in units of coding blocks (CBs) formed by recursively dividing a coding tree block (CTB).

15. The image processing apparatus according to claim 14,
wherein the filter processing section performs the filter process of applying the offset value in units of the CTBs.

16. The image processing apparatus according to claim 1,
wherein the setting section restricts the number of candidates of the offset value according to a picture type of the decoded image.

17. The image processing apparatus according to claim 16,
wherein, when the picture type of the decoded image serving as a target is a picture type referring to another decoded image, the setting section restricts the number of candidates of the offset value to the number of candidates of the offset value in the other decoded image serving as a reference destination.

18. An image processing method, implemented via at least one processor, the method comprising:
setting an offset value to be applied to a pixel of a decoded image that is decoded, from among candidates of the offset value restricted according to a bit depth of an image; and
performing a filter process of applying the set offset value to the pixel of the decoded image,
wherein the candidates of the offset value are restricted to a number of candidates among values applicable as the offset value based on a quantization parameter,
wherein an interval between each set of neighboring candidates of the restricted candidates of the offset value is determined according to a comparison between the quantization parameter and one or more threshold values, and
wherein the values applicable as the offset value are determined based on a control table selected according to the comparison between the quantization parameter and the one or more threshold values.

19. The image processing apparatus according to claim 1,
wherein a first control table is selected when the quantization parameter is equal to or less than a first threshold,
wherein a second control table is selected when the quantization parameter is greater than the first threshold and equal to or less than a second threshold, and
wherein a third control table is selected when the quantization parameter is greater than the second threshold.

* * * * *